US012551574B2

(12) United States Patent
Engel et al.

(10) Patent No.: US 12,551,574 B2
(45) Date of Patent: Feb. 17, 2026

(54) RECOMBINANT NUCLEIC ACIDS CONTAINING ALPHAHERPESVIRUS PROMOTER SEQUENCES

(71) Applicant: The Trustees of Princeton University, Princeton, NJ (US)

(72) Inventors: Esteban Engel, Princeton, NJ (US); Carola Maturana, Princeton, NJ (US); Lynn Enquist, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 1179 days.

(21) Appl. No.: 17/426,389

(22) PCT Filed: Feb. 5, 2020

(86) PCT No.: PCT/US2020/016787
§ 371 (c)(1),
(2) Date: Jul. 28, 2021

(87) PCT Pub. No.: WO2020/163475
PCT Pub. Date: Aug. 13, 2020

(65) Prior Publication Data
US 2022/0378941 A1 Dec. 1, 2022

Related U.S. Application Data

(60) Provisional application No. 62/950,848, filed on Dec. 19, 2019, provisional application No. 62/801,524, filed on Feb. 5, 2019.

(51) Int. Cl.
*A61K 48/00* (2006.01)
*C07K 14/005* (2006.01)
*C12N 15/86* (2006.01)

(52) U.S. Cl.
CPC ........ *A61K 48/0058* (2013.01); *C07K 14/005* (2013.01); *C12N 15/86* (2013.01); *C12N 2710/16722* (2013.01); *C12N 2750/14143* (2013.01); *C12N 2830/008* (2013.01)

(58) Field of Classification Search
None
See application file for complete search history.

(56) References Cited

U.S. PATENT DOCUMENTS

| 5,352,596 A * | 10/1994 | Cheung | C07K 14/005 |
| | | | 435/235.1 |
| 9,636,354 B2 * | 5/2017 | Bloom | C12N 15/85 |
| 2004/0197313 A1 | 10/2004 | Wang et al. | |
| 2007/0154456 A1 | 7/2007 | Bloom et al. | |
| 2010/0240739 A1 | 9/2010 | Barkats | |
| 2019/0032082 A1 | 1/2019 | Koszinowski et al. | |
| 2025/0025575 A1 | 1/2025 | Maturana et al. | |

FOREIGN PATENT DOCUMENTS

| CN | 1826411 A | 8/2006 |
| WO | 2020/163475 A1 | 8/2020 |
| WO | 2023/097283 A1 | 6/2023 |

OTHER PUBLICATIONS

Zimmerman, Devon, et al. "Enhancement of transgene expression by nuclear transcription factor Y and CCCTC-binding factor." Biotechnology Progress 34.6 (2018): 1581-1588. (Year: 2018).*
Pomeranz, L.E. et al., "Molecular Biology of Pseudorabies Virus: Impact on Neurovirology and Veterinary Medicine," Microbiology and Molecular Biology Reviews, vol. 69; No. 3; 462-500 (2005).
Powell, S.K. and Rivera-Soto, R., "Viral Expression Cassette Elements to Enhance Transgene Target Specificity and expression in Gene Therapy," Discov. Med., vol. 19; No. 10; 49-57 (2015).
Qin, J.Y. et al., "Systematic Comparison of Constructive Promoters and the Doxycycline-Inducible Promoter," PLoS Onc, vol. 5; No. 5; e10611; 4 pages (2010).
Renier, N. et al., "iDISCO: A Simple, Rapid Method to Immunolabel Large Tissue Samples for vol. Imaging," Cell, vol. 159; 896-910 (2014).
Renier, N. et al., "Mapping of brain activity by automated volume analysis of immediate early genes," Cell, vol. 165; No. 7; 1789-1802 (2016).
Russell, D.W. and Hirata, R.K., "Human gene targeting by viral vectors," Nat Genet., vol. 18; No. 4; 325-330 (1998).
Samulski, R.J. and Muzyczka, N., "AAV-Mediated Gene Therapy for Research and Therapeutic Purposes," The Annual Review of Virology, vol. 1; 427-451 (2014).
Sandelin, A. et al., "JASPAR: an open-access database for eukaryotic transcription factor binding profiles," Nucleic Acids Research, vol. 32; D91-D94 (2004).
Sohal, V.S. et al., "Parvalbumin neurons and gamma rhythms enhance cortical circuit performance," Nature, vol. 459; No. 7247; 698-702 (2009).
Taharaguchi, S. et al., "Anaylsis of regulatory functions for the region located upstream from the latency-associated transcript (LAT) promoter of pseudorabies virus in cultures cells," Veterinary Microbiology, vol. 85; 197-208 (2002).
Von Jonquieres, G. et al., "Recombinant Human Myelin-Associated Glycoprotein Promoter Drives Selective AAV-Mediated Transgene Expression in Oligodendrocytes," Frontiers in Molecular Neuroscience, vol. 9; Article 13; 14 pages (2016).

(Continued)

*Primary Examiner* — Kara D Johnson
*Assistant Examiner* — Constantina E Stavrou
(74) *Attorney, Agent, or Firm* — Hamilton, Brook, Smith & Reynolds, P.C.

(57) ABSTRACT

Provided are recombinant nucleic acids (e.g., vectors), and related methods, for expression of a target gene in a host cell. The recombinant nucleic acids comprise a promoter comprising a nucleic acid sequence having at least 70% sequence identity to a sequence selected from SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8 and SEQ ID NO: 9; a cloning site for insertion of a nucleic acid encoding the target gene; and at least one non-promoter regulatory element required for the expression of the target gene in the host cell.

18 Claims, 33 Drawing Sheets

Specification includes a Sequence Listing.

(56) References Cited

OTHER PUBLICATIONS

Wang, D. et al., "Adeno-associated virus vector as a platform for gene therapy delivery," Nat Rev Drug Discov., vol. 18; No. 5; 358-378 (2019).

Wang, L. et al., "Delayed delivery of AAV-GDNF prevents nigral neurodegeneration and promotes functional recovery in a rat model of Parkinson's disease," Gene Therapy, vol. 9; 381-389 (2002).

Wang, J. et al., "Transcription factor induction of human oligodendrocyte progenitor fate and differentiation," PNAS, vol. 111; No. 28; E2885-E2894 (2014).

Washington, S.D. et al., "CTCF Binding Sites in the Herpes Simplex Virus 1 Genome Display Site-Specific CTCF Occupation, Protein Recruitment, and Insulator Function," Journal of Virology, vol. 92; Issue 8; e00156-18; 15 pages (2018).

Wasserman, W.W. and Sandelin, A., "Applied Bioinformatics for the Identification of Regulatory Elements," Nature; vol. 5; 276-287 (2004).

Wong, G. et al., "Pseudorabies virus: a neglected zoonotic pathogen in humans?," Emerging Microbes & Infections, vol. 8; 150-154 (2019).

Yardeni, T. et al., "Retro-orbital injections in mice," Lab Anim, vol. 40; No. 5; 155-160 (2011).

Ziebarth, J.D. et al., "CTCFBSDB 2.0: a database for CTCF-binding sites and genome organization," Nucleic Acids Research, vol. 41; D188-D194 (2013).

Zolotukhin, S. et al., "Recombinant adeno-associated virus purification using novel methods improves infectious titer and yield," Gene Therapy, vol. 6; 973-985 (1999).

Notification Concerning Transmittal of International Report on Patentability for International Application No. PCT/US2020/016787, mailed Aug. 19, 2021.

Andersson, R. and Sandelin, A., "Determinants of enhancer and promoter activities of regulatory elements," Nature Reviews Genetics, vol. 21; No. 2; 71-87 (2020).

Aschauer, D.F. et al., "Analysis of Transduction Efficiency, Tropism and Axonal Transport of AAV Serotypes 1, 2, 5, 6, 8, and 9 in the Mouse Brain," PLoS One, vol. 8; Issue 9; e76310; 16 pages (2013).

Back, S. et al., "Neuronal Activation Stimulated Cytomegalovirus Promoter-Driven Transgene Expression, " Methods and Clinical Development, vol. 14; 180-188 (2019).

Baskerville, A. and Lloyd, G., "Experimental Infection of Monkeys with Herpesvirus Suis (Aujeszky's-Disease Virus)," J. Med. Microbiol., vol. 10; 139-144 (1977).

Berges, B.K. et al., "Transduction of Brain by Herpes Simplex Virus Vectors," The American Society of Gene Therapy, vol. 15; No. 1; 20-29 (2007).

Berthomme, H. et al., "Evidence for a Bidirectional Element Located Downstream from the Herpes Simples Virus Type 1 Latency-Associated Promoter that Increases its Activity During Latency," Journal of Virology, vol. 74; No. 8; 3613-3622 (2000).

Blanchard, Y. et al., "Cellular gene expression survey of PseudoRabies Virus (PRV) infected Human Embryonic Kidney cells (HEK-293)," Vet. Res., vol. 37; 705-723 (2006).

Bloom, D.C. et al., "Mutagenesis of a cAMP Response Element within the Latency-Associates Transcript Promoter of HSV-1 Reduces Adrenergic Reactivation," Virology, vol. 236; 202-207 (1997).

Boldogkoi, Z. et al., "A putative latency promoter/enhancer (PLAT2) region of pseudorabies virus contains a virulence determinant," Journal of General Virology, vol. 81; 415-420 (2000).

Cearley, C.N. and Wolfe, J.H., "A Single Injection of an Adeno-Associated Virus Vector into Nuclei with Divergent Connections Results in Widespread Vector Distribution in the Brain and Global Correction of a Neurogenetic Disease," The Journal of Neuroscience, vol. 27; No. 37; 9928-9940 (2007).

Chamberlain, K. et al., "Expressing Transgenes That Exceed the Packaging Capacity of Adeno-Associated Virus Capsids," Human Gene Therapy Methods, vol. 27; No. 1; 12 pages (2016).

Chan, K.Y. et al., "Engineered AAVs for efficient noninvasive gene delivery to the central and peripheral nervous systems," Nat Neurosci., vol. 20; No. 8; 1172-1179 (2017).

Chan, L.Y. et al., "Non-invasive measurement of mRNA decay reveals translation initiation as the major determinant of MRNA stability," eLife, 7; e32536; 32 pages (2018).

Cheung, A.K., "Cloning of the Latency Gene and the Early Protein 0 Gene of Pseudorabies Virus," Journal of Virology, vol. 65; No. 10; 5260-5271 (1991).

Cheung, A.K., "Detection of Pseudorabies Virus Transcripts in Trigeminal Ganglia of Latency Infected Swine," Journal of Virology, vol. 63; No. 7; 2908-2913 (1989).

Colella, P. et al., "AAV Gene Transfer with Tandem Promoter Design Prevents Anti-transgene Immunity and Provides Persistent Efficacy in Neonate Pompe Mice," Methods and Clinical Development, vol. 12; 85-101 (2018).

Curanovic, D. et al., "Compartmented Neuron Cultures for Directional Infection by Alpha Herpesviruses," Curr Protoc Cell Biol, Chapter: Unit 26.4; 28 pages (2009).

Delzor, A. et al., "Restricted Transgene Expression in the Brain with Cell-Type Specific Neuronal Promoters," Human Gene Therapy Methods, vol. 23; 242-254 (2012).

Deshmane, S.L., and Fraser, N.W., "During Latency, Herpes Simplex Virus Type 1 DNA Is Associated with Nucleosomes in a Chromatin Structure," Journal of Virology, vol. 63; No. 2; 943-947 (1989).

Devi-Rao, G.B. et al., "Relationship between Polyadenylated and Nonpolyadenylated Herpes Simplex Virus Type 1 Latency-Associated Transcripts," Journal of Virology, vol. 65; No. 5; 2179-2190 (1991).

Emery, B. and Lu, Q.R., "Transcriptional and Epigenetic Regulation of Oligodendrocyte Development and Myelination in the Central Nervous System," Cold Spring Harb Perspect Biol, vol. 7; a020461; 21 pages (2015).

Fan, Y. et al., "Exploring the tissue propism of pseudorabies virus based on miRNA level analysis," BMC Microbiology, vol. 19; 125; 14 pages (2019).

Fleming, J.D. et al., "NF-Y coassociates with FOS at promoters, enhancers, repetitive elements, and inactive chromatin regions, and is stereo-positioned with growth-controlling transcription factors," Genome Research, vol. 23; 1195-1209 (2013).

Gasparini, S.J. et al., "Transplantation of photoreceptors into the degenerative retina: Current state and future perspectives," Progress in Retinal and Eye Research, vol. 69; 1-37 (2019).

Gray, S.J. et al., "Optimizing Promoters for Recombinant Adeno-Associated Virus-Mediated Gene Expression in the Peripheral and Central Nervous System Using Self-Complementary Vectors," Human Gene Therapy, vol. 22; 1143-1153 (2011).

Taberman, R.P. and Mccown, T.J., "Regulation of gene expression in adeno-associated virus vectors in the brain," Methods, vol. 28; 219-226 (2002).

Hammond, S.L. et al., "Cellular selectivity of AAV serotypes for gene delivery in neurons and astrocytes by neonatal intracerebroventricular injection," PLoS One, vol. 12; No. 12; e0188830; 22 pages (2017).

Hordeaux, J. et al., "The GPI-Linked Protein LY6A Drives AAV-PHP.B Transport across the Blood-Brain Barrier," Molecular Therapy, vol. 27; No. 5; 912-921 (2019).

Huang, Q. et al., "Delivering genes across the blood-brain barrier: LY6A, a novel cellular receptor for AAV-PHP.B capsids," bioRxiv, 15 pages (2019).

Hurdy, E. and Vandenberghe, L.H., "Therapeutic AAV Gene Transfer to the Nervous System: A Clinical Reality," Neuron, vol. 101; 839-862 (2019).

Husain, T. et al., "Long-term AAV vector gene and protein expression in mouse brain from a small pan-cellular promoter is similar to neural cell promoters," Gene Ther., vol. 16; No. 7; 927-932 (2009).

Ingusci, S. et al., "Gene Therapy Tools for Brain Diseases," Frontiers in Pharmacology, vol. 10; Article 724; 19 pages (2019).

Jackson, K.L. et al., "Better Targeting, Better Efficiency for Wide-Scale Neuronal Transduction with the Synapsin Promoter and AAV-PHP.B," Frontiers in Molecular Neuroscience, vol. 9; Article 116; 11 pages (2016).

(56) References Cited

OTHER PUBLICATIONS

Jin, L. and Scherba, G., "Expression of the Pseudorabies Virus Latency-Associated Transcript Gene during Productive Infection of Cultured Cells," Journal of Virology, vol. 73; No. 12; 9781-9788 (1999).

Jin, L. et al., "Identification of the Pseudorabies Virus Promoter Required for Latency-Associated Transcript Gene Expression in the Natural Host," Journal of Virology, vol. 74; No. 14; 6333-6338 (2000).

Kenny, J.J. et al., "Identification of a Second ATF/CREB-like Element in the Herpes Simplex Virus Type 1 (HSV-1) Latency-Associated Transcript (LAT) Promoter," Virology, vol. 200; 220-235 (1994).

Koyuncu, O.O. et al., "Virus Infections in the Nervous System," Cell Host Microbe., vol. 13; No. 4; 379-393 (2013).

Kriesel, J.D. et al., "STAT1 binds to the herpes simplex virus type 1 latency-associated transcript promoter," Journal of NeuroVirology, vol. 10; 12-20 (2004).

Lang, F. et al., "CTCF interacts with the lytic HSV-1 genome promote viral transcription," Scientific Reports, vol. 7; 39861; 15 pages (2017).

Lee, J.S. et al., "CCCTC-Binding Factor Acts as a Heterochromatin Barrier on Herpes Simplex Viral Latent Chromatin and Contributes to Poised Patent Infection," American Society for Microbiology, vol. 9; Issue 1; e02372-17; 13 pages (2018).

Leib, D.A. et al., "A Deletion Mutant of the Latency-Associated Transcript of Herpes Simplex Virus Type 1 Reactivates from the Latent State with Reduced Frequency," Journal of Virology, vol. 63; No. 7; 2893-2900 (1989).

Leib, D.A. et al., "The promoter of the latency-associated transcripts of herpes simplex virus type 1 contains a functional cAMP-response element: Role of the latency-associated transcripts and cAMP in reactivation of viral latency," Proc. Natl. Acad. Sci., vol. 88; 48-52 (1991).

Lokensgard, J.R. et al., "The Latency-Associated Promoter of Herpes Simplex Virus Type 1 Requires a Region Downstream of the Transcription Start Site for Long-Term expression during Latency," Journal of Virology, vol. Vol. 71; No. 9; 6714-6719 (1997).

Mahjoub, N. et al., "A 2.5-Kilobase Deletion Containing a Cluster of Nine MicroRNAs in the Latency-Associated-Transcript Locus of the Pseudorabies Virus Affects the Host Response of Porcine Trigeminal Ganglia during Established Latency," Journal of Virology, vol. 89; No. 1; 428-442 (2015).

Mak, K.Y. et al., "The Adeno-associated Virus—A Safe and Promising Vehicle for Liver-specific Gene Therapy of Inherited and Non-inherited Disorders," Current Gene Therapy, vol. 17; 13 pages (2017).

Maturana, C.J., "High Glucocorticoid Levels During Gestation Activate the Inflammasome in Hippocampal Oligodendrocytes of the Offspring," Developmental Neurobiology, vol. 77; No. 5; 18 pages (2017).

Nathanson, J.L. et al., "Short promoters in viral vectors drive selective expression in mammalian inhibitory neurons, but do not restrict activity to specific inhibitory cell-types," Frontiers in Neural Circuits, vol. 3; Article 19; 24 pages (2009).

Nguyen, N.T.T. et al., "RSAT 2018: regulatory sequence analysis tools 20th anniversary," Nucleic Acids Research, vol. 46; W209-W214 (2018).

Ogden, P.J. et al., "Comprehensive AAV capsid fitness landscape reveals a viral gene and enables machine-guided design," Science, vol. 366; No. 6469; 1139-1143 (2019).

Ono, E. et al., "Possible Roles of Transcription Factors of Pseudorabies Virus in Neuropathogenicity," Fukuoka Acta Med., vol. 98; No. 10; 364-372 (2007).

Bedbrook, C.N. et al., "Viral Strategies for Targeting the Central and Peripheral Nervous Systems," Annu. Rev. Neurosci., vol. 41; 323-348 (2018).

Brooks, A.R. et al., "Transcriptional silencing is associated with extensive methylation of the CMV promoter following adenoviral gene delivery to muscle," The Journal of Gene Medicine, vol. 6; 395-404 (2004).

Cheung, A.K. and Smith, T.A., "Analysis of the latency-associated transcript/UL1-3.5 gene cluster promoter complex of pseudorabies virus," Arch Virol, vol. 144; 381-391 (1999).

Chikhirzhina, G.I. et al., "Transcription Factors of the NF1 Family: Role in Chromatin Remodeling," Molecular Biology, vol. 42; No. 3; 342-356 (2008).

Choi, J. et al., "Optimization of AAV expression cassettes to improve packaging capacity and transgene expression in neurons," Molecular Brain, vol. 7; 17; 10 pages (2014).

Dayton, R.D. et al., "More expansive gene transfer to the rat CNS: AAV PHP.EB vector dose-response and comparison to AAV PHP.B," Gene Therapy, vol. 25; 392-400 (2018).

Deverman, B.E. et al., "Gene therapy for neurological disorders: progress and prospects," Nature Reviews, vol. 17; 641-659 (2018).

GenBank: Accession No. JN947926.1: Mus musculus targeted non-conditional, lacZ-tagged mutant allele Catsper1:tm1e(EUCOMM)Hmgu tm1e(EUCOMM)Wtsi; transgenic, dated Nov. 5, 2011.

Herdegen, T. and Leah, J.D., "Inducible and constitutive transcription factors in the mammalian nervous system: control of gene expression by Jun, Fos and Krox, and CREB/ATF proteins," Brain Research Reviews, vol. 28; 370-490 (1998).

International Search Report and Written Opinion received for PCT Patent Application No. PCT/US22/080438, mailed on May 4, 2023, 13 pages.

Lu, H. et al., "Complete Correction of Hemophilia A with Adeno-Associated Viral Vectors Containing a Full-Size Expression Cassette," Human Gene Therapy, vol. 19; 648-654 (2008).

Notification Concerning Transmittal of the International Preliminary Report on Patentability for International Application No. PCT/US2022/080438, mailed Jun. 6, 2024.

Ozawa, K., "Gene therapy using AAV vectors," Drug Delivery System, 22-6; 643-650 (2007).

Peel, A.L. et al., "Efficient transduction of green fluorescent protein in spinal cord neurons using adeno-associated virus vectors containing cell type-specific promoters," Gene Therapy, vol. 4; 16-24 (1997).

Priola, S.A. and Stevens, J.G., "The 5' and 3' Limits of Transcription in the Pseudorabies Virus Latency Associated Transcription Unit," Virology, vol. 182; 852-856 (1991).

Watanabe, S. et al., "Pseudorabies virus early protein 0 transactivates the viral gene promoters," Journal of General Virology, vol. 76; 2881-2885 (1995).

Zimmerman, D. et al., "Enhancement of Transgene Expression by Nuclear Transcription Factor Y and CCCTC-Binding Factor," American Institute of Chemical Engineers, Biotechnol. Prog., 8 pages (2018).

Dean, H.J. and Cheung, A.K., "A 3' Coterminal Gene Cluster in Pseudorabies Virus Contains Herpes Simplex Virus UL1, UL2, and UL3 Gene Homologs and a Unique UL3.5 Open Reading Frame," Journal of Virology, vol. 67; No. 10; 5955-5961 (1993).

GenBank submission L 13855, Feb. 25, 1994 [online]. (Retrieved on May 25, 2020). Retrieved from the internet <URL: https://www.ncbi.nlm.nih.gov/nuccore/L 13855 > entire Document.

GenBank submission JF797219, Nov. 2, 2011 [online]. [Retrieved on May 25, 2020). Retrieved from the internet <URL: https://www.ncbi.nlm.nih.gov/nuccore/JF797219 > entire Document.

Maturana, C.J. et al., "Small Alphaherpesvirus Latency-Associated Promoters Drive Efficient and Long-Term Transgene Expression in the CNS," Molecular Therapy: Methods & Clinical Development, vol. 17; 843-857 (2020).

Taharaguchi, S. et al., "The latency-associated transcript promoter of pseudorabies virus directs neuron-specific expression in trigeminal ganglia or transgenic mice," Journal of General Viroloft, vol. 84; 2015-2022 (2003).

Notification of Transmittal of the International Search Report and Written Opinion for International Application No. PCT/US2020/016787, entitled: "," mailed Jul. 16, 2020.

(56) References Cited

OTHER PUBLICATIONS

Chan A, et al. Optimized formulation buffer preserves Adenoassociated virus-9 infectivity after 4 degrees C storage and freeze/thawing cycling. J Virol Methods. 2022:1145983.

Maturana CJ, et al. Single-Cell Quantification of Triple-AAV Vector Genomes Coexpressed in Neurons. Curr Protoc. 2022;2(5):e430.

Needleman & Wunsch, "A general method applicable to the search for similarities in the amino acid sequence of two proteins" J. Mol. Biol. 48:443-453 (1970).

Pearson & Lipman, "Improved tools for biological sequence comparison" Proc. Nat'l. Acad. Sci. USA 85:2444-2448 (1988).

\* cited by examiner

```
  1  GGGGGAGTCGGGGGGGAGTCGGGGGGGAGTCGGGGGGTCCCAGTTCGGCG
                              1
 51  CGGTCTCCACAGCGCACAAAGTCCGGCTGCAGTAAATTTACTGCGGGTGC
                GC box                2
101  AGTTACCCTGGCGGCACACCGGCCCGATGGCGCTGCAGTAACTCTACTG
                                 GC box
151  CAGCTACAGTTTACTACAGTTGCAGTACCGCGCGCCGCCAAATACTA
201  CAGTAGATTTCCTGTGGCCGCCGCGTACTGCAGTTTACCGCGGCTGCAGT
251  AAACTGCAGTATCGCGCGGTAAATTGCAGTCTGGCAGCCGCGCGTTACTG
     CAAT box                    CAAT box   3
301  CAATTAGCGGTGGCTCCGACACTCTGGCAATTGGTGCTAATGGGCCGT
                     2
351  GATGGTCCATGTGGGGGTGATGTAACCGCCGGGCCCGGTTGGGCACTCAG
                                         3    2
401  ATGGTGGCCGGGCGCCAGGCCAAAGTGCTGTCTGAGTGCCACTTTATGAC
                          CAAT box            TAT box
451  TTTGTTTTTCTCAAACAACATCAATTATGGATGCACATCGTGTATATAAT
                                     2              GC box
501  CCCCGGTCCGCGCTCCGCCCACCCATCACAGCAGCCGCGGACGCTGCGG
551  CCCGAGCGGTCCATCTCGCCAGCCAGCCAACCAGCCGAGCCGCCCAGCCG
                                                    GC box
601  ACCCGAGAGCCCCGAGAGCCAGACTCCCTCAGCCATAGAAGACACGGGC
                  4 TAT box 5
651  GGGAGAGACGGACTGAAAAATATATCTTTTTTATTTTGTCTGGGCCTG
                                    GC box
701  GAGACCCGCAGCAGGAGCGGAGGTGGGTGCGGCCGGGAGCCGGAGCAG
            5           5               5
751  GACCGGGAACAGGAACAGGAACAGGAACAGGAACAGGAGTGGGG
                              3                    GC box
801  CCGGGAGCAGGAGCAGGAGCGGGAGCCCAAGTGGGGCAGGAGCGGCGGC
                                          GC box
851  GGCCGCAGCAGCAACAGGGTCGCCCCAGTCCGCGGCGAGGAAGAGGGAGC
901  TC
```

FIG. 1A

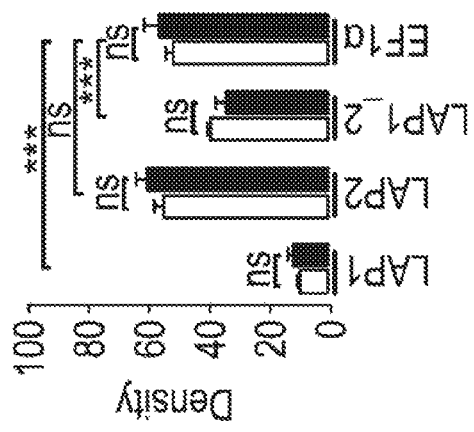
FIG. 2E  FIG. 2F  FIG. 2G
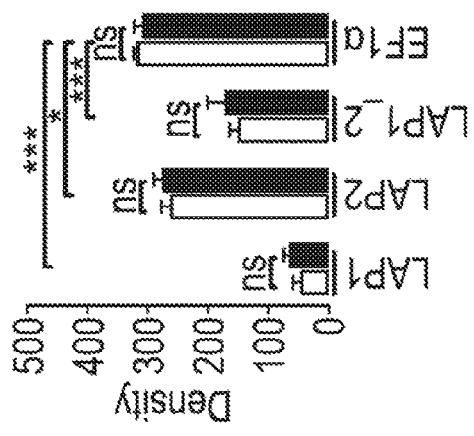
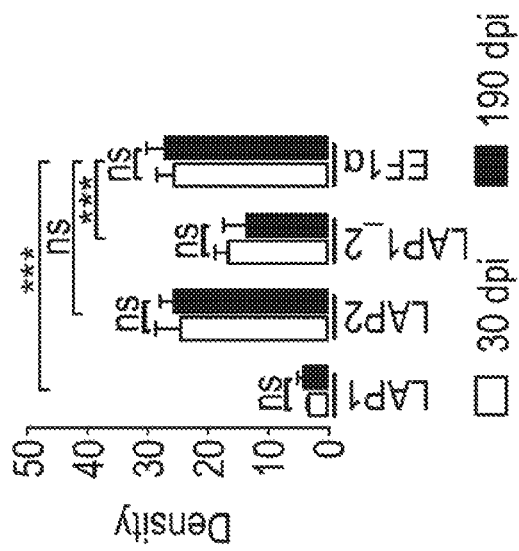

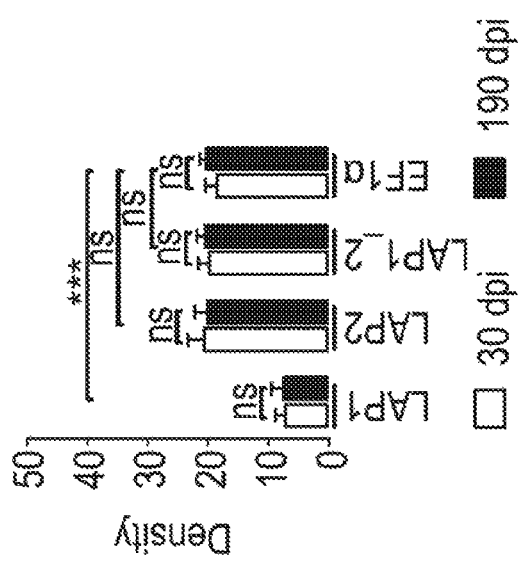
FIG. 2M Midbrain, sensory related
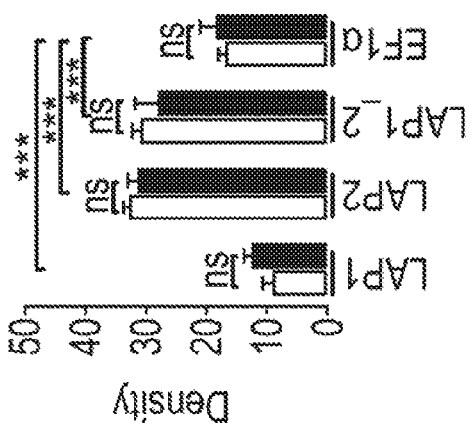
FIG. 2L Midbrain, motor related
FIG. 2K Hypothalamus

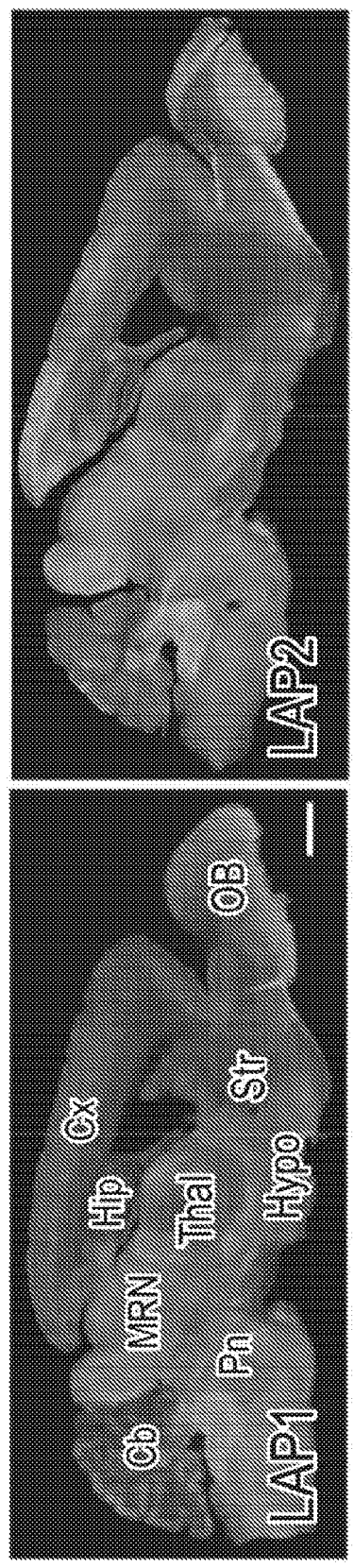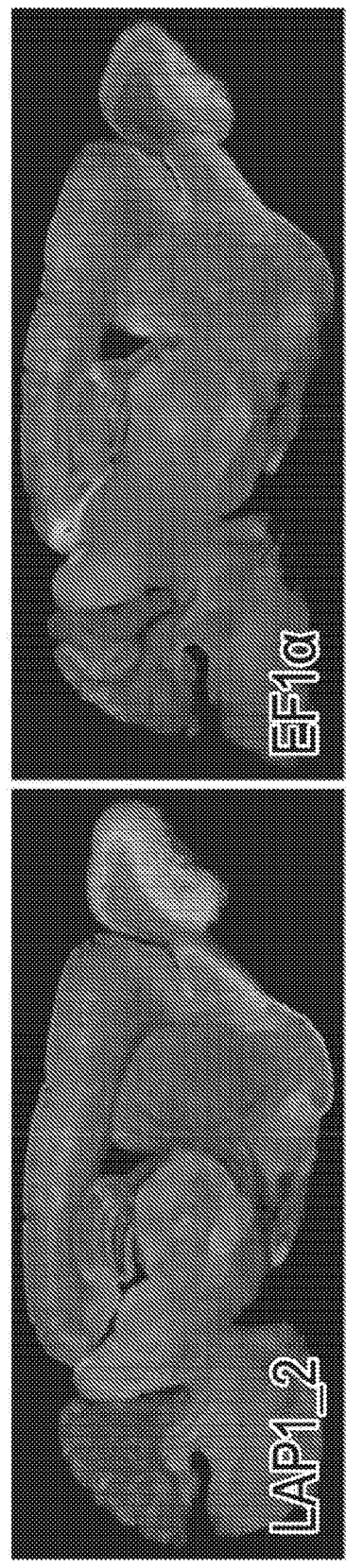
FIG. 3A  FIG. 3B  FIG. 3C  FIG. 3D

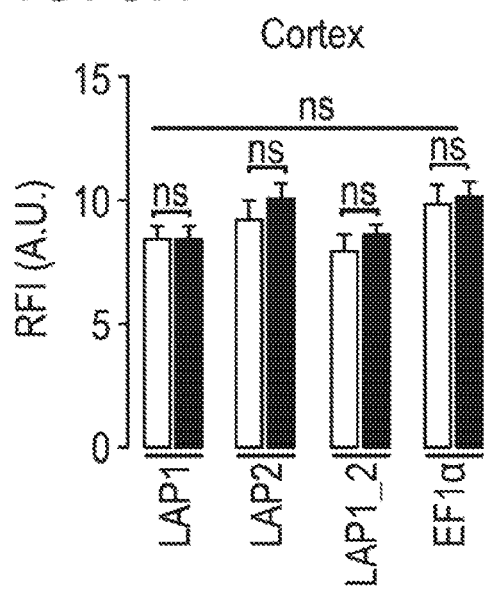
FIG. 3I1
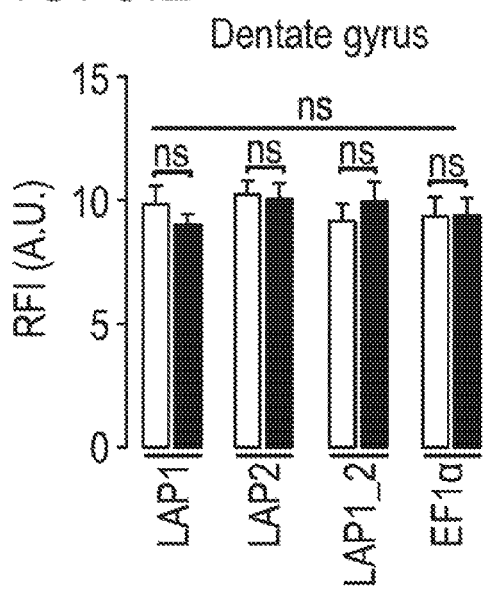
FIG. 3I2
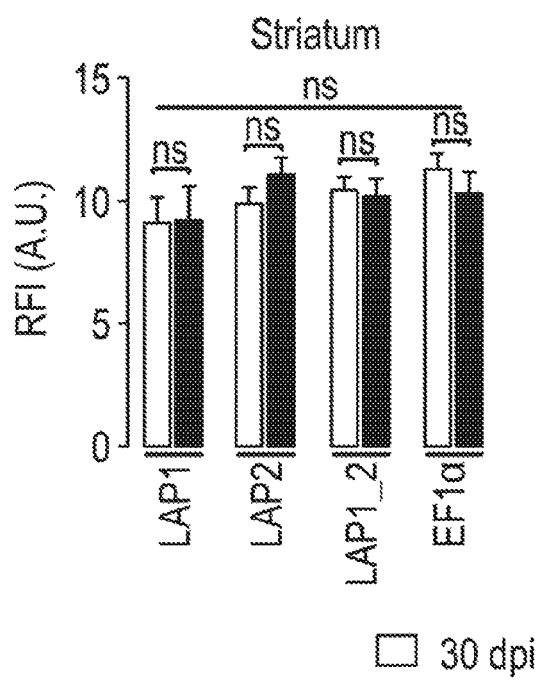
FIG. 3I3
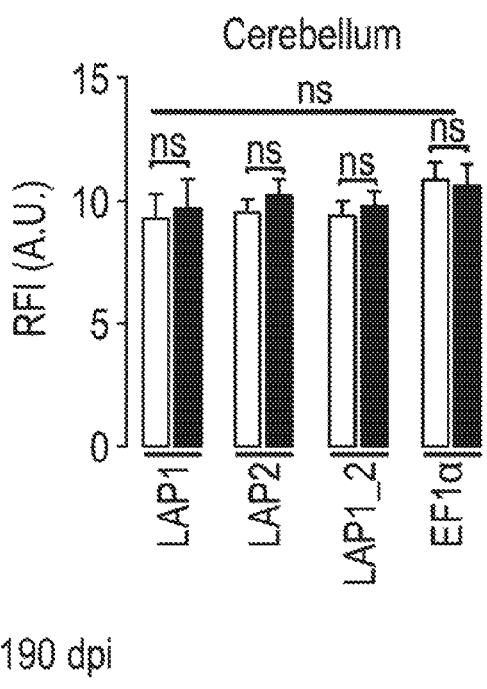
FIG. 3I4

FIG. 3J1 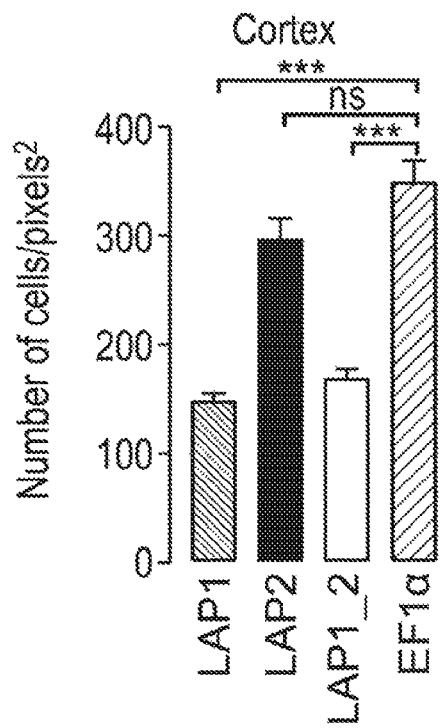
FIG. 3J2 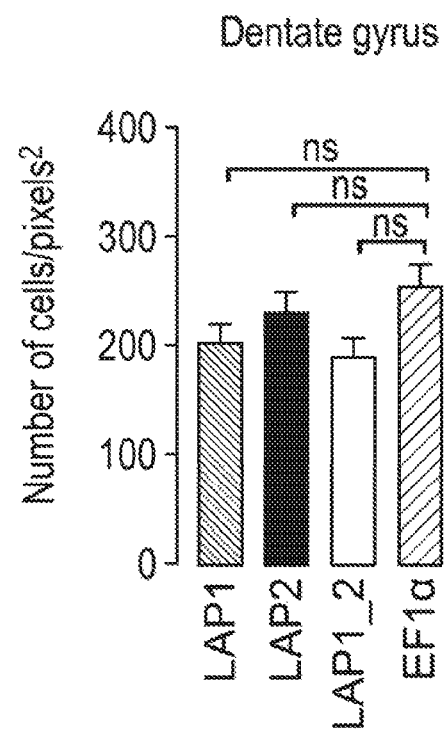
FIG. 3J3 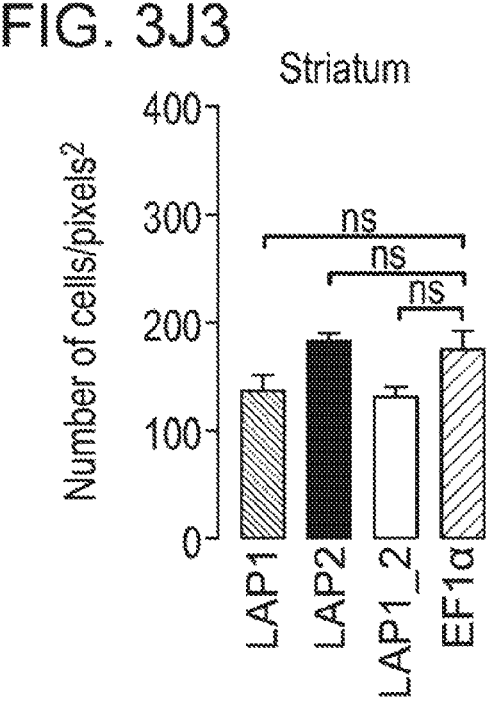
FIG. 3J4 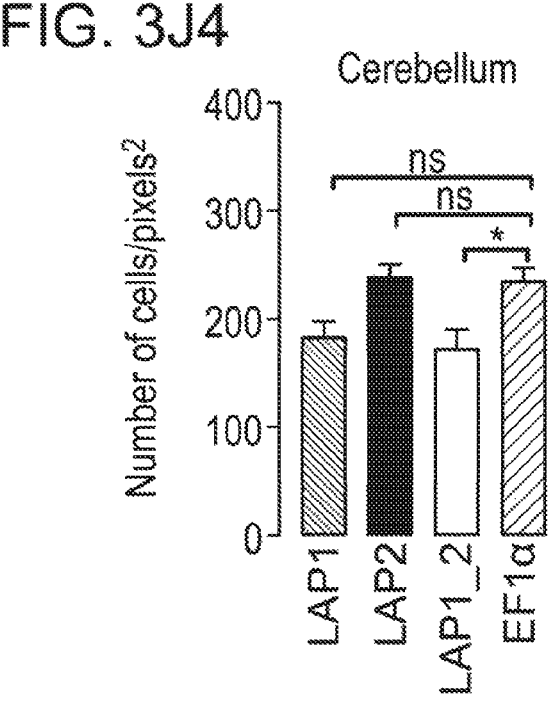

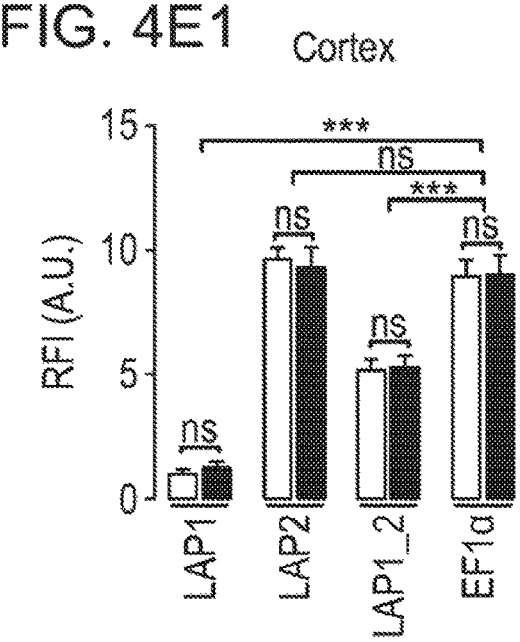
FIG. 4E1 Cortex
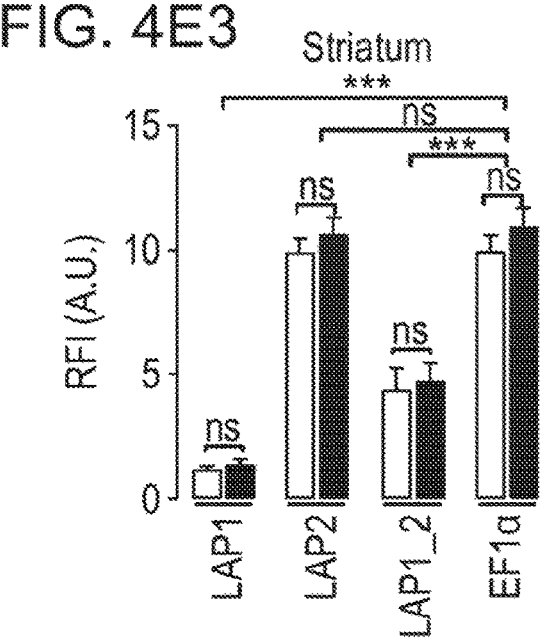
FIG. 4E3 Striatum
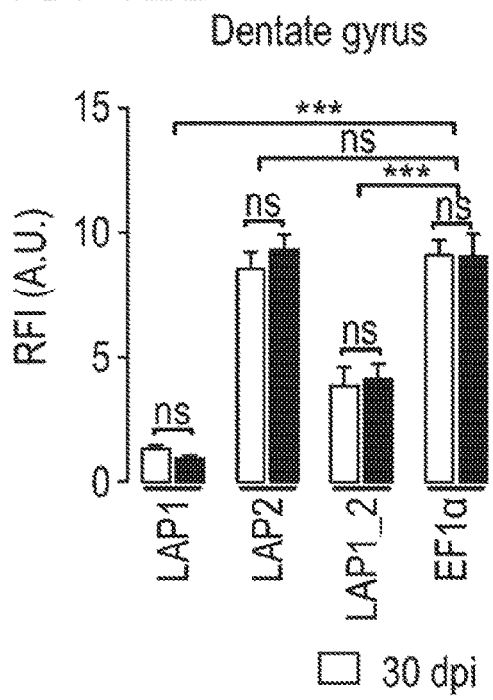
FIG. 4E2 Dentate gyrus
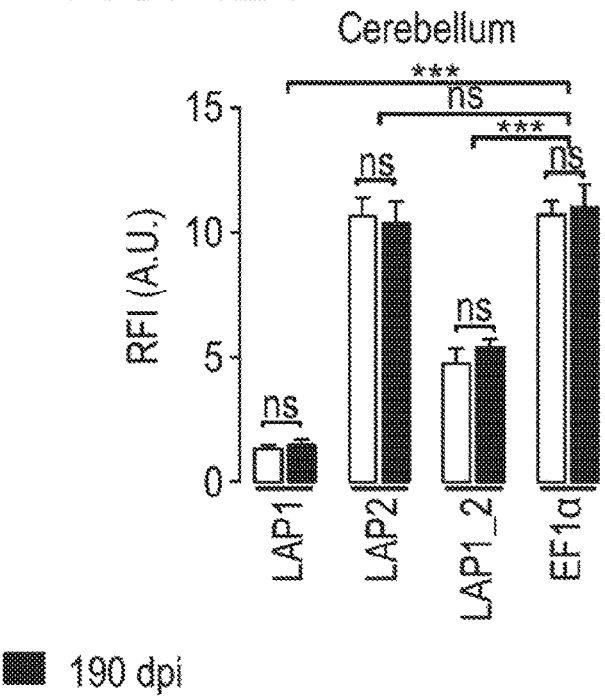
FIG. 4E4 Cerebellum
□ 30 dpi   ■ 190 dpi

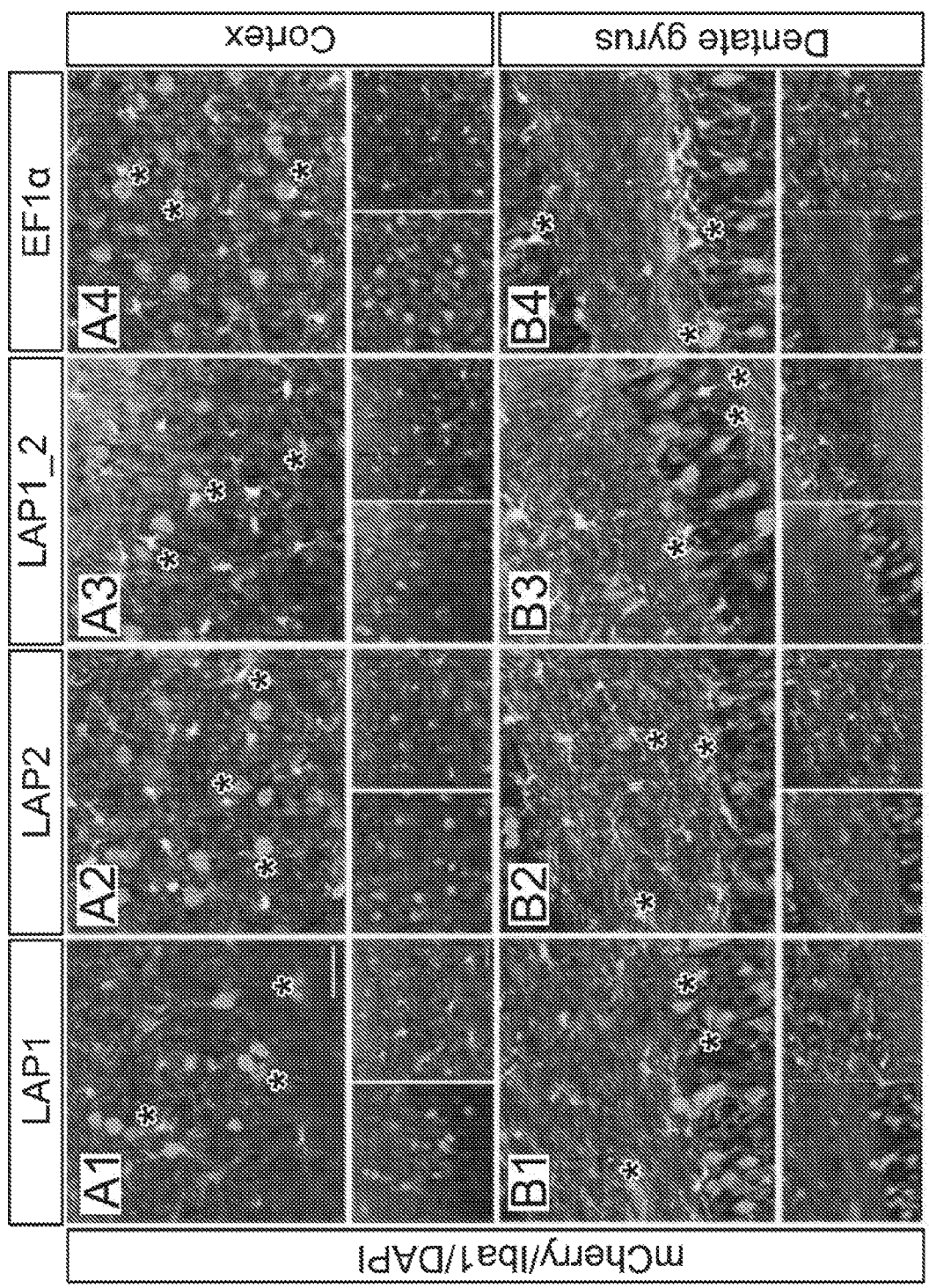

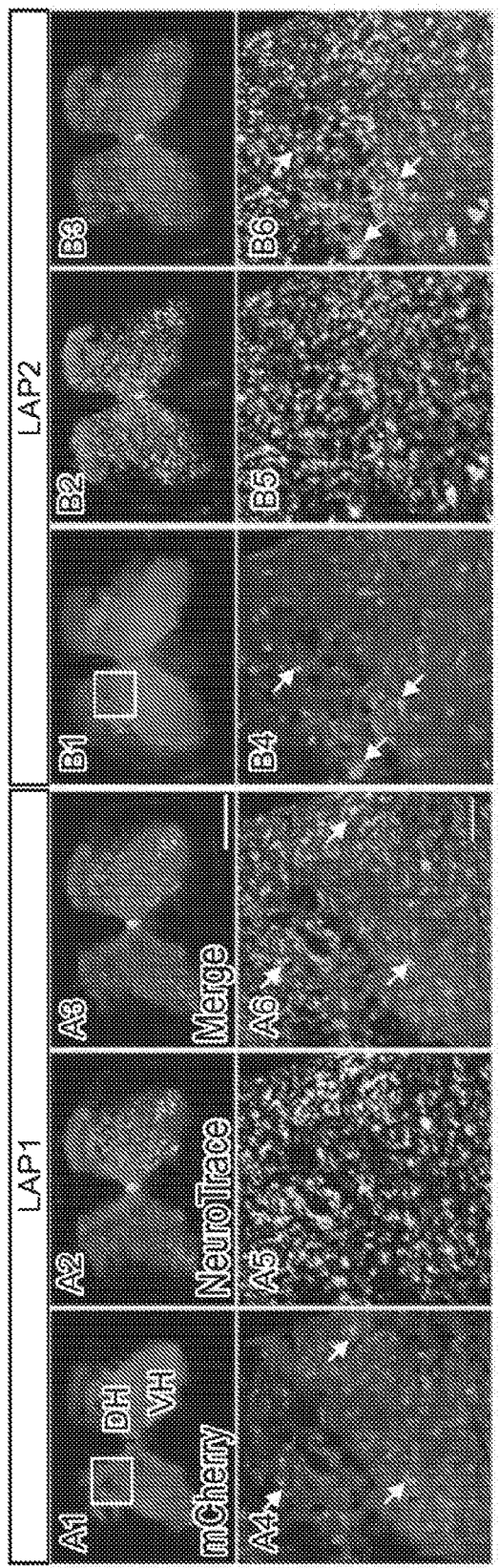
FIG. 8A
FIG. 8B
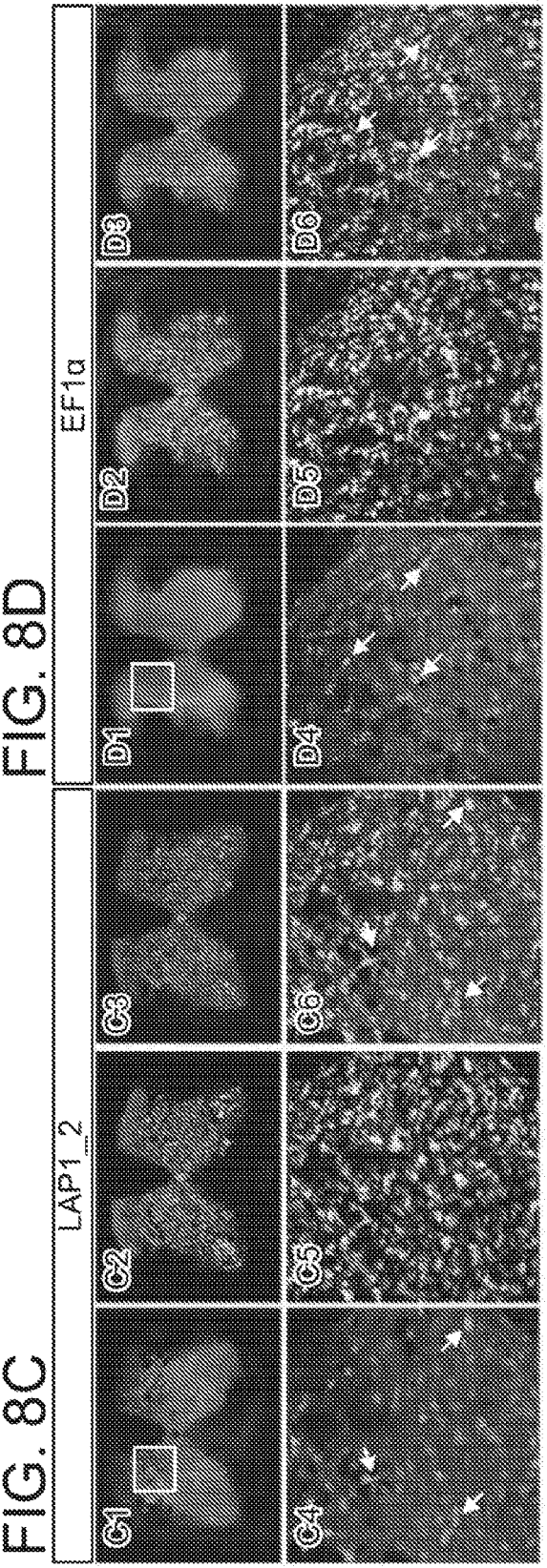
FIG. 8C
FIG. 8D

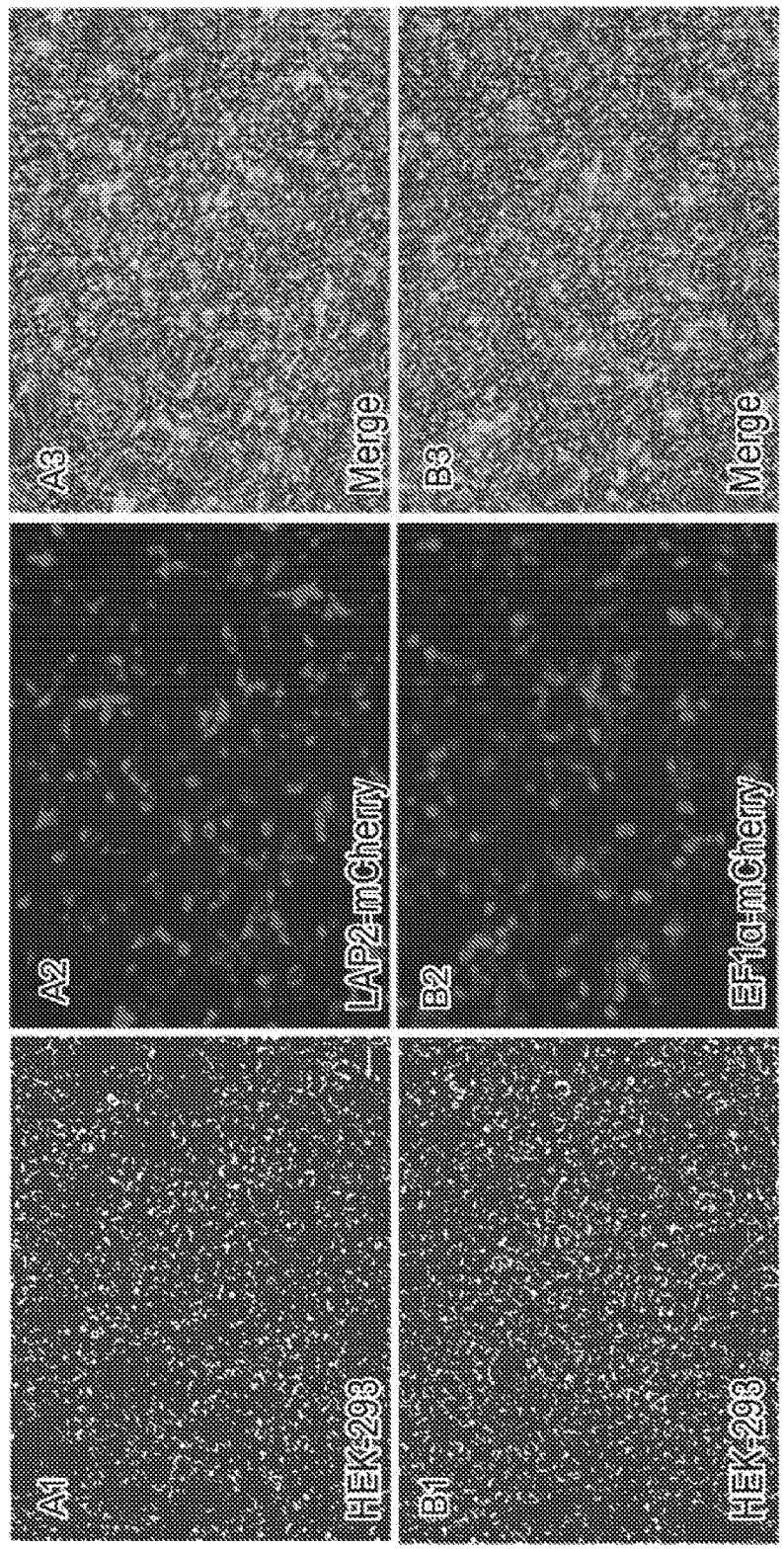

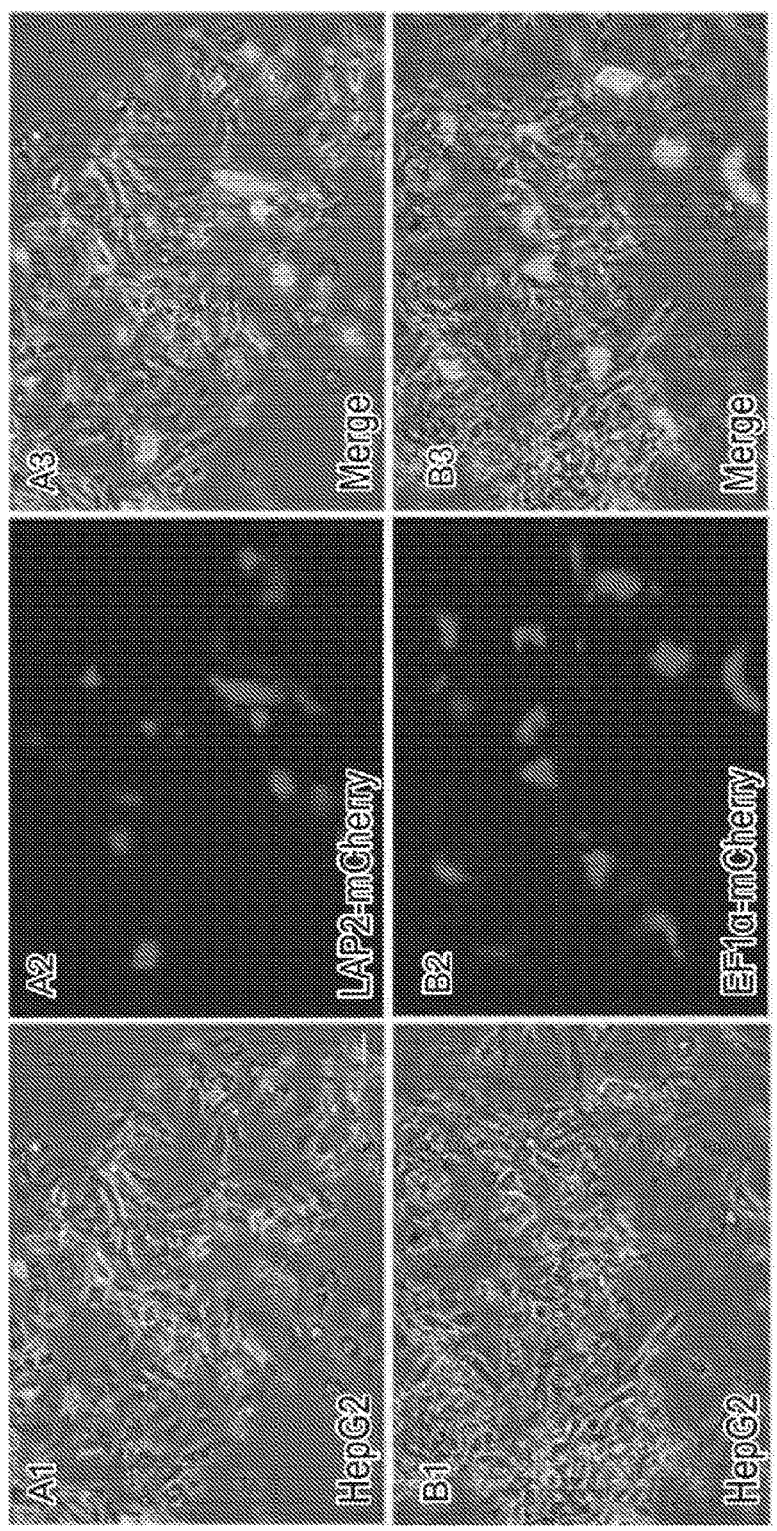

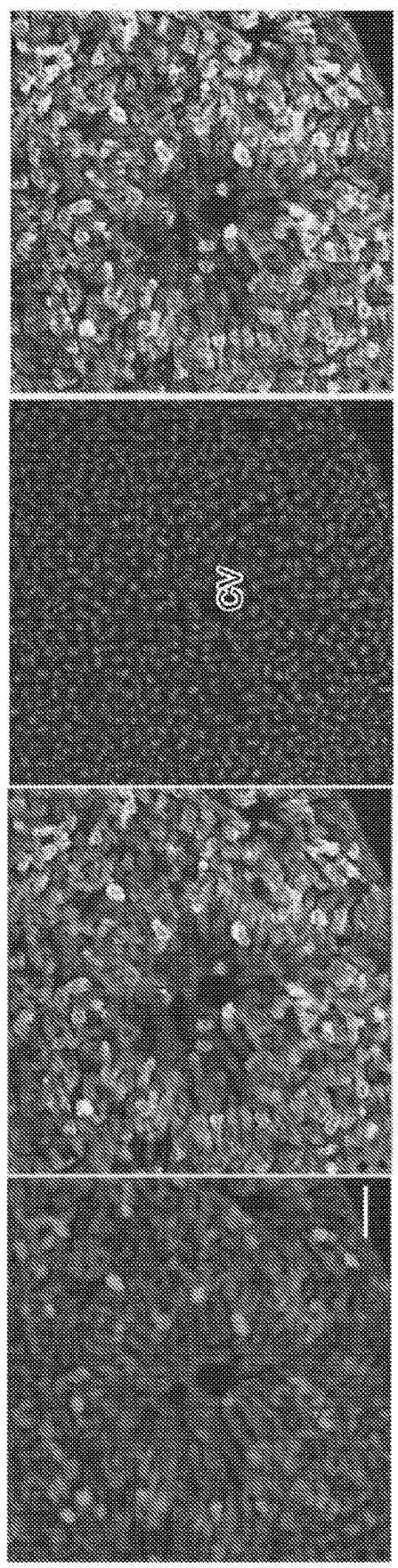
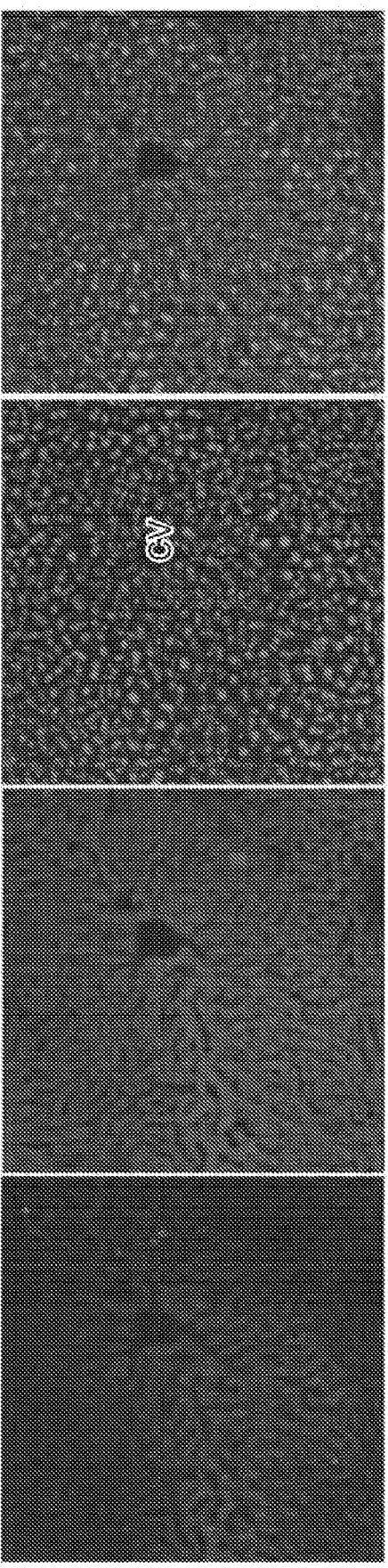

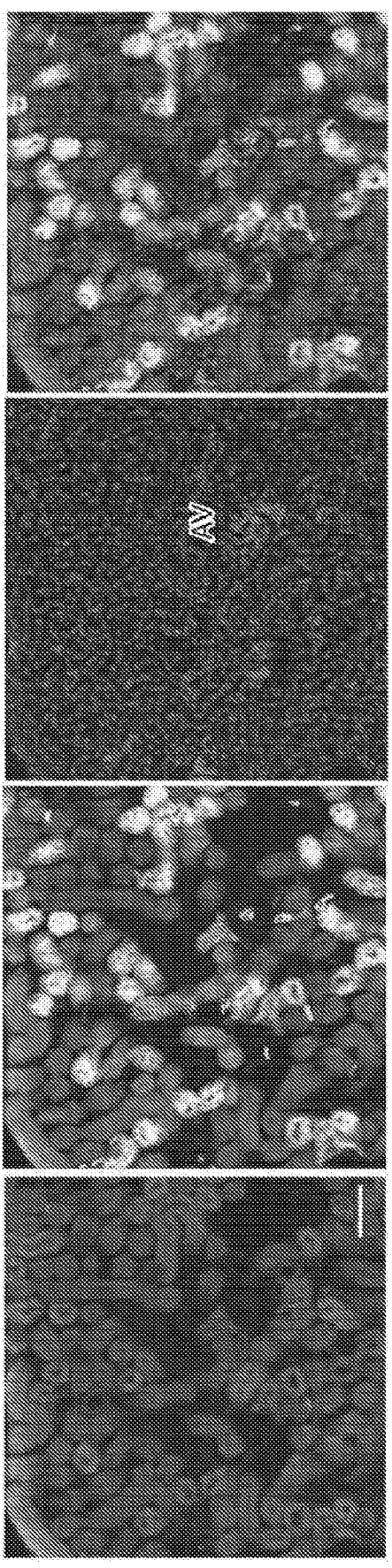
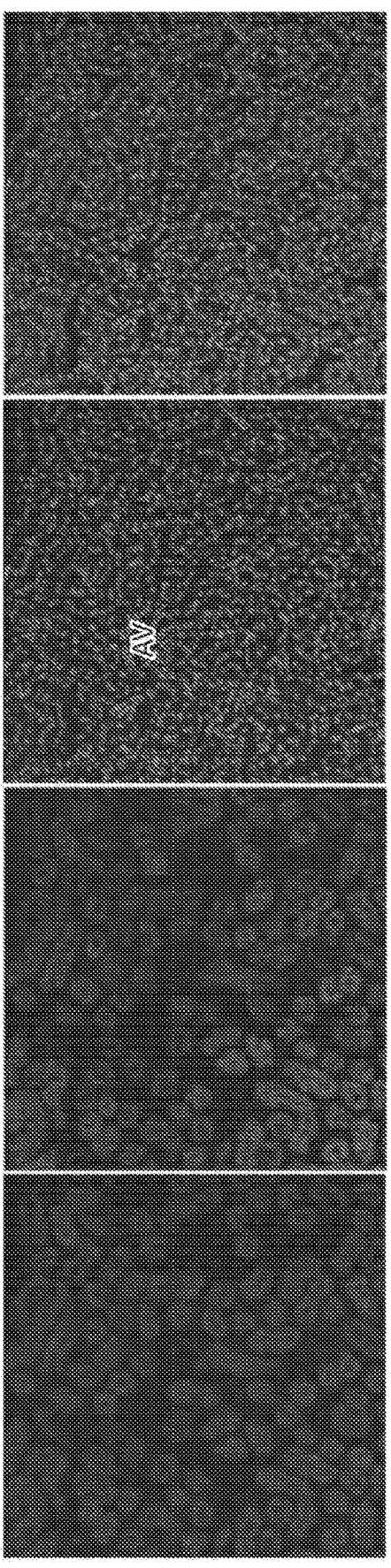

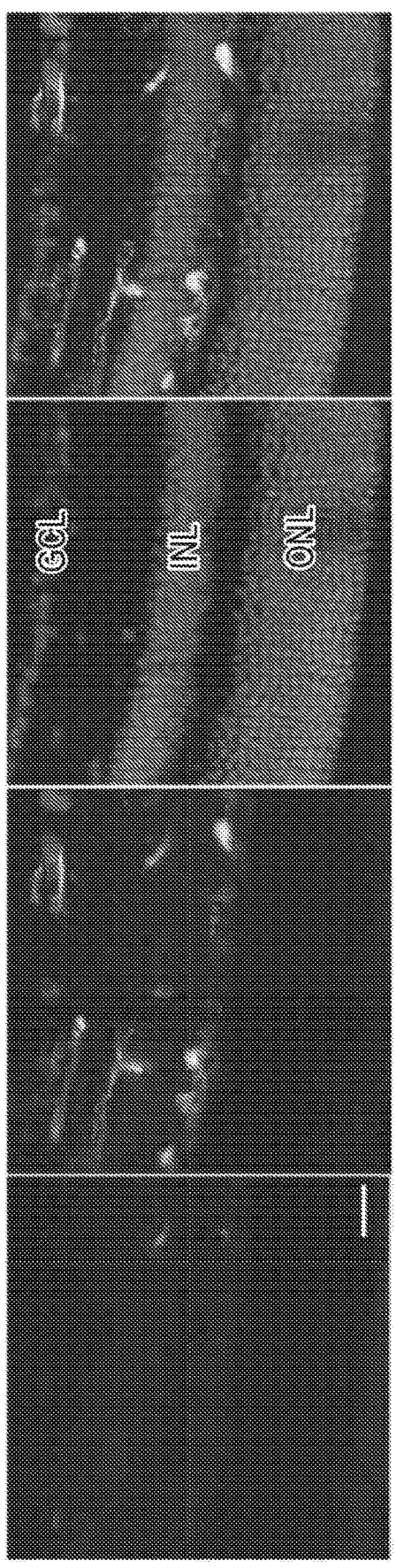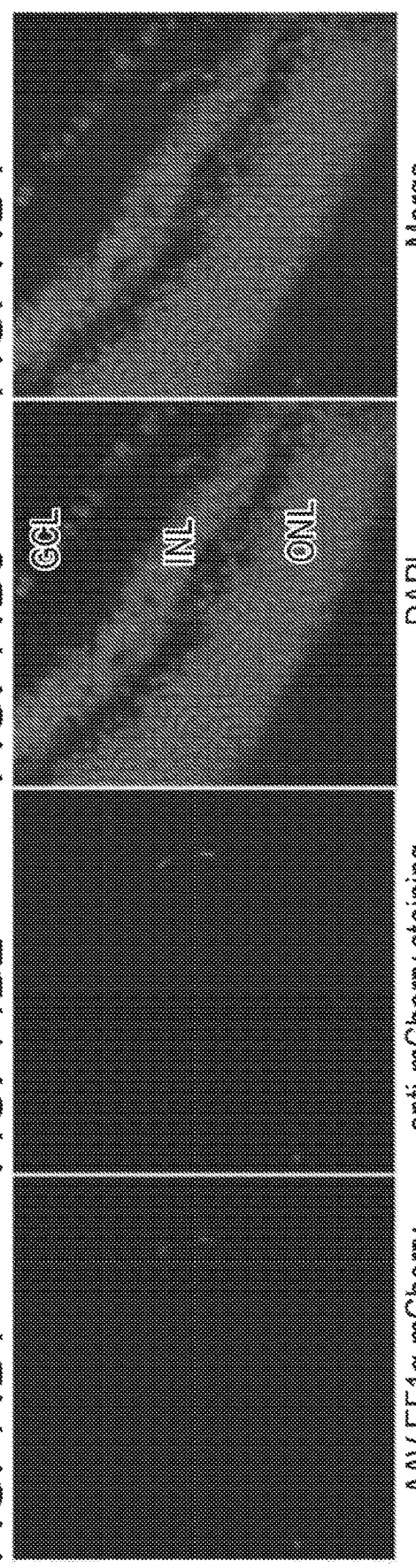

SEQUENCE LISTING

<160> NUMBER OF SEQ ID NOS: 62

<210> SEQ ID NO 1
<211> LENGTH: 498
<212> TYPE: DNA
<213> ORGANISM: PSEUDORABIES VIRUS

<400> SEQUENCE: 1

```
gggggagtcg gggggagtc ggggggagt cggggggtcc cagttcggcg cggtctccac      60
agcgcacaaa gtccggctgc agtaaattta ctgcgggtgc agttaccctg gcggccacac     120
cggcccgatg gcgctgcagt aactctactg cagctacagt ttactacagt tgcagtaccg     180
cgcgccgccg ccaaatacta cagtagattt cctgtggccg ccgcgtactg cagtttaccg     240
cggctgcagt aaactgcagt atcgcgcggt aaattgcagt ctggcagccg cgcgttactg     300
caattagcgg tggctcccga cactctggcc aattggtgct aatgggccgt gatggtccat     360 gtggggtga tgtaaccgcc gggcccggtt gggcactcag atggtggccg ggcgccaggc     420
caaagtgctg tctgagtgcc actttatgac tttgtttttc tcaaacaaca tcaattatgg     480
atgcacatcg tgtatata                                                  498
```

<210> SEQ ID NO 2
<211> LENGTH: 404
<212> TYPE: DNA
<213> ORGANISM: PSEUDORABIES VIRUS

<400> SEQUENCE: 2

```
atccccggtc cgcgctccgc ccacccatca cagcagccgc ggacgctgcg cgccggagcg      60
gtccatctcg ccagccagcc aaccagccga gccgcccagc cgacccgaga gccccgagag     120
ccagactccc tcagccatag aagacaccgg gcgggagaga cggactgaaa aaatatatct     180 tttttattt tgtctgggcc tggagacccg cagcaggagc ggaggtgggt gcggggccgg     240
gagccggagc aggaccggga acaggaacag gaacaggaac aggaacagga acaggagtgg     300
ggccgggagc aggagcagga gcgggagccg aagtggggc aggagcggcg gcggccgcag     360
cagcaacagg gtcgccccag tccgcggcga ggaagaggga gctc                     404
```

<210> SEQ ID NO 3
<211> LENGTH: 880
<212> TYPE: DNA
<213> ORGANISM: PSEUDORABIES VIRUS

<400> SEQUENCE: 3

```
gggggagtcg gggggtccca gttcggcgcg gtctccacag cgcacaaagt ccggctgcag      60
taaatttact gcgggtgcag ttaccctggc ggccacaccg gcccgatggc gctgcagtaa     120
```

```
ctctactgca gctacagttt actacagttg cagtaccgcg cgccgccgcc aaatactaca    180
gtagatttcc tgtggccgcc gcgtactgca gtttaccgcg gctgcagtaa actgcagtat    240
cgcgcggtaa attgcagtct ggcagccgcg cgttactgca attagcggtg gctcccgaca    300
ctctggccaa ttggtgctaa tgggccgtga tggtccatgt gggggtgatg taaccgccgg    360
gcccggttgg gcactcagat ggtggccggg cgccaggcca agtgctgtc tgagtgccac     420
tttatgactt tgttttttctc aaacaacatc aattatggat gcacatcgtg tatataatcc    480
ccggtccgcg ctccgcccac ccatcacagc agccgcggac gctgcgcgcc ggagcggtcc    540
atctcgccag ccagccaacc agccgagccg cccagccgac ccgagagccc cgagagccag    600
actccctcag ccatagaaga caccgggcgg gagagacgga ctgaaaaaat atatcttttt    660
ttattttgtc tgggcctgga gacccgcagc aggagcggga gtgggtgcgg ggccgggagc    720
cggagcagga ccgggaacag gaacaggaac aggaacagga acaggaacag gagtgggggcc    780
gggagcagga gcaggagcgg gagccgaagt ggggcagga gcggcggcgg ccgcagcagc     840
aacagggtcg ccccagtccg cggcgaggaa gagggagctc                            880

<210> SEQ ID NO 4
<211> LENGTH: 902
<212> TYPE: DNA
<213> ORGANISM: PSEUDORABIES VIRUS

<400> SEQUENCE: 4
gggggagtcg gggggagtc ggggggagt cggggggtcc cagttcggcg cggtctccac      60
agcgcacaaa gtccggctgc agtaaattta ctgcgggtgc agttaccctg gcggccacac    120
cggcccgatg gcgctgcagt aactctactg cagctacagt ttactacagt tgcagtaccg    180
cgcgccgccg ccaaatacta cagtagattt cctgtggccg ccgcgtactg cagtttaccg    240
cggctgcagt aaactgcagt atcgcgcggt aaattgcagt ctggcagccg cgcgttactg    300
caattagcgg tggctcccga cactctggcc aattggtgct aatgggccgt gatggtccat    360
gtgggggtga tgtaaccgcc gggcccggtt gggcactcag atggtggccg gcgccaggc     420
caaagtgctg tctgagtgcc actttatgac tttgttttc tcaaacaaca tcaattatgg    480
atgcacatcg tgtatataat ccccggtccg cgctccgccc acccatcaca gcagccgcgg    540
acgctgcgcg ccggagcggt ccatctcgcc agccagccaa ccagccgagc cgcccagccg    600
acccgagagc cccgagagcc agactccctc agccatagaa gacaccgggc gggagagacg    660
gactgaaaaa atatatcttt ttttatttg tctgggcctg gagacccgca gcaggagcgg    720
aggtgggtgc ggggccggga gccggagcag gaccgggaac aggaacagga acaggaacag    780
gaacaggaac aggagtgggg ccgggagcag gagcaggagc gggagccgaa gtggggcag     840
gagcggcggc ggccgcagca gcaacagggt cgccccagtc cgcggcgagg aagagggagc    900
tc                                                                   902

<210> SEQ ID NO 5
<211> LENGTH: 1054
<212> TYPE: DNA
<213> ORGANISM: EQUINE HERPES VIRUS

<400> SEQUENCE: 5
gggctcggcg gcggggagcc tcggtgatgg gcagcaccag gggctcggcc tcggcgtcgg     60
gctccagcag cgccacccgg cagaactcgc tcagcagctc ggggatcaga agctccgagg    120
```

```
gctccacggc cccagcgccg cgccggccgc aggcgaggta cacggggcgc agccaggccc      180
cgagtcccca tcggttggcc gcgcggtggc tctgcgcggc gccctcctca aagtccgggt      240
cgtggaaccc gaggccctcg gcctgggccc gcatgtcctt gcagccgtcg tagtcgggca      300
ggacgcgctg gcggtactcc ctcggagcca ggggaacgcg ggtgcgctcg ccggcgcgag      360
tgtccaccgt gtaggccacg ttggaggagc ggcacagcct caggggcgca gagtccgggt      420
acaggcgcgc gaacgcggcc tcggccctcg cgaacagtcc gggcccgaag agggtgctgg      480
aggtgaggac cgcgcggctg aggtggcgct cccggggcca gcgcacggcg caggcgaccc      540
gcggagtcag ggcggcccgc atgtagatgt ggtactggct gatcgcggga ccgtcctggg      600
gccaatcctc ggtggagacc gcgtccagca ccaggagctt gcgcctggcg gagcccaggc      660
gcaggcagag gtactcgacg cagccggtga aggccaggtc cccggtcgac agcagcagga      720
cccccctggg cgttgagggc gagacgtccg ggccccggt ccagttgccg gcccaggcgt       780
gggaccgctt ggtgaggatg cggttcccca gggccgccag cagcgccgag agtccccct       840
tgaggtcgga ccagaggggc tcgcgccgag agccgccggg gcgggaggcc gggagtccgc      900
ccagcaggtc ctcgtcctgg agcggggagt agaggaccac caccttcacg tcctcggggt      960
cggggatctg gtgcatccag gcggccctcc gtctcagcgg gccgctggcc gccagctccc     1020
cgaagcgcgc gccgtcccgg gccgggggggc cgct                                1054
```

<210> SEQ ID NO 6
<211> LENGTH: 966
<212> TYPE: DNA
<213> ORGANISM: BOVINE HERPES VIRUS

<400> SEQUENCE: 6

```
gctccagtcg acgccgcccc ggccgtgctg ctccaggaac gcgttggcct cggcaaagtg       60
cgtgcagtga acgaagggcg ctcgtgacag cggcgagggg tggctgtacg tcagcacgag      120
gtgccgcttc ccggccgccc caaaggcccg ctgggcgtgc gcgccccaga gcatgaacac      180
cagcgggccg ctctccgcgc tcaggcgggc cagtaccgcg tgcaccagcc gcccccagcc      240
caggctagag tgcgagcccg cgcccccgct ccgcacggtg agcgaggtgt taagcagcag      300
cacgccgcgg cgcgcccagt cctctaggca gccgtgcgac ggccgcggag ctccgggaaa      360
gttcttctgc acggcagcgt agatgttctg gaggctgggt gggaccggaa cgccgcggtt      420
cacgctaaaa gccaagccgt gggcttgccc gcggctgtga tagggggtcct ggcccagaat     480
gacaaccttg atgtcctcgg gtgccgcgta acgcgtccac gcgaagatgt ccgctttcgg      540
aggcagcact tgctcgacgc ggctccggcg ctcgtattcg cgcagcgcgt gtcgcgtgta      600
gggcatggcc agctcgggtt ccagcacgcg ccgccaggct tcgtggacgc caaattcagc      660
ggcgaatgcc ccccaagtaa tggcacgctg gtcttctagc gctgttacgc acgcgggaag      720
tccattgggg cgccggcgct tgggcggcgc ggcaccccgc aagcggggac aaagactttc      780
ggcgcgtttg ggccgaagcc ggggccgaag ccggggccga agccggggcc gaagccgggg      840
ccgaagccgg ggccgaagcc ggggccgaag ccggggccgg ggccggggcc gggggcatcgc    900
tagcggtaga tgccgtcgcc agggccgcag ggaccagtcg tgtggtatcg gggcggcagg      960
acgcac                                                                966
```

<210> SEQ ID NO 7
<211> LENGTH: 979
<212> TYPE: DNA
<213> ORGANISM: VARICELLA ZOSTER VIRUS

<400> SEQUENCE: 7

```
cggggaggtg gggtcgcttt ttttttctc tctcgagggg gccgcgagag ggctggcctc        60
ctctcccggg gtccgccggg cgcccagaaa ccggggggg gttatttcg ggggggtc         120
cgaccagccc gcccgtcgcc cgcccgcaca gacagacaga cactttttc ataaaaccg        180
ttccgcttt attaacaaca aacagtccgc gcgccagtgg cgctcacgag aaaaggaggg        240
gactccgtca cccccgactc tgcgggggc tcctccccc gcgccctccc cacacatcgt        300
cctcgtcctc ggaggacgag gacgaggaca acagctccac cttgaccgcc gggcgcaaac      360
ccaccccggcg gtctcgcagc acacccgggg ccaccgacac gatgctcacc ccaaaggatg     420
accccggtgc gtccccgtcg tccccgcccc cctcctcgct gtcccacgcg tcttcacacc      480
ccacctccca atcgtccagc tccaaagcgt gttctctgtc gtctgcggtg cgccgctgtc      540
gccccgcctg ggtttctgac ggccgttccg agccccgtg gtgtccgaac acgaaccgtg       600
ttccgtcgct cccctccaac accgtctccg cggccccaaa accgggcggc cacattactc      660
tgggaatcgg ggggagggca ttccgagcct cgtccgccga cgcatacagc gccaccgacc      720
gaccggccac gggtggaagc acgagtggtt ctgcggcagg gtcgggttcc agcagggcgt      780
ggcggcaaaa caccctcgcc caggtgggta cgtcgccggc ctccggcccg gcggccccg      840
gtctccgtcc ctcgggaagg aagacgggtc gaagcgcggc acccaggccc catcggtttg     900
ctgcgcggtg gctatgtgcc gcctcgtcca caaagtcggc tgccccgagc cccagacccc      960
gagactgtcg cgcgaggtc                                                   979
```

<210> SEQ ID NO 8
<211> LENGTH: 1021
<212> TYPE: DNA
<213> ORGANISM: MACACINE HERPES-VIRUS 1

<400> SEQUENCE: 8

```
gagcgcggcg cgccaggcct cggggaagag cgggtggtcg gtcagctcgg cgacgacgcg        60
cggggcgcag taggcctcga gggcggcggc ggagggcgcc ggcgtgtggc tgggccccgg      120
cggcacgcgg cgccagccgc cgcggggtc gggcccggcg ggcggtcgcg ccgtcagcgc      180
ggcgggccgc gggcgcgggc ccggggccgg cggccccggg ggcggggccg ggcgccggg       240
ccggctcttc ttgcgcgccg gcgggcaggc ggcggcggcg gcgggcgggc gcgccggcga      300
ggagctcttg cgcttgcgcg ccggcgggcg cgcggcgccg cccgcgtctg cgtcggccag      360
caggggcgc aggctctggt tctggaagag caggtcggcg gcggcggcgc cggcggagcg       420
cacctggcgc gggccgcgcg ccagcagcgg cgcggcggcg ccggcgacga ggctgacggc      480
gcgcacggcg gcgacggcgg cctcggcgcc gccggcgacg cggaggtccc cgcgcaggcg      540
catgagcacc agcgcgtcgc gcgtgcggcg cagctcgcgc agccagaggc gcgggcgcgg      600
cggcgcggcg gcggggccgc gcggcggcgg cacggcgcgc gcggccgcca gcccgggcac      660
ggcggccagg tcgccgccgt agccctcggc cagcgcctcc agcacggcgc ggcaggccgt      720
gaggcactcg gcggcggcgg cggccgcggc gtcgtcgtcg tcgtcgtcct cgtcctcccc      780
cgcggccccg gcggggccgt cctccccggc gccggcgggg ccctcgtcgg agagggcggc      840
cgccaggcgg cgctgcgcgg cgatgacgcc cgcgccgccg tacccggcgg gaacggcggg      900
gaccgcggcg gcgtcgggct cggggccgg ggcggcggcg gcggcggcgc ccgccgcggc       960
ggcgttctcg cgcgccagca ggggcgcgta cgcgcgccgc aggctggtga tgaggaagcc     1020
``` c                                                                      1021

<210> SEQ ID NO 9
<211> LENGTH: 232
<212> TYPE: DNA
<213> ORGANISM: PSEUDORABIES VIRUS

<400> SEQUENCE: 9
atatatcttt ttttattttg tctgggcctg gagacccgca gcaggagcgg aggtgggtgc        60
ggggccggga gccggagcag gaccgggaac aggaacagga acaggaacag gaacaggaac       120
aggagtgggg ccgggagcag gagcaggagc gggagccgaa gtgggggcag gagcggcggc       180
ggccgcagca gcaacagggt cgccccagtc cgcggcgagg aagagggagc tc               232

<210> SEQ ID NO 10
<211> LENGTH: 14
<212> TYPE: DNA
<213> ORGANISM: UNKNOWN
<220> FEATURE:
<223> OTHER INFORMATION: CTCF MOTIF

<400> SEQUENCE: 10
ccgcgaggag gcag                                                          14

<210> SEQ ID NO 11
<211> LENGTH: 34
<212> TYPE: DNA
<213> ORGANISM: UNKNOWN
<220> FEATURE:
<223> OTHER INFORMATION: ALTERNATIVE CTCF WITH UPSTREAM STABILIZER MOTIF

<400> SEQUENCE: 11
tggtgccctc tggtggtctt ctagaggaat tgca                                    34

<210> SEQ ID NO 12
<211> LENGTH: 16
<212> TYPE: DNA
<213> ORGANISM: UNKNOWN
<220> FEATURE:
<223> OTHER INFORMATION: NUCLEAR TRANSCRIPTION FACTOR Y (NF-Y) MOTIF

<400> SEQUENCE: 12
tcagccaatc agcgag                                                        16

<210> SEQ ID NO 13
<211> LENGTH: 232
<212> TYPE: DNA
<213> ORGANISM: PSEUDORABIES VIRUS

<400> SEQUENCE: 13
atatatcttt ttttattttg tctgggcctg gagacccgca gcaggagcgg aggtgggtgc        60
ggggccggga gccggagcag gaccgggaac aggaacagga acaggaacag gaacaggaac       120
aggagtgggg ccgggagcag gagcaggagc gggagccgaa gtgggggcag gagcggcggc       180
ggccgcagca gcaacagggt cgccccagtc cgcggcgagg aagagggagc tc               232

<210> SEQ ID NO 14
<211> LENGTH: 246
<212> TYPE: DNA
<213> ORGANISM: PSEUDORABIES VIRUS

<400> SEQUENCE: 14
atatatcttt ttttattttg tctgggcctg gagacccgca gcaggagcgg aggtgggtgc        60

```
ggggccggga gccggagcag gaccgggaac aggaacagga acaggaacag gaacaggaac        120
aggagtgggg ccgggagcag gagcaggagc gggagccgaa gtgggggcag gagcggcggc        180
ggccgcagca gcaacagggt cgccccagtc cgcggcgagg aagagggagc tcccgcgagg        240
aggcag                                                                   246

<210> SEQ ID NO 15
<211> LENGTH: 266
<212> TYPE: DNA
<213> ORGANISM: PSEUDORABIES VIRUS

<400> SEQUENCE: 15
atatatcttt ttttattttg tctgggcctg gagacccgca gcaggagcgg aggtgggtgc         60
ggggccggga gccggagcag gaccgggaac aggaacagga acaggaacag gaacaggaac        120
aggagtgggg ccgggagcag gagcaggagc gggagccgaa gtgggggcag gagcggcggc        180
ggccgcagca gcaacagggt cgccccagtc cgcggcgagg aagagggagc tctggtgccc        240
tctggtggtc ttctagagga attgca                                             266

<210> SEQ ID NO 16
<211> LENGTH: 248
<212> TYPE: DNA
<213> ORGANISM: PSEUDORABIES VIRUS

<400> SEQUENCE: 16
tcagccaatc agcgagatat atctttttttt attttgtctg ggcctggaga cccgcagcag         60
gagcggaggt gggtgcgggg ccgggagccg gagcaggacc gggaacagga acaggaacag        120
gaacaggaac aggaacagga gtggggccgg gagcaggagc aggagcggga gccgaagtgg        180
gggcaggagc ggcggcggcc gcagcagcaa cagggtcgcc ccagtccgcg gcgaggaaga        240
gggagctc                                                                 248

<210> SEQ ID NO 17
<211> LENGTH: 246
<212> TYPE: DNA
<213> ORGANISM: PSEUDORABIES VIRUS

<400> SEQUENCE: 17
ccgcgaggag gcagatatat ctttttttat tttgtctggg cctggagacc cgcagcagga         60
gcggaggtgg gtgcggggcc gggagccgga gcaggaccgg gaacaggaac aggaacagga        120
acaggaacag gaacaggagt ggggccggga gcaggagcag gagcgggagc cgaagtgggg        180
gcaggagcgg cggcggccgc agcagcaaca gggtcgcccc agtccgcggc gaggaagagg        240
gagctc                                                                   246

<210> SEQ ID NO 18
<211> LENGTH: 266
<212> TYPE: DNA
<213> ORGANISM: PSEUDORABIES VIRUS

<400> SEQUENCE: 18
tggtgccctc tggtggtctt ctagaggaat tgcaatatat ctttttttat tttgtctggg         60
cctggagacc cgcagcagga gcggaggtgg gtgcggggcc gggagccgga gcaggaccgg        120
gaacaggaac aggaacagga acaggaacag gaacaggagt ggggccggga gcaggagcag        180
gagcgggagc cgaagtgggg gcaggagcgg cggcggccgc agcagcaaca gggtcgcccc        240
```
agtccgcggc gaggaagagg gagctc                                              266

<210> SEQ ID NO 19
<211> LENGTH: 248
<212> TYPE: DNA
<213> ORGANISM: PSEUDORABIES VIRUS

<400> SEQUENCE: 19
atatatcttt ttttattttg tctgggcctg gagacccgca gcaggagcgg aggtgggtgc          60
ggggccggga gccggagcag gaccgggaac aggaacagga acaggaacag gaacaggaac         120
aggagtgggg ccgggagcag gagcaggagc gggagccgaa gtggggcag gagcggcggc          180
ggccgcagca gcaacagggt cgccccagtc cgcggcgagg aagagggagc tctcagccaa         240
tcagcgag                                                                  248

<210> SEQ ID NO 20
<211> LENGTH: 236
<212> TYPE: DNA
<213> ORGANISM: PSEUDORABIES VIRUS

<400> SEQUENCE: 20
aaaaatatat cttttttat tttgtctggg cctggagacc cgcagcagga gcggaggtgg           60
gtgcggggcc gggagccgga gcaggaccgg gaacaggaac aggaacagga acaggaacag         120
gaacaggagt ggggccggga gcaggagcag gagcgggagc cgaagtgggg gcaggagcgg         180
cggcggccgc agcagcaaca gggtcgcccc agtccgcggc gaggaagagg gagctc            236

<210> SEQ ID NO 21
<211> LENGTH: 250
<212> TYPE: DNA
<213> ORGANISM: PSEUDORABIES VIRUS

<400> SEQUENCE: 21
aaaaatatat cttttttat tttgtctggg cctggagacc cgcagcagga gcggaggtgg           60
gtgcggggcc gggagccgga gcaggaccgg gaacaggaac aggaacagga acaggaacag         120
gaacaggagt ggggccggga gcaggagcag gagcgggagc cgaagtgggg gcaggagcgg         180
cggcggccgc agcagcaaca gggtcgcccc agtccgcggc gaggaagagg gagctcccgc         240
gaggaggcag                                                                250

<210> SEQ ID NO 22
<211> LENGTH: 270
<212> TYPE: DNA
<213> ORGANISM: PSEUDORABIES VIRUS

<400> SEQUENCE: 22
aaaaatatat cttttttat tttgtctggg cctggagacc cgcagcagga gcggaggtgg           60
gtgcggggcc gggagccgga gcaggaccgg gaacaggaac aggaacagga acaggaacag         120
gaacaggagt ggggccggga gcaggagcag gagcgggagc cgaagtgggg gcaggagcgg         180
cggcggccgc agcagcaaca gggtcgcccc agtccgcggc gaggaagagg gagctctggt         240
gccctctggt ggtcttctag aggaattgca                                          270

<210> SEQ ID NO 23
<211> LENGTH: 252
<212> TYPE: DNA
<213> ORGANISM: PSEUDORABIES VIRUS

<400> SEQUENCE: 23

```
tcagccaatc agcgagaaaa atatatcttt ttttattttg tctgggcctg gagacccgca      60
gcaggagcgg aggtgggtgc ggggccggga gccggagcag gaccgggaac aggaacagga     120
acaggaacag gaacaggaac aggagtgggg ccgggagcag gagcaggagc gggagccgaa     180 gtggggcag gagcggcggc ggccgcagca gcaacagggt cgccccagtc cgcggcgagg      240
aagagggagc tc                                                         252
```

<210> SEQ ID NO 24
<211> LENGTH: 250
<212> TYPE: DNA
<213> ORGANISM: PSEUDORABIES VIRUS

<400> SEQUENCE: 24

```
ccgcgaggag gcagaaaaat atatcttttt ttattttgtc tgggcctgga gacccgcagc      60
aggagcggag gtgggtgcgg ggccgggagc cggagcagga ccgggaacag gaacaggaac     120
aggaacagga acaggaacag gagtgggcc gggagcagga gcaggagcgg gagccgaagt      180
gggggcagga gcggcggcgg ccgcagcagc aacagggtcg ccccagtccg cggcgaggaa     240
gagggagctc                                                            250
```

<210> SEQ ID NO 25
<211> LENGTH: 270
<212> TYPE: DNA
<213> ORGANISM: PSEUDORABIES VIRUS

<400> SEQUENCE: 25

```
tggtgccctc tggtggtctt ctagaggaat tgcaaaaaat atatcttttt ttattttgtc      60
tgggcctgga gacccgcagc aggagcggag gtgggtgcgg ggccgggagc cggagcagga     120
ccgggaacag gaacaggaac aggaacagga acaggaacag gagtggggcc gggagcagga     180
gcaggagcgg gagccgaagt gggggcagga gcggcggcgg ccgcagcagc aacagggtcg     240
ccccagtccg cggcgaggaa gagggagctc                                      270
```

<210> SEQ ID NO 26
<211> LENGTH: 252
<212> TYPE: DNA
<213> ORGANISM: PSEUDORABIES VIRUS

<400> SEQUENCE: 26

```
aaaaatatat ctttttttat tttgtctggg cctggagacc cgcagcagga gcggaggtgg      60
gtgcggggcc gggagccgga gcaggaccgg gaacaggaac aggaacagga acaggaacag     120
gaacaggagt ggggccggga gcaggagcag gagcgggagc cgaagtgggg gcaggagcgg     180
cggcggccgc agcagcaaca gggtcgcccc agtccgcggc gaggaagagg gagctctcag     240
ccaatcagcg ag                                                         252
```

<210> SEQ ID NO 27
<211> LENGTH: 329
<212> TYPE: DNA
<213> ORGANISM: PSEUDORABIES VIRUS

<400> SEQUENCE: 27

```
cagccaacca gccgagccgc ccagccgacc cgagagcccc gagagccaga ctccctcagc      60
catagaagac accgggcggg agagacggac tgaaaaaata tatctttttt tattttgtct     120
gggcctggag acccgcagca ggagcggagg tgggtgcggg gccgggagcc ggagcaggac     180
```

```
cgggaacagg aacaggaaca ggaacaggaa caggaacagg agtggggccg ggagcaggag      240
caggagcggg agccgaagtg ggggcaggag cggcggcggc cgcagcagca acagggtcgc      300
cccagtccgc ggcgaggaag agggagctc                                        329

<210> SEQ ID NO 28
<211> LENGTH: 383
<212> TYPE: DNA
<213> ORGANISM: PSEUDORABIES VIRUS

<400> SEQUENCE: 28
cacccatcac agcagccgcg gacgctgcgc gccggagcgg tccatctcgc cagccagcca       60
accagccgag ccgcccagcc gacccgagag ccccgagagc cagactccct cagccataga      120
agacaccggg cgggagagac ggactgaaaa aatatatctt tttttatttt gtctgggcct      180
ggagacccgc agcaggagcg gaggtgggtg cggggccggg agccgagca ggaccgggaa       240 caggaacagg aacaggaaca ggaacaggaa caggagtggg gccggagca ggagcaggag       300 cgggagccga gtgggggca ggagcggcgg cggccgcagc agcaacaggg tcgccccagt       360
ccgcggcgag gaagagggag ctc                                              383

<210> SEQ ID NO 29
<211> LENGTH: 397
<212> TYPE: DNA
<213> ORGANISM: PSEUDORABIES VIRUS

<400> SEQUENCE: 29
cacccatcac agcagccgcg gacgctgcgc gccggagcgg tccatctcgc cagccagcca       60
accagccgag ccgcccagcc gacccgagag ccccgagagc cagactccct cagccataga      120
agacaccggg cgggagagac ggactgaaaa aatatatctt tttttatttt gtctgggcct      180
ggagacccgc agcaggagcg gaggtgggtg cggggccggg agccggagca ggaccgggaa      240
caggaacagg aacaggaaca ggaacaggaa caggagtggg gccggagca ggagcaggag       300 cgggagccga gtggggca ggagcggcgg cggccgcagc agcaacaggg tcgccccagt        360
ccgcggcgag gaagagggag ctcccgcgag gaggcag                               397

<210> SEQ ID NO 30
<211> LENGTH: 417
<212> TYPE: DNA
<213> ORGANISM: PSEUDORABIES VIRUS

<400> SEQUENCE: 30
cacccatcac agcagccgcg gacgctgcgc gccggagcgg tccatctcgc cagccagcca       60
accagccgag ccgcccagcc gacccgagag ccccgagagc cagactccct cagccataga      120
agacaccggg cgggagagac ggactgaaaa aatatatctt tttttatttt gtctgggcct      180
ggagacccgc agcaggagcg gaggtgggtg cggggccggg agccggagca ggaccgggaa      240
caggaacagg aacaggaaca ggaacaggaa caggagtggg gccggagca ggagcaggag       300 cgggagccga gtggggca ggagcggcgg cggccgcagc agcaacaggg tcgccccagt        360
ccgcggcgag gaagagggag ctctggtgcc ctctggtggt cttctagagg aattgca         417

<210> SEQ ID NO 31
<211> LENGTH: 399
<212> TYPE: DNA
<213> ORGANISM: PSEUDORABIES VIRUS

<400> SEQUENCE: 31
```

-continued

```
tcagccaatc agcgagcacc catcacagca gccgcggacg ctgcgcgccg gagcggtcca    60
tctcgccagc cagccaacca gccgagccgc ccagccgacc cgagagcccc gagagccaga   120
ctccctcagc catagaagac accgggcggg agagacggac tgaaaaaata tatctttttt   180
tattttgtct gggcctggag acccgcagca ggagcggagt gggtgcggg gccgggagcc    240 ggagcaggac cgggaacagg aacaggaaca ggaacaggaa caggaacagg agtggggccg   300
ggagcaggag caggagcggg agccgaagtg ggggcaggag cggcggcggc cgcagcagca   360
acagggtcgc cccagtccgc ggcgaggaag agggagctc                          399
```

<210> SEQ ID NO 32
<211> LENGTH: 397
<212> TYPE: DNA
<213> ORGANISM: PSEUDORABIES VIRUS

<400> SEQUENCE: 32

```
ccgcgaggag gcagcaccca tcacagcagc cgcggacgct gcgcgccgga gcggtccatc    60
tcgccagcca gccaaccagc cgagccgccc agccgacccg agagcccga gagccagact   120 ccctcagcca tagaagacac cgggcgggag agacggactg aaaaaatata tcttttttta   180
ttttgtctgg gcctggagac ccgcagcagg agcggaggtg ggtgcgggc cgggagccgg   240 agcaggaccg ggaacaggaa caggaacagg aacaggaaca ggaacaggag tggggccggg    300
agcaggagca ggagcgggag ccgaagtggg ggcaggagcg gcggcggccg cagcagcaac   360
agggtcgccc cagtccgcgg cgaggaagag ggagctc                            397
```

<210> SEQ ID NO 33
<211> LENGTH: 417
<212> TYPE: DNA
<213> ORGANISM: PSEUDORABIES VIRUS

<400> SEQUENCE: 33

```
tggtgccctc tggtggtctt ctagaggaat tgcacaccca tcacagcagc cgcggacgct    60
gcgcgccgga gcggtccatc tcgccagcca gccaaccagc cgagccgccc agccgacccg   120
agagccccga gagccagact ccctcagcca tagaagacac cgggcgggag agacggactg   180
aaaaaatata tcttttttta ttttgtctgg gcctggagac ccgcagcagg agcggaggtg   240 ggtgcgggc cgggagccgg agcaggaccg ggaacaggaa caggaacagg aacaggaaca   300
ggaacaggag tggggccggg agcaggagca ggagcgggag ccgaagtggg ggcaggagcg   360
gcggcggccg cagcagcaac agggtcgccc cagtccgcgg cgaggaagag ggagctc      417
```

<210> SEQ ID NO 34
<211> LENGTH: 399
<212> TYPE: DNA
<213> ORGANISM: PSEUDORABIES VIRUS

<400> SEQUENCE: 34

```
cacccatcac agcagccgcg gacgctgcgc gccggagcgg tccatctcgc cagccagcca    60
accagccgag ccgcccagcc gacccgagag ccccgagagc cagactccct cagccataga   120
agacaccggg cgggagagac ggactgaaaa aatatatctt ttttattttt gtctgggcct   180
ggagacccgc agcaggagcg gaggtgggtg cggggccggg agccggagca ggaccgggaa   240
caggaacagg aacaggaaca ggaacaggaa caggagtggg gccggagca ggagcaggag   300 cgggagccga agtgggggca ggagcggcgg cggccgcagc agcaacaggg tcgccccagt   360
```

```
ccgcggcgag gaagagggag ctctcagcca atcagcgag                          399
```

<210> SEQ ID NO 35
<211> LENGTH: 386
<212> TYPE: DNA
<213> ORGANISM: PSEUDORABIES VIRUS

<400> SEQUENCE: 35

```
gcccacccat cacagcagcc gcggacgctg cgcgccggag cggtccatct cgccagccag    60
ccaaccagcc gagccgccca gccgacccga gagccccgag agccagactc cctcagccat   120
agaagacacc gggcgggaga gacggactga aaaaatatat cttttttttat tttgtctggg   180
cctggagacc cgcagcagga gcggaggtgg gtgcggggcc gggagccgga gcaggaccgg   240
gaacaggaac aggaacagga acaggaacag gaacaggagt ggggccggga gcaggagcag   300
gagcgggagc cgaagtgggg gcaggagcgg cggcggccgc agcagcaaca gggtcgcccc   360
agtccgcggc gaggaagagg gagctc                                        386
```

<210> SEQ ID NO 36
<211> LENGTH: 387
<212> TYPE: DNA
<213> ORGANISM: PSEUDORABIES VIRUS

<400> SEQUENCE: 36

```
cgcccaccca tcacagcagc cgcggacgct gcgcgccgga gcggtccatc tcgccagcca    60
gccaaccagc cgagccgccc agccgacccg agagccccga gagccagact ccctcagcca   120
tagaagacac cgggcgggag agacggactg aaaaaatata tcttttttta ttttgtctgg   180
gcctggagac ccgcagcagg agcggaggtg gtgcggggc cgggagccgg agcaggaccg   240
ggaacaggaa caggaacagg aacaggaaca ggaacaggaa tggggccggg agcaggagca   300
ggagcgggag ccgaagtggg gcaggagcg gcggcggccg cagcagcaac agggtcgccc   360
cagtccgcgg cgaggaagag ggagctc                                       387
```

<210> SEQ ID NO 37
<211> LENGTH: 388
<212> TYPE: DNA
<213> ORGANISM: PSEUDORABIES VIRUS

<400> SEQUENCE: 37

```
ccgcccaccc atcacagcag ccgcggacgc tgcgcgccgg agcggtccat ctcgccagcc    60
agccaaccag ccgagccgcc agccgaccc gagagcccg agagccagac tccctcagcc   120
atagaagaca ccgggcggga gagacggact gaaaaaatat atcttttttt attttgtctg   180
ggcctggaga cccgcagcag gagcggaggt gggtgcgggg ccgggagccg gagcaggacc   240
gggaacagga acaggaacag gaacaggaac aggaacagga gtggggccgg gagcaggagc   300
aggagcggga gccgaagtgg ggcaggagc ggcggcggcc gcagcagcaa cagggtcgcc   360
ccagtccgcg gcgaggaaga gggagctc                                      388
```

<210> SEQ ID NO 38
<211> LENGTH: 391
<212> TYPE: DNA
<213> ORGANISM: PSEUDORABIES VIRUS

<400> SEQUENCE: 38

```
gctccgccca cccatcacag cagccgcgga cgctgcgcgc cggagcggtc catctcgcca    60
gccagccaac cagccgagcc gcccagccga cccgagagcc ccgagagcca gactccctca   120
```

| gccatagaag acaccgggcg ggagagacgg actgaaaaaa tatatctttt tttatttttgt | 180 |
| ctgggcctgg agacccgcag caggagcgga ggtgggtgcg gggccgggag ccggagcagg | 240 |
| accgggaaca ggaacaggaa caggaacagg aacaggaaca ggagtggggc cgggagcagg | 300 |
| agcaggagcg ggagccgaag tgggggcagg agcggcggcg ccgcagcag caacagggtc | 360 |
| gccccagtcc gcggcgagga agagggagct c | 391 |

<210> SEQ ID NO 39
<211> LENGTH: 358
<212> TYPE: DNA
<213> ORGANISM: PSEUDORABIES VIRUS

<400> SEQUENCE: 39

| tgcgcgccgg agcggtccat ctcgccagcc agccaaccag ccgagccgcc cagccgaccc | 60 |
| gagagccccg agaccagac tccctcagcc atagaagaca ccgggcggga gagacggact | 120 |
| gaaaaaatat atcttttttt attttgtctg ggcctggaga cccgcagcag gagcggaggt | 180 |
| gggtgcgggg ccgggagccg gagcaggacc gggaacagga acaggaacag gaacaggaac | 240 |
| aggaacagga gtggggccgg gagcaggagc aggagcggga gccgaagtgg ggcaggagc | 300 |
| ggcggcggcc gcagcagcaa cagggtcgcc ccagtccgcg gcgaggaaga gggagctc | 358 |

<210> SEQ ID NO 40
<211> LENGTH: 372
<212> TYPE: DNA
<213> ORGANISM: PSEUDORABIES VIRUS

<400> SEQUENCE: 40

| tgcgcgccgg agcggtccat ctcgccagcc agccaaccag ccgagccgcc cagccgaccc | 60 |
| gagagccccg agaccagac tccctcagcc atagaagaca ccgggcggga gagacggact | 120 |
| gaaaaaatat atcttttttt attttgtctg ggcctggaga cccgcagcag gagcggaggt | 180 |
| gggtgcgggg ccgggagccg gagcaggacc gggaacagga acaggaacag gaacaggaac | 240 |
| aggaacagga gtggggccgg gagcaggagc aggagcggga gccgaagtgg ggcaggagc | 300 |
| ggcggcggcc gcagcagcaa cagggtcgcc ccagtccgcg gcgaggaaga gggagctccc | 360 |
| gcgaggaggc ag | 372 |

<210> SEQ ID NO 41
<211> LENGTH: 392
<212> TYPE: DNA
<213> ORGANISM: PSEUDORABIES VIRUS

<400> SEQUENCE: 41

| tgcgcgccgg agcggtccat ctcgccagcc agccaaccag ccgagccgcc cagccgaccc | 60 |
| gagagccccg agaccagac tccctcagcc atagaagaca ccgggcggga gagacggact | 120 |
| gaaaaaatat atcttttttt attttgtctg ggcctggaga cccgcagcag gagcggaggt | 180 |
| gggtgcgggg ccgggagccg gagcaggacc gggaacagga acaggaacag gaacaggaac | 240 |
| aggaacagga gtggggccgg gagcaggagc aggagcggga gccgaagtgg ggcaggagc | 300 |
| ggcggcggcc gcagcagcaa cagggtcgcc ccagtccgcg gcgaggaaga gggagctctg | 360 |
| gtgccctctg gtggtcttct agaggaattg ca | 392 |

<210> SEQ ID NO 42
<211> LENGTH: 374
<212> TYPE: DNA

<213> ORGANISM: PSEUDORABIES VIRUS

<400> SEQUENCE: 42

```
tcagccaatc agcgagtgcg cgccggagcg gtccatctcg ccagccagcc aaccagccga    60
gccgcccagc cgacccgaga gccccgagag ccagactccc tcagccatag aagacaccgg   120
gcgggagaga cggactgaaa aaatatatct tttttattt tgtctgggcc tggagacccg   180
cagcaggagc ggaggtgggt gcggggccgg gagccggagc aggaccggga acaggaacag   240
gaacaggaac aggaacagga acaggagtgg ggccgggagc aggagcagga gcgggagccg   300
aagtgggggc aggagcggcg gcggccgcag cagcaacagg gtcgccccag tccgcggcga   360
ggaagaggga gctc                                                    374
```

<210> SEQ ID NO 43
<211> LENGTH: 372
<212> TYPE: DNA
<213> ORGANISM: PSEUDORABIES VIRUS

<400> SEQUENCE: 43

```
ccgcgaggag gcagtgcgcg ccggagcggt ccatctcgcc agccagccaa ccagccgagc    60
cgcccagccg acccgagagc cccgagagcc agactccctc agccatagaa gacaccgggc   120
gggagagacg gactgaaaaa atatatcttt tttatttttg tctgggcctg gagacccgca   180
gcaggagcgg aggtgggtgc ggggccggga gccggagcag gaccgggaac aggaacagga   240
acaggaacag gaacaggaac aggagtgggg ccgggagcag gagcaggagc gggagccgaa   300
gtgggggcag gagcggcggc ggccgcagca gcaacagggt cgccccagtc cgcggcgagg   360
aagagggagc tc                                                       372
```

<210> SEQ ID NO 44
<211> LENGTH: 392
<212> TYPE: DNA
<213> ORGANISM: PSEUDORABIES VIRUS

<400> SEQUENCE: 44

```
tggtgccctc tggtggtctt ctagaggaat tgcatgcgcg ccggagcggt ccatctcgcc    60
agccagccaa ccagccgagc cgcccagccg acccgagagc cccgagagcc agactccctc   120
agccatagaa gacaccgggc gggagagacg gactgaaaaa atatatcttt tttatttttg   180
tctgggcctg gagacccgca gcaggagcgg aggtgggtgc ggggccggga gccggagcag   240
gaccgggaac aggaacagga acaggaacag gaacaggaac aggagtgggg ccgggagcag   300
gagcaggagc gggagccgaa gtgggggcag gagcggcggc ggccgcagca gcaacagggt   360
cgccccagtc cgcggcgagg aagagggagc tc                                 392
```

<210> SEQ ID NO 45
<211> LENGTH: 374
<212> TYPE: DNA
<213> ORGANISM: PSEUDORABIES VIRUS

<400> SEQUENCE: 45

```
tgcgcgccgg agcggtccat ctcgccagcc agccaaccag ccgagccgcc cagccgaccc    60
gagagccccg agagccagac tccctcagcc atagaagaca ccgggcggga gagacggact   120
gaaaaaatat atcttttttt attttgtctg ggcctggaga cccgcagcag gagcggaggt   180
gggtgcgggg ccgggagccg gagcaggacc gggaacagga acaggaacag gaacaggaac   240
aggaacagga gtggggccgg gagcaggagc aggagcggga gccgaagtgg ggcaggagc   300
```

```
ggcggcggcc gcagcagcaa cagggtcgcc ccagtccgcg gcgaggaaga gggagctctc    360
agccaatcag cgag                                                      374

<210> SEQ ID NO 46
<211> LENGTH: 255
<212> TYPE: DNA
<213> ORGANISM: PSEUDORABIES VIRUS

<400> SEQUENCE: 46
ggcgggagag acggactgaa aaatatatc ttttttttatt ttgtctgggc ctggagaccc     60
gcagcaggag cggaggtggg tgcggggccg ggagccggag caggaccggg aacaggaaca   120
ggaacaggaa caggaacagg aacaggagtg gggccgggag caggagcagg agcgggagcc   180
gaagtggggg caggagcggc ggcggccgca gcagcaacag ggtcgcccca gtccgcggcg   240
aggaagaggg agctc                                                    255

<210> SEQ ID NO 47
<211> LENGTH: 257
<212> TYPE: DNA
<213> ORGANISM: PSEUDORABIES VIRUS

<400> SEQUENCE: 47
cgggcgggag agacggactg aaaaaatata tctttttta ttttgtctgg gcctggagac     60
ccgcagcagg agcggaggtg ggtgcgggc cgggagccgg agcaggaccg ggaacaggaa    120
caggaacagg aacaggaaca ggaacaggag tggggccggg agcaggagca ggagcgggag   180
ccgaagtggg ggcaggagcg gcggcggccg cagcagcaac agggtcgccc cagtccgcgg   240
cgaggaagag ggagctc                                                  257

<210> SEQ ID NO 48
<211> LENGTH: 268
<212> TYPE: DNA
<213> ORGANISM: PSEUDORABIES VIRUS

<400> SEQUENCE: 48
atagaagaca ccgggcggga gagacggact gaaaaaatat atcttttttt attttgtctg     60
ggcctggaga cccgcagcag gagcggaggt gggtgcgggg ccgggagccg gagcaggacc   120
gggaacagga acaggaacag gaacaggaac aggaacagga gtggggccgg gagcaggagc   180
aggagcggga gccgaagtgg gggcaggagc ggcggcggcc gcagcagcaa cagggtcgcc   240
ccagtccgcg gcgaggaaga gggagctc                                      268

<210> SEQ ID NO 49
<211> LENGTH: 313
<212> TYPE: DNA
<213> ORGANISM: PSEUDORABIES VIRUS

<400> SEQUENCE: 49
ccgcccagcc gacccgagag ccccgagagc cagactccct cagccataga agacaccggg     60
cgggagagac ggactgaaaa aatatatctt ttttatttt gtctgggcct ggagacccgc    120
agcaggagcg gaggtgggtg cggggccggg agccggagca ggaccgggaa caggaacagg   180
aacaggaaca ggaacaggaa caggagtggg gccgggagca ggagcaggag cgggagccga   240
agtgggggca ggagcggcgg cggccgcagc agcaacaggg tcgccccagt ccgcggcgag   300
gaagagggag ctc                                                      313
```

<210> SEQ ID NO 50
<211> LENGTH: 339
<212> TYPE: DNA
<213> ORGANISM: PSEUDORABIES VIRUS

<400> SEQUENCE: 50

```
tctcgccagc cagccaacca gccgagccgc ccagccgacc cgagagcccc gagagccaga      60
ctccctcagc catagaagac accgggcggg agagacggac tgaaaaaata tatcttttt     120
tattttgtct gggcctggag acccgcagca ggagcggagg tgggtgcggg gccgggagcc    180
ggagcaggac cgggaacagg aacaggaaca ggaacaggaa caggaacagg agtggggccg    240
ggagcaggag caggagcggg agccgaagtg ggggcaggag cggcggcggc cgcagcagca    300
acagggtcgc cccagtccgc ggcgaggaag agggagctc                           339
```

<210> SEQ ID NO 51
<211> LENGTH: 359
<212> TYPE: DNA
<213> ORGANISM: PSEUDORABIES VIRUS

<400> SEQUENCE: 51

```
ctgcgcgccg gagcggtcca tctcgccagc cagccaacca gccgagccgc ccagccgacc     60
cgagagcccc gagagccaga ctccctcagc catagaagac accgggcggg agagacggac   120
tgaaaaaata tatcttttt tattttgtct gggcctggag acccgcagca ggagcggagg    180
tgggtgcggg gccgggagcc ggagcaggac cgggaacagg aacaggaaca ggaacaggaa   240
caggaacagg agtggggccg ggagcaggag caggagcggg agccgaagtg ggggcaggag   300
cggcggcggc cgcagcagca acagggtcgc cccagtccgc ggcgaggaag agggagctc    359
```

<210> SEQ ID NO 52
<211> LENGTH: 364
<212> TYPE: DNA
<213> ORGANISM: PSEUDORABIES VIRUS

<400> SEQUENCE: 52

```
ggacgctgcg cgccggagcg gtccatctcg ccagccagcc aaccagccga gccgccagc      60
cgacccgaga gccccgagag ccagactccc tcagccatag aagacaccgg gcgggagaga   120
cggactgaaa aaatatatct ttttttattt tgtctgggcc tggagacccg cagcaggagc   180
ggaggtgggt gcggggccgg gagccggagc aggaccggga acaggaacag gaacaggaac   240
aggaacagga acaggagtgg ggccgggagc aggagcagga gcgggagccg aagtggggc    300
aggagcggcg gcggccgcag cagcaacagg gtcgccccag tccgcggcga ggaagaggga   360
gctc                                                                 364
```

<210> SEQ ID NO 53
<211> LENGTH: 368
<212> TYPE: DNA
<213> ORGANISM: PSEUDORABIES VIRUS

<400> SEQUENCE: 53

```
ccgcggacgc tgcgcgccgg agcggtccat ctcgccagcc agccaaccag ccgagccgcc     60
cagccgaccc gagagccccg agagccagac tccctcagcc atagaagaca ccgggcggga   120
gagacggact gaaaaaatat atcttttt attttgtctg ggcctggaga cccgcagcag    180
gagcggaggt gggtgcgggg ccgggagccg gagcaggacc gggaacagga acaggaacag   240
gaacaggaac aggaacagga gtggggccgg gagcaggagc aggagcggga gccgaagtgg   300
```

```
gggcaggagc ggcggcggcc gcagcagcaa cagggtcgcc ccagtccgcg gcgaggaaga    360
gggagctc                                                             368

<210> SEQ ID NO 54
<211> LENGTH: 376
<212> TYPE: DNA
<213> ORGANISM: PSEUDORABIES VIRUS

<400> SEQUENCE: 54
cacagcagcc gcggacgctg cgcgccggag cggtccatct cgccagccag ccaaccagcc     60
gagccgccca gccgacccga gagccccgag agccagactc cctcagccat agaagacacc    120
gggcgggaga gacggactga aaaaatatat cttttttat tttgtctggg cctggagacc    180
cgcagcagga gcggaggtgg gtgcggggcc gggagccgga gcaggaccgg gaacaggaac    240
aggaacagga acaggaacag gaacaggagt ggggccggga gcaggagcag gagcgggagc    300
cgaagtgggg gcaggagcgg cggcggccgc agcagcaaca gggtcgcccc agtccgcggc    360
gaggaagagg gagctc                                                    376

<210> SEQ ID NO 55
<211> LENGTH: 384
<212> TYPE: DNA
<213> ORGANISM: PSEUDORABIES VIRUS

<400> SEQUENCE: 55
ccacccatca cagcagccgc ggacgctgcg cgccggagcg gtccatctcg ccagccagcc     60
aaccagccga gccgcccagc cgacccgaga gccccgagag ccagactccc tcagccatag    120
aagacaccgg gcgggagaga cggactgaaa aatatatct tttttattt tgtctgggcc    180 tggagacccg cagcaggagc ggaggtgggt gcggggccgg gagccggagc aggaccggga    240
acaggaacag gaacaggaac aggaacagga caggagtgg ggccgggagc aggagcagga    300
gcgggagccg aagtggggc aggagcggcg gcggccgcag cagcaacagg gtcgccccag    360
tccgcggcga ggaagaggga gctc                                           384

<210> SEQ ID NO 56
<211> LENGTH: 385
<212> TYPE: DNA
<213> ORGANISM: PSEUDORABIES VIRUS

<400> SEQUENCE: 56
cccacccatc acagcagccg cggacgctgc gcgccggagc ggtccatctc gccagccagc     60
caaccagccg agccgcccag ccgacccgag agccccgaga gccagactcc ctcagccata    120
gaagacaccg ggcgggagag acggactgaa aaatatatc ttttttatt ttgtctgggc    180 ctggagaccc gcagcaggag cggaggtggg tgcggggccg ggagccggag caggaccggg    240
aacaggaaca ggaacaggaa caggaacagg aacaggagtg gggccgggag caggagcagg    300
agcgggagcc gaagtggggg caggagcggc ggcggccgca gcagcaacag ggtcgcccca    360
gtccgcggcg aggaagaggg agctc                                          385

<210> SEQ ID NO 57
<211> LENGTH: 390
<212> TYPE: DNA
<213> ORGANISM: PSEUDORABIES VIRUS

<400> SEQUENCE: 57
```

```
ctccgcccac ccatcacagc agccgcggac gctgcgcgcc ggagcggtcc atctcgccag      60
ccagccaacc agccgagccg cccagccgac ccgagagccc cgagagccag actccctcag     120
ccatagaaga caccgggcgg gagagacgga ctgaaaaaat atatctttttt ttattttgtc    180 tgggcctgga gacccgcagc aggagcggag gtgggtgcgg ggccgggagc cggagcagga    240
ccgggaacag gaacaggaac aggaacagga acaggaacag gagtggggcc gggagcagga    300
gcaggagcgg gagccgaagt gggggcagga gcggcggcgg ccgcagcagc aacagggtcg    360
ccccagtccg cggcgaggaa gagggagctc                                      390
```

<210> SEQ ID NO 58
<211> LENGTH: 396
<212> TYPE: DNA
<213> ORGANISM: PSEUDORABIES VIRUS

<400> SEQUENCE: 58

```
tccgcgctcc gcccacccat cacagcagcc gcggacgctg cgcgccggag cggtccatct      60
cgccagccag ccaaccagcc gagccgccca gccgaccega gagccccgag agccagactc    120
cctcagccat agaagacacc gggcgggaga cggactgaa aaaatatat cttttttttat    180 tttgtctggg cctggagacc cgcagcagga gcggaggtgg gtgcggggcc gggagccgga    240
gcaggaccgg gaacaggaac aggaacagga acaggaacag gaacaggagt ggggccggga    300
gcaggagcag gagcgggagc cgaagtgggg cagggagcgg cggcggccgc agcagcaaca    360
gggtcgcccc agtccgcggc gaggaagagg gagctc                               396
```

<210> SEQ ID NO 59
<211> LENGTH: 30
<212> TYPE: DNA
<213> ORGANISM: ARTIFICIAL SEQUENCE
<220> FEATURE:
<223> OTHER INFORMATION: LAP1 FORWARD PRIMER

<400> SEQUENCE: 59

```
gcacgcgtat ctccggaaag aggaaattga                                       30
```

<210> SEQ ID NO 60
<211> LENGTH: 33
<212> TYPE: DNA
<213> ORGANISM: ARTIFICIAL SEQUENCE
<220> FEATURE:
<223> OTHER INFORMATION: LAP1 REVERSE PRIMER

<400> SEQUENCE: 60

```
gcggatccta tatacacgat gtgcatccat aat                                   33
```

<210> SEQ ID NO 61
<211> LENGTH: 35
<212> TYPE: DNA
<213> ORGANISM: ARTIFICIAL SEQUENCE
<220> FEATURE:
<223> OTHER INFORMATION: LAP2 FORWARD PRIMER

<400> SEQUENCE: 61

```
gcacgcgtat ccccggtccg cgctccgccc accca                                 35
```

<210> SEQ ID NO 62
<211> LENGTH: 36
<212> TYPE: DNA
<213> ORGANISM: ARTIFICIAL SEQUENCE
<220> FEATURE:
<223> OTHER INFORMATION: LAP2 REVERSE PRIMER

-continued

```
<400> SEQUENCE: 62
gcggatccga gctccctctt cctcgccgcg gactgg                36
```

RECOMBINANT NUCLEIC ACIDS CONTAINING ALPHAHERPESVIRUS PROMOTER SEQUENCES

RELATED APPLICATIONS

This application is the U.S. National Stage of International Application No. PCT/US2020/016787, filed on Feb. 5, 2020, published in English, which claims the benefit of U.S. Provisional Application No. 62/801,524, filed on Feb. 5, 2019, and U.S. Provisional Application No. 62/950,848, filed on Dec. 19, 2019. The entire teachings of the above applications are incorporated herein by reference.

INCORPORATION BY REFERENCE OF MATERIAL IN ASCII TEXT FILE

This application incorporates by reference the Sequence Listing contained in the following ASCII text file:
 a) File name: 53911018003_Sequence_Listing.txt; created Jul. 27, 2021, 37 KB in size.

BACKGROUND

Viruses infect their hosts and introduce their genetic material into cells of the host as part of their replication cycle. This genetic material contains basic "instructions" for producing more copies of these viruses by hijacking the body's normal production machinery to serve the needs of the virus. The host cell will carry out these instructions and produce additional copies of the virus, leading to more and more cells of the host becoming infected. As such, viruses can be used as vehicles to carry genes that may provide therapeutic benefits into a cell.

SUMMARY

In one aspect, the present invention provides a recombinant vector for expression of a target gene in a host cell, comprising: a promoter comprising a nucleic acid sequence having at least 70% sequence identity to a sequence selected from SEQ ID NO: 1, SEQ ID NO: 2, SEQ ID NO: 3 and SEQ ID NO: 4; a cloning site for insertion of a nucleic acid encoding the target gene; and at least one non-promoter regulatory element required for the expression of the target gene in the host cell.

In another aspect, the present invention provides a recombinant vector for expression of a target gene in a host cell, comprising: a promoter comprising a nucleic acid sequence having at least 70% sequence identity to a sequence selected from SEQ ID NO: 5, SEQ ID NO: 6, SEQ ID NO: 7 and SEQ ID NO: 8; a cloning site for insertion of a nucleic acid encoding the target gene; and at least one non-promoter regulatory element required for the expression of the target gene in the host cell.

In another aspect, the present invention provides a recombinant vector for expression of a target gene in a host cell, comprising: a promoter comprising a nucleic acid sequence having at least 70% sequence identity to SEQ ID NO: 9; a cloning site for insertion of a nucleic acid encoding the target gene; and at least one non-promoter regulatory element required for the expression of the target gene in the host cell.

In some embodiments, the at least one non-promoter regulatory element comprises an enhancer element. In some embodiments, the at least one non-promoter regulatory element comprises an inducer element.

In some embodiments, the recombinant vector further comprises a selectable marker element.

In some embodiments, the vector is a viral vector. In certain embodiments, the viral vector is an adeno-associated virus (AAV) vector.

In some embodiments, the vector is a non-viral vector.

In some embodiments, the host cell is a mammalian cell. In some embodiments, the host cell is a neuronal cell. In some embodiments, the host cell is a non-neuronal cell (e.g., a liver cells, a kidney cell, a retinal cell).

In another aspect, the present invention provides a host cell comprising a recombinant vector as described herein.

In one aspect, the present invention provides recombinant polynucleotide molecules comprising a promoter comprising a nucleic acid sequence having at least 70% sequence identity to a sequence selected from SEQ ID NO: 1, SEQ ID NO: 2, SEQ ID NO: 3, and SEQ ID NO: 4. In another aspect, the present invention provides recombinant polynucleotide molecules comprising a nucleic acid encoding a target gene, wherein the nucleic acid is operably linked to a promoter comprising a nucleic acid sequence having at least 70% sequence identity to a sequence selected from SEQ ID NO: 1, SEQ ID NO: 2, SEQ ID NO: 3, and SEQ ID NO: 4.

In another aspect, the present invention provides recombinant polynucleotide molecules comprising a promoter comprising a nucleic acid sequence having at least 70% sequence identity to a sequence selected from SEQ ID NO: 5, SEQ ID NO: 6, SEQ ID NO: 7, and SEQ ID NO: 8. In another aspect, the present invention provides recombinant polynucleotide molecules comprising a nucleic acid encoding a target gene, wherein the nucleic acid is operably linked to a promoter comprising a nucleic acid sequence having at least 70% sequence identity to a sequence selected from SEQ ID NO: 5, SEQ ID NO: 6, SEQ ID NO: 7, and SEQ ID NO: 8.

In another aspect, the present invention provides recombinant polynucleotide molecules comprising a promoter comprising a nucleic acid sequence having at least 70% sequence identity to SEQ ID NO: 9. In another aspect, the present invention provides recombinant polynucleotide molecules comprising a nucleic acid encoding a target gene, wherein the nucleic acid is operably linked to a promoter comprising a nucleic acid sequence having at least 70% sequence identity to SEQ ID NO: 9.

In another aspect, the present invention provides a recombinant polynucleotide molecule comprising a cloning site for insertion of a nucleic acid encoding a target gene, wherein the cloning site is operably linked to a promoter comprising a nucleic acid having at least 70% sequence identity to a sequence selected from SEQ ID NO: 1, SEQ ID NO: 2, SEQ ID NO: 3, and SEQ ID NO: 4.

In another aspect, the present invention provides a recombinant polynucleotide molecule comprising a cloning site for insertion of a nucleic acid encoding a target gene, wherein the cloning site is operably linked to a promoter comprising a nucleic acid having at least 70% sequence identity to a sequence selected from SEQ ID NO: 5, SEQ ID NO: 6, SEQ ID NO: 7, and SEQ ID NO: 8.

In another aspect, the present invention provides a recombinant polynucleotide molecule comprising a cloning site for insertion of a nucleic acid encoding a target gene, wherein the cloning site is operably linked to a promoter comprising a nucleic acid sequence having at least 70% sequence identity to SEQ ID NO: 9.

In another aspect, the present invention provides methods of expressing a target gene in a host cell, comprising: contacting the host cell with a recombinant polynucleotide molecule such that the recombinant polynucleotide molecule is introduced into the host cell, wherein the recombinant polynucleotide molecule comprises a nucleic acid encoding the target gene and wherein the nucleic acid is operably linked to a promoter comprising a nucleic acid sequence having at least 70% sequence identity to a sequence selected from SEQ ID NO: 1, SEQ ID NO: 2, SEQ ID NO: 3 and SEQ ID NO: 4, whereby expression of the target gene occurs in the host cell.

In another aspect, the present invention provides methods of expressing a target gene in a host cell, comprising: contacting the host cell with a recombinant polynucleotide molecule such that the recombinant polynucleotide molecule is introduced into the host cell, wherein the recombinant polynucleotide molecule comprises a nucleic acid encoding the target gene and wherein the nucleic acid is operably linked to a promoter comprising a nucleic acid sequence having at least 70% sequence identity to a sequence selected from SEQ ID NO: 5, SEQ ID NO: 6, SEQ ID NO: 7, and SEQ ID NO: 8, whereby expression of the target gene occurs in the host cell.

In another aspect, the present invention provides methods of expressing a target gene in a host cell, comprising: contacting the host cell with a recombinant polynucleotide molecule such that the recombinant polynucleotide molecule is introduced into the host cell, wherein the recombinant polynucleotide molecule comprises a nucleic acid encoding the target gene and wherein the nucleic acid is operably linked to a promoter comprising a nucleic acid sequence having at least 70% sequence identity to SEQ ID NO: 9, whereby expression of the target gene occurs in the host cell.

In some embodiments, the recombinant polynucleotide molecule is introduced into the host cell by transduction upon contacting the host cell with the recombinant polynucleotide. In another embodiment, the recombinant polynucleotide molecule is introduced into the host cell by transfection upon contacting the host cell with the recombinant polynucleotide.

Features of the LAP sequences disclosed herein include: i) Smaller size when compared to similar promoters, such as EF1α, CAG, TH, CaMKIIa, among others. This is an advantage in the context of AAV vectors that have a limited genetic payload. ii) Long-term expression that is less prone to repression of transcription. The LAP sequences disclosed herein achieve long-term, chronic transcription of transgenes. This is particularly useful for gene therapy where the therapeutic transgene may need to be expressed for the lifespan of the patient/host.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 1A-1D depict the characterization of PRV latency-associated transcript promoters (LAPs). FIG. 1A depicts the complete nucleotide sequence of PRV LAP of 902 base pair (bp), and the sub-regions LAP1 of 498 bp (bold and underlined), LAP2 of 404 bp (underlined), and LAP1_2 of 880 bp. LAP1_2 includes most of the LAP1 and LAP2 sequences, but lacks the first 22 nucleotides of LAP1. The black boxes depict consensus sequences for transcription factors (TFs) including, the GC box: specificity protein 1 and 3 (Sp1 and Sp3); the CCAAT box: nuclear factor Y (NF-Y); and the TATA box: TATA-binding protein (TBP). Colored boxes indicate the coordinates for the binding motif sites of the TFs: 1, green: SRY-Box 10 (SOX10); 2, red: cAMP response element-binding protein (CREB); 3, blue: CCCTC-binding factor (CTCF); 4, brown: oligodendrocyte transcription factor 2 (Olig2); 5, pink: signal transducer and activator of transcription (STAT1). FIG. 1B depicts the plasmid maps of the four AAVs designed to transcribe mCherry fluorescent reporter from LAP1, LAP2, LAP1_2 and the EF1α promoter. WPRE of 609 bp is a woodchuck hepatitis virus posttranscriptional enhancer element. All AAVs contain a 479 bp human growth hormone (hGH polyA) poly adenylation sequence, and flanking AAV2 inverted terminal repeats (ITRs) of 141 bp each. The vectors were packaged into the AAV-PhP.eB serotype capsid. The total size of the enhancer-promoter elements and promoter sequence are: AAV-LAP1: 1.87 Kb; AAV-LAP2: 1.77 Kb; AAV-LAP1_2: 2.25 Kb; and AAV-EF1α: 2.63 Kb. FIG. 1C depicts the four AAVs used to transduce primary cultures of rat SCG neurons to quantify mCherry expression over a 90-day time-lapse. The relative fluorescence intensity of mCherry expression was measured at 3, 5, 7, 9, 11, 14, 17, 21, 24, 28, 31, 34, 38, 41, 45, 49, 52, 59, 67, 73, 82, and 90 days post infection (dpi) with $3 \times 10^{11}$ AAV genomes. Scale bar=100 μm. Data are represented as mean±SEM; n=3 SCG culture dishes per group. FIG. 1D shows that AAV-driven mCherry expression in SCG cell bodies at 28 days post AAV transduction with LAP1-mCherry, LAP2-mCherry, LAP1_2-mCherry, or EF1α-mCherry.

FIG. 2A is a schematic diagram of the systemic route of AAV administration and CNS tissue processing. Intravenous administrations of AAV vectors were performed by unilateral injections into mouse retro-orbital sinuses ($4 \times 10^{11}$ vg/mouse). Brains and spinal cords were collected at 30 dpi and 190 dpi. The right hemispheres of the brains were processed for iDISCO+ tissue clearing and light-sheet microscopy analysis. The left hemispheres of the brains were sagittally sectioned at 50 μm for immunofluorescence and confocal microscopy analysis. Spinal cords were transversally sliced at 20 μm for immunofluorescence and confocal microscopy analysis. FIGS. 2B-2P quantify the densities of mCherry positive cells per $mm^3$ across different brain regions in iDISCO+-cleared tissue samples at 30 dpi and 190 dpi. Data are represented as mean±SEM; n=2 animals per group, and between five and ten 500 um sections per animal. Data were normalized to those of a vehicle-injected control animal. Significance was determined with Student's t-test (if only two groups were compared), or analysis of variance one-way (ANOVA) followed by Bonferroni post hoc test (if more than two groups were compared). A p value of <0.05 was statistically significant (*p<0.033; p<0.002; *p<0.001).

Figures 3E, 3F:
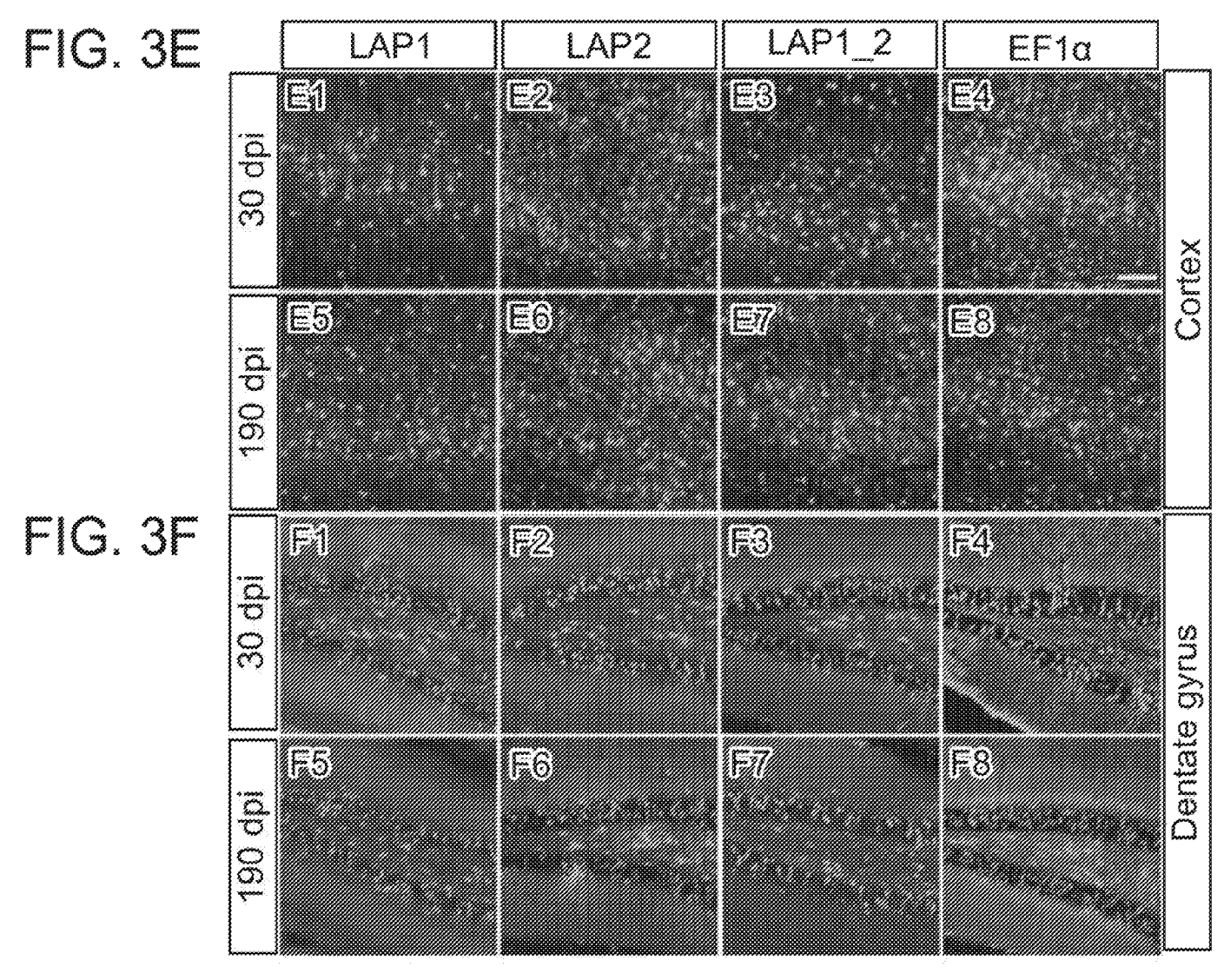
Figures 3G, 3H:
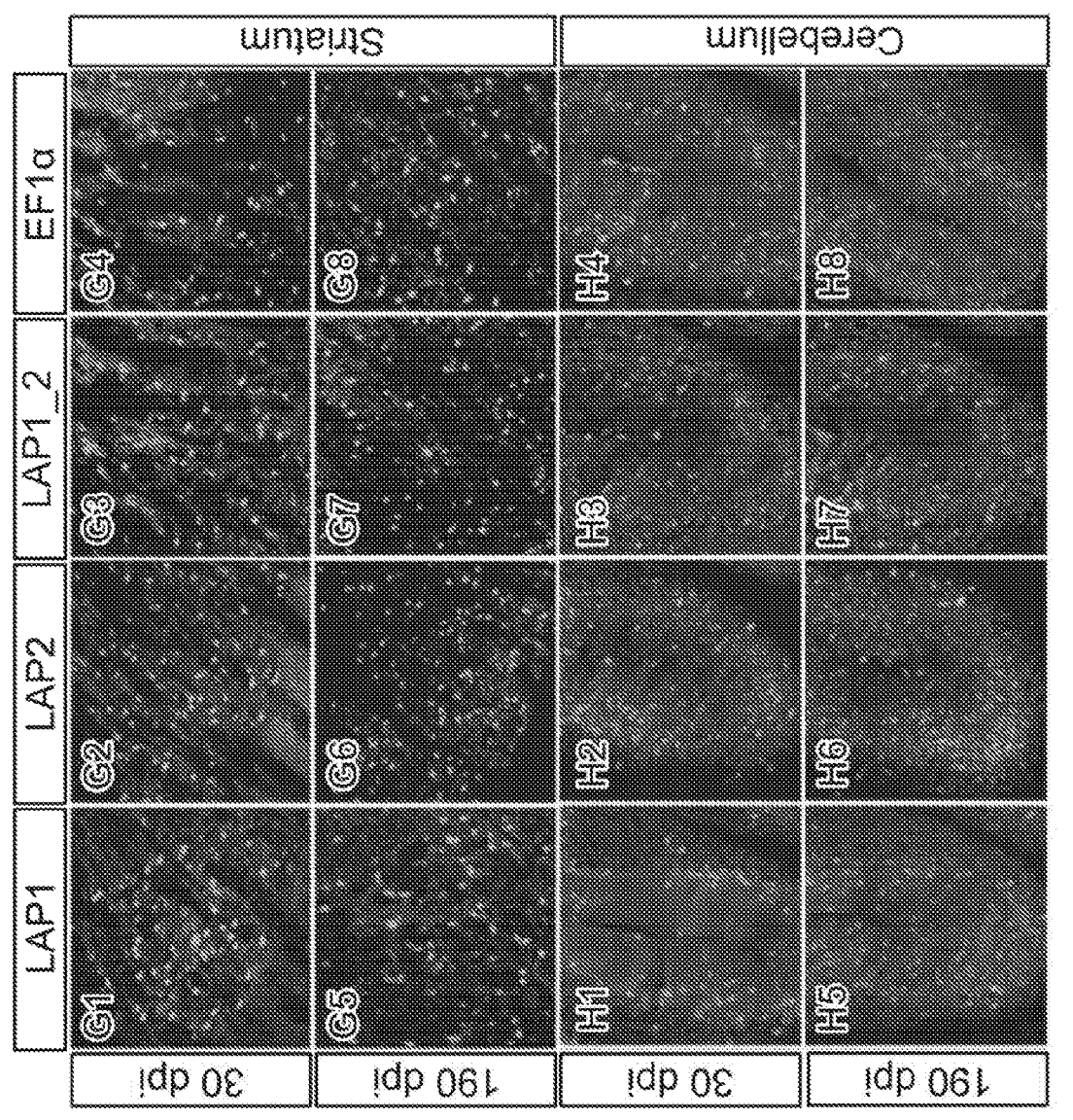

FIGS. 3A-3J4 show that all three AAV-LAP sequences drive widespread and long-term transgene expression throughput the brain after retro-orbital injection. Representative immunofluorescence images of sagittal sections show whole-brain distributions of anti-mCherry staining (green) for AAV-LAP1 (FIG. 3A), AAV-LAP2 (FIG. 3B), AAV-LAP1_2 (FIG. 3C), and AAV-EF1α (FIG. 3D) at 190 dpi. Cx, cortex; Hip, hippocampus; MRN, midbrain reticular nucleus; Cb, cerebellum; Thal, thalamus; Pn, pons; Hypo, hypothalamus; Str, striatum; OB, olfactory bulb. Scale bar=1 mm. Representative confocal images show anti-mCherry signals (green) in the cortex (FIG. 3E), the dentate gyms (FIG. 3F), the striatum (FIG. 3G) and the cerebellum (FIG.

3H) at 30 dpi and 190 dpi. All images are stack confocal sections. Scale bar=100 μm. FIGS. 3I1-3I4 quantify the indirect fluorescence intensities of the anti-mCherry signals driven by the AAV-LAP sequences and AAV-EF1α at 30 dpi and 190 dpi in the cortex, the dentate gyms, the striatum and the cerebellum. FIGS. 3J1-3J4 quantify the number of cells expressing mCherry signal per pixels$^2$ by immunohistochemistry (IHC) at 190 dpi in the cortex, the dentate gyms, the striatum and the cerebellum. Data are represented as mean±SEM; n=2 animals and six tissue sections per animal. Data were normalized to those of a vehicle-injected control animal. Significance was determined with Student's t-test (if only two groups were compared), or analysis of variance one-way (ANOVA) followed by Bonferroni post hoc test (if more than two groups were compared). A p value of <0.05 was statistically significant (*p<0.033; p<0.002; *p<0.001).

FIGS. 4A-4E4 show that LAP2 drives stable and long-term transgene expression in the brain. Representative confocal images show native mCherry fluorescence (red) for AAV-LAP1, AAV-LAP2, AAV-LAP1_2, and AAV-EF1α in the cortex (FIG. 4A), the dentate gyms (FIG. 4B), the striatum (FIG. 4C) and the cerebellum (FIG. 4D) at 30 dpi and 190 dpi. All images are stack confocal sections. Scale bar=100 μm. FIGS. 4E1-4E4 quantify the direct fluorescence intensities of native mCherry signal driven by AAV-LAP sequences and AAV-EF1α at 30 dpi and 190 dpi is shown in the cortex, the dentate gyms, the striatum and the cerebellum. Data are represented as mean±SEM; n=2 animals and six tissue sections per animal. Data were normalized to those of a vehicle-injected control animal. Significance was determined with Student's t-test (if only two groups were compared) or analysis of variance one-way (ANOVA) followed by Bonferroni post hoc test (if more than two groups were compared). A p value of <0.05 was statistically significant (*p<0.033; p<0.002; *p<0.001).

FIGS. 5A-5E show 20-μm sagittal brain slices for AAV-LAP2 or AAV-EF1α in the cortex, the dentate gyms, the striatum, the cerebellum and the olfactory bulb, respectively. Panels 2 and 4 depict higher magnification images of the indicated regions (square) in Panels 1 and 3, respectively. Images are stack confocal sections. Scale bars=100 μm.

FIGS. 6E and 6F quantify the percentage of mCherry labelled cells corresponding to neurons (NeuN-positive) or oligodendrocytes (Olig2-positive) in the cortex (Cx) or the dentate gyms (DG) for each promoter. Images are stack confocal sections. Data are represented as mean±SEM; n=2 animals and six tissue sections per animal.

FIGS. 7A-7D show that AAV-LAP transgene expression is not detected in microglia and astrocytes. Representative confocal immunofluorescence images of anti-mCherry signal (red), microglia (FIGS. 7A and 7B: green, labeled as Iba1-positive), astrocytes (FIGS. 7C and 7D: green, labeled as S100-positive) in the cortex and dentate gyms at 30 dpi. The absences of co-labelling between mCherry in astrocytes and microglia are indicated with stars (*). Cells were counterstained with DAPI (blue). Images are stack confocal sections. Scale bar=100 μm.

FIGS. 8A-8F show that LAP sequences drive widespread and long-term transgene expression in the spinal cord. Spinal cords (lumbar region) were sectioned in a transversal fashion at 20 μm. Representative confocal images at 190 dpi of native AAV-mediated mCherry expression (red, panels 1 and 4), pan-neuronal marker NeuroTrace (green, panels 2 and 5), and merge signal (yellow, panels 3 and 6) for AAV-LAP1, AAV-LAP2, AAV-LAP1_2 and AAV-EF1α. Images are stack confocal sections. DH: dorsal horn; VH ventral horn. Higher magnification images are shown in Panels 4-6. Scale bar=100 μm.

FIGS. 10A and 10B show that LAP2 drives efficient transgene expression in human kidney cells. Representative images of HEK-293 cells at 48 hours post transfection of a reporter plasmid comprising mCherry driven by LAP2 (FIG. 10A) or the EF1α-promoter (FIG. 10B). Panel 1: bright field; Panel 2: fluorescence; Panel 3: merge. Scale bar=50 μm.

FIGS. 11A and 11B show that LAP2 drives efficient transgene expression in human liver cells. Representative images of HepG2 cells at 48 hours post transfection of a reporter plasmid comprising mCherry driven by LAP2 (FIG. 11A) or the EF1α-promoter (FIG. 11B). Panel 1: bright field; Panel 2: fluorescence; Panel 3: merge. Scale bar=50 μm.

FIGS. 12A1-12B4 show that LAP2 drives long-term transgene expression throughout the liver. Intravenous administrations of AAV-LAP2 (FIGS. 12A1-12A4) or AAV-EF1α-vector (FIGS. 12B1-12B4) were performed by unilateral injection into the mouse retro-orbital sinuses (4×10$^{11}$ vg/mouse). The liver was collected at 190 dpi and longitudinally sectioned at 20 μm for IHC and confocal microscopy analysis. Representative confocal images of native mCherry fluorescence (FIGS. 12A1 and 12B1: red), anti-mCherry immunostaining (FIGS. 12A2 and 12B2: green), DAPI nuclear counterstain (FIGS. 12A3 and 12B3: blue), and merged immuno-fluorescence and DAPI images (FIGS. 12A4 and 12B4). CV: central vein. Scale bar=75 μm.

FIGS. 13A1-13B4 show that LAP2 drives long-term transgene expression in the mouse kidney. Intravenous administrations of AAV-LAP2 (FIGS. 13A1-13A4) or AAV-EF1α-vector (FIGS. 13B1-13B4) were performed by unilateral injection into the mouse retro-orbital sinuses (4×10$^{11}$ vg/mouse). The kidneys were collected at 190 dpi and longitudinally sectioned at 20 μm for IHC and confocal-microscopy analysis. Representative confocal images show native mCherry fluorescence (FIGS. 13A1 and 13B1: red), anti-mCherry immunostaining (FIGS. 13A2 and 13B2: green), DAPI nuclear counterstain (FIGS. 13A3 and 13B3: blue), and merged immune-fluorescence and DAPI images (FIGS. 13A4 and 13B4). AV: arcuate vessel. Scale bar=75 μm.

FIGS. 14A1-14B4 show that LAP2 drives long-term transgene expression in the mouse retina. Intravenous administrations of AAV-LAP2 (FIGS. 14A1-14A4) or AAV-EF1α-vector (FIGS. 14B1-14B4) were performed by unilateral injection into the mouse retro-orbital sinuses ($4 \times 10^{11}$ vg/mouse). The retinae were collected at 190 dpi and transversely cryosectioned at 20 μm for IHC and confocal-microscopy analysis. Representative confocal images show native mCherry fluorescence (FIGS. 14A1 and 14B1: red), anti-mCherry immunostaining (FIGS. 14A2 and 14B2: green), DAPI nuclear counterstain (FIGS. 14A3 and 14B3: blue), and merged immunofluorescence and DAPI images (FIGS. 14A4 and 14B4). GCL: ganglion-cell layer; INL: inner nuclear layer; ONL: outer nuclear layer. Scale bar=75 μm.

DETAILED DESCRIPTION

Figure 1B:
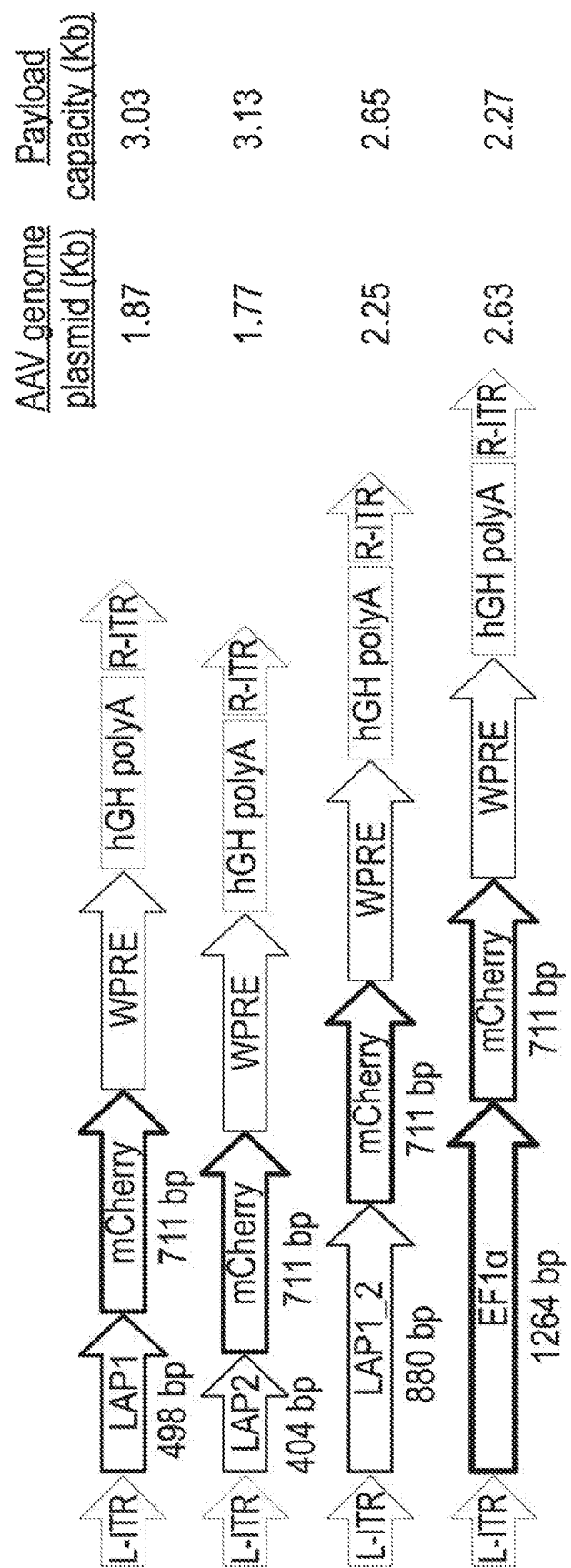

A description of example embodiments follows.

Several aspects of the invention are described below, with reference to examples for illustrative purposes only. It should be understood that numerous specific details, relationships, and methods are set forth to provide a full understanding of the invention. One having ordinary skill in the relevant art, however, will readily recognize that the invention can be practiced without one or more of the specific details or practiced with other methods, protocols, reagents, cell lines and animals. The present invention is not limited by the illustrated ordering of acts or events, as some acts may occur in different orders and/or concurrently with other acts or events. Furthermore, not all illustrated acts, steps or events are required to implement a methodology in accordance with the present invention. Many of the techniques and procedures described, or referenced herein, are well understood and commonly employed using conventional methodology by those skilled in the art.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. It will be further understood that terms, such as those defined in commonly-used dictionaries, should be interpreted as having a meaning that is consistent with their meaning in the context of the relevant art and/or as otherwise defined herein.

The terminology used herein is for the purpose of describing particular embodiments only and is not intended to be limiting. As used herein, the indefinite articles "a," "an" and "the" should be understood to include plural reference unless the context clearly indicates otherwise.

As used herein, a "cloning site" refers to a short segment of nucleotides in the vector that contain one or more unique restriction sites that allow for insertion of a nucleotide "target gene" or "gene of interest" into the vector.

As used herein, a "promoter" refers to a region of DNA to which an RNA polymerase binds and initiates transcription (e.g., of a gene).

As used herein, a "non-promoter regulatory element" refers to non-promoter sequence(s) of a nucleic acid molecule that are capable of increasing or decreasing the expression of specific genes within the recombinant vector. Such non-promoter regulatory elements include, but are not limited to, e.g., enhancer elements, inducer elements, silencer elements, 5' untranslated regions (UTRs), 3'UTRs, terminator elements, CAAT boxes, CCAAT boxes, Pribnow boxes, SECIS elements, polyadenylation signals, A-boxes, Z-boxes, C-boxes, E-boxes, G-boxes, and Cis-regulatory elements (CREs).

As used herein, the phrase "operably linked" means that the nucleic acid is positioned in the recombinant polynucleotide, e.g., vector, in such a way that enables expression of the nucleic acid under control of the element (e.g., promoter) to which it is linked.

As used herein, a "selectable marker element" is an element that confers a trait suitable for artificial selection. Examples of selectable marker elements useful in the present invention include, but are not limited to, beta-lactamase, neomycin resistance genes, mutant Fabl genes conferring triclosan resistance, URA3 elements, fluorescent gene products, affinity tags such as GST, His, CBP, MBP, and epitope tags such as Myc HA, FLAG. Selectable marker elements can be negative or positive selection markers.

The present invention provides, in various embodiments, vectors, such as viral vectors (e.g., adeno-associated viral vectors (AAV)), containing promoter sequences that are small in size yet able to provide long-lasting transcription of a gene of interest. The promoter sequences have a size that is less than that of many commonly used promoters, and can drive transcription of a transgene in most tissue and cell types (e.g., in mammals). The promoter sequences disclosed herein are less prone to repression or inactivation, making them particularly useful for gene therapies requiring chronic expression of a therapeutic transgene.

In one aspect, the present invention provides gene delivery vectors expressing a gene of interest. In some embodiments, the gene delivery vector comprises a promoter derived from a genomic region of an alphaherpesvirus genome, e.g., from the pseudorabies virus. In some embodiments, the promoter comprises a latency-associated promoter (LAP) region from an alphaherpesvirus genome.

In particular embodiments, the LAP region utilized in the vectors of the present invention is selected from SEQ ID NO: 1 (also referred to herein as LAP1), SEQ ID NO: 2 (also referred to herein as LAP2), SEQ ID NO: 3 (also referred to herein as LAP1_2), and SEQ ID NO: 4 (Table 1). LAP1_2 (880 bp) includes a 476-bp sequence of LAP1 (498 bp) and the complete LAP2 sequence (404 bp), i.e., LAP1 and LAP2 in tandem but missing the first 22 bp of the LAP1 sequence. SEQ ID NO: 4 (902 bp) comprises the complete sequences of SEQ ID NO: 1 and SEQ ID NO: 2, and is 22 bp longer than SEQ ID NO: 3.

In some embodiments, the promoter comprises a nucleic acid sequence having at least 70%, at least 75%, at least 80%, at least 85%, at least 90%, at least 95%, at least 96%, at least 97%, at least 98% or at least 99% sequence identity to a nucleic acid sequence selected from SEQ ID NO: 1, SEQ ID NO: 2, SEQ ID NO: 3 and SEQ ID NO: 4. In some embodiments, the promoter comprises a nucleic acid sequence selected from SEQ ID NO: 1, SEQ ID NO: 2, SEQ ID NO: 3 and SEQ ID NO: 4.

Without wishing to be bound by theory, it is believed that certain active portions or fragments of a LAP region from an alphaherpesvirus genome can drive expression of a transgene in a variety of cell and tissue types. In some embodiments, the promoter used in the present invention comprises a nucleic acid sequence having at least 70% sequence identity to SEQ ID NO: 9 (Table 1). SEQ ID NO: 9 consists of a 232-bp "core" sequence of LAP2 and includes a TATA box sequence. In some embodiments, the promoter comprises a nucleic acid sequence having at least 75%, at least 80%, at least 85%, at least 90%, at least 95%, at least 96%, at least 97%, at least 98% or at least 99% sequence identity to SEQ ID NO: 9. In some embodiments, the promoter comprises SEQ ID NO: 9.

Without wishing to be bound by theory, LAP sequences further comprising SEQ ID NO: 10, SEQ ID NO: 11, and/or SEQ ID NO: 12 (Table 1) may have improved transcriptional performance. Accordingly, in some embodiments, the promoter further comprises SEQ ID NO: 10, SEQ ID NO: 11, SEQ ID NO: 12, or a combination thereof, e.g., at the 5' or the 3' of SEQ ID NO: 9. SEQ ID NO: 10 (the "CTCF" motif) has been shown to be involved in the epigenetic regulation of herpes virus gene expression, chromatin remodeling and recruitment of transcription factors and proteins (Lang et al., 2017, Lee et al., 2018). SEQ ID NO: 11 (the "alternative CTCF with upstream stabilizer" motif) has been shown to stabilize an alternative CTCF motif and facilitate binding of four more zinc finger domains (Zimmerman et al., 2018). SEQ ID NO: 12 (the "Nuclear transcription factor Y (NF-Y)" motif) is recognized by a transcription factor that binds to the CAAT box located in the promoter regions of several eukaryotes (Chikhirzhina et al., 2008; Fleming et al., 2013).

TABLE 1

Latency-Associated Promoter (LAP) Nucleic Acid Sequences

| SEQ ID NO: | Nucleic Acid Sequence |
|---|---|
| LAP1 (498 bp) SEQ ID NO: 1 | GGGGGAGTCGGGGGGGAGTCGGGGGGGAGTCGGGGGGTCCCAGTTCGGCGCGGTCTCCACAGCGCACAAAGTCCGGCTGCAGT AAATTTACTGCGGGTGCAGTTACCCTGGCGGCCACACCGGCCCGATGGCGCTGCAGTAACTCTACTGCAGCTACAGTTTACTACA GTTGCAGTACCGCGCGCCGCCGCCAAATACTACAGTAGATTTCCTGTGGCCGCCGCGTACTGCAGTTTACCGCGGCTGCAGTAAA CTGCAGTATCGCGCGGTAAATTGCAGTCTGGCAGCCGCGCGTTACTGCAATTAGCGGTGGCTCCCGACACTCTGGCCAATTGGTG CTAATGGGCCGTGATGGTCCATGTGGGGGTGATGTAACCGCCGGGCCCGGTTGGGCACTCAGATGGTGGCCGGGCGCCAGGCCA AAGTGCTGTCTGAGTGCCACTTTATGACTTTGTTTTTCTCAAACAACATCAATTATGGATGCACATCGTGTATATA |
| LAP2 (404 bp) SEQ ID NO: 2 | ATCCCCGGTCCGCGCTCCGCCCACCCATCACAGCAGCCGCGGACGCTGCGCGCCGGAGCGGTCCATCTCGCCAGCCAGCCAACCA GCCGAGCCGCCCAGCCGACCCGAGAGCCCCGAGAGCCAGACTCCCTCAGCCATAGAAGACACCGGGCGGGAGAGACGGACTGA AAAAATATATCTTTTTTTATTTTGTCTGGGCCTGGAGACCCGCAGCAGGAGCGGAGGTGGGTGCGGGGCCGGGAGCCGGAGCAG GACCGGGAACAGGAACAGGAACAGGAACAGGAACAGGAACAGGAGGTGGGGCCGGGAGCAGGAGCAGGAGGGAGCCGAAGT GGGGGCAGGAGCGGCGGCGGCCGCAGCAGCAACAGGGTCGCCCCAGTCCGCGGCGAGGAAGAGGGAGCTC |
| LAP1_2 (880 bp) SEQ ID NO: 3 | GGGGGAGTCGGGGGGTCCCAGTTCGGCGCGGTCTCCACAGCGCACAAAGTCCGGCTGCAGTAAATTTACTGCGGGTGCAGTTAC CCTGGCGGCCACACCGGCCCGATGGCGCTGCAGTAACTCTACTGCAGCTACAGTTTACTACAGTTGCAGTACCGCGCGCCGCCGC CAAATACTACAGTAGATTTCCTGTGGCCGCCGCGTACTGCAGTTTACCGCGGCTGCAGTAAACTGCAGTATCGCGCGGTAAATTG CAGTCTGGCAGCCGCGCGTTACTGCAATTAGCGGTGGCTCCCGACACTCTGGCCAATTGGTGCTAATGGGCCGTGATGGTCCATG TGGGGGTGATGTAACCGCCGGGCCCGGTTGGGCACTCAGATGGTGGCCGGGCGCCAGGCCAAAGTGCTGTCTGAGTGCCACTTTA TGACTTTGTTTTTCTCAAACAACATCAATTATGGATGCACATCGTGTATATAATCCCCGGTCCGCGCTCCGCCCACCCATCACAGC AGCCGCGGACGCTGCGCGCCGGAGCGGTCCATCTCGCCAGCCAGCCAACCAGCCGAGCCGCCCAGCCGACCCGAGAGCCCCGAG AGCCAGACTCCCTCAGCCATAGAAGACACCGGGCGGGAGAGACGGACTGAAAAAATATATCTTTTTTTATTTTGTCTGGGCCTGG AGACCCGCAGCAGGAGCGGAGGTGGGTGCGGGGCCGGGAGCCGGAGCAGGACCGGGAACAGGAACAGGAACAGGAACAGGAA CAGGAACAGGAGTGGGGCCGGGAGCAGGAGCAGGAGCGGGAGCCGAAGTGGGGGCAGGAGCGGCGGCGGCCGCAGCAGCAAC AGGGTCGCCCCAGTCCGCGGCGAGGAAGAGGGAGCTC |
| (902 bp) SEQ ID NO: 4 | GGGGGAGTCGGGGGGGAGTCGGGGGGGAGTCGGGGGGTCCCAGTTCGGCGCGGTCTCCACAGCGCACAAAGTCCGGCTGCAGT AAATTTACTGCGGGTGCAGTTACCCTGGCGGCCACACCGGCCCGATGGCGCTGCAGTAACTCTACTGCAGCTACAGTTTACTACA GTTGCAGTACCGCGCGCCGCCGCCAAATACTACAGTAGATTTCCTGTGGCCGCCGCGTACTGCAGTTTACCGCGGCTGCAGTAAA CTGCAGTATCGCGCGGTAAATTGCAGTCTGGCAGCCGCGCGTTACTGCAATTAGCGGTGGCTCCCGACACTCTGGCCAATTGGTG CTAATGGGCCGTGATGGTCCATGTGGGGGTGATGTAACCGCCGGGCCCGGTTGGGCACTCAGATGGTGGCCGGGCGCCAGGCCA AAGTGCTGTCTGAGTGCCACTTTATGACTTTGTTTTTCTCAAACAACATCAATTATGGATGCACATCGTGTATATAATCCCCGGTC CGCGCTCCGCCCACCCATCACAGCAGCCGCGGACGCTGCGCGCCGGAGCGGTCCATCTCGCCAGCCAGCCAACCAGCCGAGCCG CCCAGCCGACCCGAGAGCCCCGAGAGCCAGACTCCCTCAGCCATAGAAGACACCGGGCGGGAGAGACGGACTGAAAAAATATA TCTTTTTTTATTTTGTCTGGGCCTGGAGACCCGCAGCAGGAGCGGAGGTGGGTGCGGGGCCGGGAGCCGGAGCAGGACCGGAA CAGGAACAGGAACAGGAACAGGAACAGGAGTGGGGCCGGGAGCAGGAGCAGGAGCGGGAGCCGAAGTGGGGGCAGG AGCGGCGGCGGCCGCAGCAGCAACAGGGTCGCCCCAGTCCGCGGCGAGGAAGAGGGAGCTC |
| Equine herpes virus SEQ ID NO: 5 | GGGCTCGGCGGCGGGGAGCCTCGGTGATGGGCAGCACCAGGGGCTCGGCCTCGGCGTCGGGCTCCAGCAGCGCCACCCGGCAGA ACTCGCTCAGCAGCTCGGGGATCAGAAGCTCCGAGGGCTCCACGGCCCCAGCGCCGCGCGCCGGCCGCAGGCGAGGTACACGGGGC GCAGCCAGGCCCCGAGTCCCCATCGGTTGGCCGCGCGGTGGCTCTGCGCGGCGCCCTCCTCAAAGTCCGGGTCGTGGAACCCGAG GCCCTCGGCCTGGGCCCGCATGTCCTTGCAGCCGTCGTAGTCGGGCAGGACGCGCTGGCGGTACTCCCTCGGAGCCAGGGGAACG CGGGTGCGCTCGCCGGCGCGAGTGTCCACCGTGTAGGCCACGTTGGAGGAGCGGCACAGCCTCAGGGGCGCAGAGTCCGGGTAC AGGCGCGCGAACGCGGCCTCGGCCCTCGCGAACAGTCCGGGCCCGAAGAGGGTGCTGGAGGTGAGGACCGCGCGGCTGAGGTG GCGCTCCCGGGGCCAGCGCACGGCGCAGGCGACCCGCGGAGTCAGGGCGGCCCGCATGTAGATGTGGTACTGGCTGATCGCGGG ACCGTCCTGGGGCCAATCCTCGGTGGAGACCGCGTCCAGCACCAGGAGCTTGCGCCTGGCGGAGCCCAGGCGCAGGCAGAGGTA CTCGACGCAGCCGGTGAAGGCCAGGTCCCCGGTCGACAGCAGCAGGACCCCCTGGGCGTTGAGGGCCGAGACGTCCGGGGCCCC GGTCCAGTTGCCGGCCCAGGCGTGGGACCGCTTGGTGAGGATGCGGTTCCCCAGGGCCGCCAGCAGCGCCGAGAGTCCCCCCTTG AGGTCGGACCAGAGGGGCTCGCGCCGAGAGCCGCCGGGGCGGGAGGCCGGGAGTCCGCCCAGCAGGTCCTCGTCCTGGAGCGG GGAGTAGAGGACCACCACCTTCACGTCCTCGGGGTCGGGGATCTGGTGCATCCAGGCGGCCCTCCGTCTCAGCGGGCCGCTGGCC GCCAGCTCCCCGAAGCGCGCGCCGTCCCGGGCCGGGGGCCGCT |
| bovine herpes virus SEQ ID NO: 6 | GCTCCAGTCGACGCCGCCCCGGCCGTGCTGCTCCAGGAACGCGTTGGCCTCGGCAAAGTGCGTGCAGTGAACGAAGGGCGCTCG TGACAGCGGCGAGGGGTGGCTGTACGTCAGCACGAGGTGCCGCTTCCCGGCCGCCCAAAGGCCCGCTGGGCGTGCGCGCCCA GAGCATGAACACCAGCGGGCCGCTCTCCGCGCTCAGGCGGGCCAGTACCGCGTGCACCAGCCGCCCCAGCCCAGGCTAGAGTG CGAGCCCGGCGCCCCGCTCCGCACGGTGAGCGAGGTGTTAAGCAGCAGCACGCCGCGGCGCGCCCAGTCCTCTAGGCAGCCGTG CGACGGCCGCGGAGCTCCGGGAAAGTTCTTCTGCACGGCAGCGTAGATGTTCTGGAGGCTGGGTGGGACCGGAACGCCGCGGTT CACGCTAAAAGCCAAGCCGTGGGCTTGCCCGCGGCTGTGATAGGGGTCCTGGCCCAGAATGACAACCTTGATGTCCTCGGGTGCC GCGTAACGCGTCCACGCGAAGATGTCCGCTTTCGGAGGCAGCACTTGCTCGACGCGGCTCCGGCGCTCGTATTCGCGCAGCGCGT GTCGCGTGTAGGGCATGGCCAGCTCGGGTTCCAGCACGCGCCGCCAGGCTTCGTGGACGCCAAATTCAGCGGCGAATGCCCCCA |

TABLE 1-continued

Latency-Associated Promoter (LAP) Nucleic Acid Sequences

| SEQ ID NO: | Nucleic Acid Sequence |
|---|---|
| | AGTAATGGCACGCTGGTCTTCTAGCGCTGTTACGCACGCGGGAAGTCCATTGGGGCGCCGGCGCTTGGGCGGCGCGGCACCCCGC<br>AAGCGGGGACAAAGACTTTCGGCGCGTTTGGGCCGAAGCCGGGGCCGAAGCCGGGGCCGAAGCCGGGGCCGAAGCCGGGGCCG<br>AAGCCGGGGCCGAAGCCGGGGCCGAAGCCGGGCCGGGGCCGGGGCCGGGGCATCGCTAGCGGTAGATGCCGTCGCCAGGGCC<br>GCAGGGACCAGTCGTGTGGTATCGGGGCGGCAGGACGCAC |
| varicella zoster virus SEQ ID NO: 7 | CGGGGAGGTGGGGTCGCTTTTTTTTTTCTCTCTCGAGGGGGCCGCGAGAGGGCTGGCCTCCTCTCCCGGGGTCCGCCGGGCGCCC<br>AGAAACCGGGGGGGGGTTATTTTCGGGGGGGGGTCCGACCAGCCCGCCCGTCGCCCGCCCGCACAGACAGACAGACACTTTTTT<br>CATAAAAACCGTTCCGCTTTTATTAACAACAAACAGTCCGCGCCCAGTGGCGCTCACGAGAAAAGGAGGGGACTCCGTCACCC<br>CCGACTCTGCGGGGGGCTCCTCCCCCCGCGCCCTCCCCACACATCGTCCTCGTCCTCGGAGGACGAGGACGAGGACAACAGCTCC<br>ACCTTGACCGCCGGGCGCAAACCCACCCGGCGGTCTCGCAGCACACCCGGGGCCACCGACACGATGCTCACCCCAAAGGATGAC<br>CCCGGTGCGTCCCCGTCGTCCCCGCCCCCCTCCTCGCTGTCCCACGCGTCTTCACACCCCACCTCCCAATCGTCCAGCTCCAAAGC<br>GTGTTCTCTGTCGTCTGCGGTGCGCCGCTGTCGCCCCGCCTGGGTTTCTGACGGCCGTTCCGAGCCCCCGTGGTGTCCGAACACGA<br>ACCGTGTTCCGTCGCTCCCCTCCAACACCGTCTCCGCGGCCCCAAAACCGGGCGGCCACATTACTCTGGGAATCGGGGGGAGGGC<br>ATTCCGAGCCTCGTCCGCCGACGCATACAGCGCCACCGACCGACCGGCCACGGGTGGAAGCACGAGTGGTTCTGCGGCAGGGTC<br>GGGTTCCAGCAGGGCGTGGCGGCAAAACACCCTCGCCCAGGTGGGTACGTCGCCGGCCTCCGGCCCGGCGGCCCCCGGTCTCCGT<br>CCCTCGGGAAGGAAGACGGGTCGAAGCGCGGCACCCAGGCCCCATCGGTTTGCTGCGCGGTGGCTATGTGCCGCCTCGTCCACA<br>AAGTCGGCTGCCCCGAGCCCCAGACCCCGAGACTGTCGCGCGAGGTC |
| Macacine herpesvirus 1 SEQ ID NO: 8 | GAGCGCGGCGCGCCAGGCCTCGGGGAAGAGCGGGTGGTCGGTCAGCTCGGCGACGACGCGCGGGGCGCAGTAGGCCTCGAGGG<br>CGGCGGCGGAGGGCGCCGGCGTGTGGCTGGGCCCCGGCGGCACGCGGCGCCAGCCGCCGCGGGGTCGGGCCCGGCGGGCGGT<br>CGCGCCGTCAGCGCGGCGGGCCGCGGGCGGGGCCGGGCGCCGGCCCCGGGGGCGGGGCCGCGGCGCCGGGCCGGCTCTTC<br>TTGCGCGCCGGCGGGCAGGCGGCGGCGGCGGCGGGCCGGGCGCGCCGGCGAGGAGCTCTTGCGCTTGCGCGCCGGCGGGCGCGCG<br>GCGCCGCCCGCGTCTGCGTCGGCCAGCAGGGGCGCAGGCTCTGGTTCTGGAAGAGCAGGTCGGCGGCGGCGGCGCCGGCGGAG<br>CGCACCTGGCGCGGGCCGCGCGCCAGCAGCGGCGGCCGCCGGCGACGAGGCTGACGGCGCGCACGGCGGCGACGGCGGC<br>CTCGGCGCCGCCGGCGACGCGGAGGTCCCCGCGCAGGCGCATGAGCACCAGCGCGTCGCGCGTGCGGCGCAGCTCGCGCAGCCA<br>GAGGCGCGGGCGCGGCGGCGGCGGCGGGGCCGCGGCGGCGGCACGGCGCGCGCGGCCGCCAGCCCGGGCACGGCGGCCA<br>GGTCGCCGCCGTAGCCCTCGGCCAGCGCCTCCAGCACGGCGCGGCAGGCCGTGAGGCACTCGGCGGCGGCGGCGGCCGCGGCGT<br>CGTCGTCGTCGTCCTCGTCCTCCCCCGCCGGCCCCGGCGGGGCCGTCTCCCCGGCGCCGGCGGGGCCCTCGTCGGAGAGGGC<br>GGCCGCCAGGCGGCGCGCTGCGCGGCGATGACGCCCGCGGCGCCGTACCCGGCGGGAACGGCGGGGACCGCGGCGGCGTCGGGCT<br>CGGGGCGGCGGCGGCGGCGGCGGCGCCCGCCGCGGCGGCGTTCTCGCGCGCCAGCAGGGGCGCGTACGCGCGCCGCAGG<br>CTGGTGATGAGGAAGCCC |
| SEQID NO: 9 | ATATATCTTTTTTTATTTTGTCTGGGCCTGGAGACCCGCAGCAGGAGCGGAGGTGGGTGCGGGGCCGGGAGCCGGAGCAGGACC<br>GGGAACAGGAACAGGAACAGGAACAGGAACAGGAACAGGAGTGGGGCCGGGAGCAGGAGCAGGAGCGGGAGCCGAAGTGGGG<br>GCAGGAGCGGCGGCGGCCGCAGCAGCAACAGGGTCGCCCCAGTCCGCGGCGAGGAAGAGGGAGCTC |
| SEQ ID NO: 10 | CCGCGAGGAGGCAG |
| SEQ ID NO: 11 | TGGTGCCCTCTGGTGGTCTTCTAGAGGAATTGCA |
| SEQ ID NO: 12 | TCAGCCAATCAGCGAG |
| LAP2.1 (232 bp) SEQ ID NO: 13 | ATATATCTTTTTTTATTTTGTCTGGGCCTGGAGACCCGCAGCAGGAGCGGAGGTGGGTGCGGGGCCGGGAGCCGGAGCAGGACC<br>GGGAACAGGAACAGGAACAGGAACAGGAACAGGAACAGGAGTGGGGCCGGGAGCAGGAGCAGGAGCGGGAGCCGAAGTGGGG<br>GCAGGAGCGGCGGCGGCCGCAGCAGCAACAGGGTCGCCCCAGTCCGCGGCGAGGAAGAGGGAGCTC |
| LAP2.2 (246 bp) SEQ ID NO: 14 | ATATATCTTTTTTTATTTTGTCTGGGCCTGGAGACCCGCAGCAGGAGCGGAGGTGGGTGCGGGGCCGGGAGCCGGAGCAGGACC<br>GGGAACAGGAACAGGAACAGGAACAGGAACAGGAACAGGAGTGGGGCCGGGAGCAGGAGCAGGAGCGGGAGCCGAAGTGGGG<br>GCAGGAGCGGCGGCGGCCGCAGCAGCAACAGGGTCGCCCCAGTCCGCGGCGAGGAAGAGGGAGCTC*CCGCGAGGAGGGAG* |
| LAP2.3 (266 bp) SEQ ID NO: 15 | ATATATCTTTTTTTATTTTGTCTGGGCCTGGAGACCCGCAGCAGGAGCGGAGGTGGGTGCGGGGCCGGGAGCCGGAGCAGGACC<br>GGGAACAGGAACAGGAACAGGAACAGGAACAGGAACAGGAGTGGGGCCGGGAGCAGGAGCAGGAGCGGGAGCCGAAGTGGGG<br>GCAGGAGCGGCGGCCGCCGCAGCAGCAACAGGGTCGCCCCAGTCCGCGGCGAGGAAGAGGGAGCTCT*GGTGCCCTCTGGTGGTC<br>TTCTAGAGGAATTGCA* |
| LAP2.4 (248 bp) SEQ ID NO: 16 | *TCAGCCAATCAGCGAG*ATATATCTTTTTTTATTTTGTCTGGGCCTGGAGACCCGCAGCAGGAGCGGAGGTGGGTGCGGGGCCGGGA<br>GCCGGAGCAGGACCGGGAACAGGAACAGGAACAGGAACAGGAACAGGAACAGGAGTGGGGCCGGGAGCAGGAGCAGGAGCGG<br>GAGCCGAAGTGGGGGCAGGAGCGGCGGCGGCCGCAGCAGCAACAGGGTCGCCCCAGTCCGCGGCGAGGAAGAGGGAGCTC |
| LAP2.5 (246 bp) SEQ ID NO: 17 | *CCGCGAGGAGGCAG*ATATATCTTTTTTTATTTTGTCTGGGCCTGGAGACCCGCAGCAGGAGCGGAGGTGGGTGCGGGGCCGGGAG<br>CCGGAGCAGGACCGGGAACAGGAACAGGAACAGGAACAGGAACAGGAACAGGAGTGGGGCCGGGAGCAGGAGCAGGAGCGGG<br>AGCCGAAGTGGGGGCAGGAGCGGCGGCGGCCGCAGCAGCAACAGGGTCGCCCCAGTCCGCGGCGAGGAAGAGGGAGCTC |
| LAP2.6 (266 bp) SEQ ID NO: 18 | *TGGTGCCCTCTGGTGGTCTTCTAGAGGAATTGCA*ATATATCTTTTTTTATTTTGTCTGGGCCTGGAGACCCGCAGCAGGAGCGGAG<br>GTGGGTGCGGGGCCGGGAGCCGGAGCAGGACCGGGAACAGGAACAGGAACAGGAACAGGAACAGGAACAGGAGTGGGGCCGGG<br>AGCAGGAGCAGGAGCGGGAGCCGAAGTGGGGGCAGGAGCGGCGGCGGCCGCAGCAGCAACAGGGTCGCCCCAGTCCGCGGCGA<br>GGAAGAGGGAGCTC |

TABLE 1-continued

Latency-Associated Promoter (LAP) Nucleic Acid Sequences

| SEQ ID NO: | Nucleic Acid Sequence |
|---|---|
| LAP2.7 (248 bp) SEQ ID NO: 19 | ATATATCTTTTTTTATTTTGTCTGGGCCTGGAGACCCGCAGCAGGAGCGGAGGTGGGTGCGGGGCCGGGAGCCGGAGCAGGACC GGGAACAGGAACAGGAACAGGAACAGGAACAGGAACAGGAGTGGGGCCGGGAGCAGGAGCAGGAGCGGGAGCCGAAGTGGGG GCAGGAGCGGCGGCGGCCGCAGCAGCAACAGGGTCGCCCCAGTCCGCGGCGAGGAAGAGGGAGCTCT*CAGCCAATCAGCGAG* |
| LAP2.8 (236 bp) SEQ ID NO: 20 | AAAAATATATCTTTTTTTATTTTGTCTGGGCCTGGAGACCCGCAGCAGGAGCGGAGGTGGGTGCGGGGCCGGGAGCCGGAGCAG GACCGGGAACAGGAACAGGAACAGGAACAGGAACAGGAACAGGAGTGGGGCCGGGAGCAGGAGCAGGAGCGGGAGCCGAAGT GGGGGCAGGAGCGGCGGCGGCCGCAGCAGCAACAGGGTCGCCCCAGTCCGCGGCGAGGAAGAGGGAGCTC |
| LAP2.9 (250 bp) SEQ ID NO: 21 | AAAAATATATCTTTTTTTATTTTGTCTGGGCCTGGAGACCCGCAGCAGGAGCGGAGGTGGGTGCGGGGCCGGGAGCCGGAGCAG GACCGGGAACAGGAACAGGAACAGGAACAGGAACAGGAACAGGAGTGGGGCCGGGAGCAGGAGCAGGAGCGGGAGCCGAAGT GGGGGCAGGAGCGGCGGCGGCCGCAGCAGCAACAGGGTCGCCCCAGTCCGCGGCGAGGAAGAGGGAGCTC*CCGCGAGGAGGGA G* |
| LAP2.10 (270 bp) SEQ ID NO: 22 | AAAAATATATCTTTTTTTATTTTGTCTGGGCCTGGAGACCCGCAGCAGGAGCGGAGGTGGGTGCGGGGCCGGGAGCCGGAGCAG GACCGGGAACAGGAACAGGAACAGGAACAGGAACAGGAACAGGAGTGGGGCCGGGAGCAGGAGCAGGAGCGGGAGCCGAAGT GGGGGCAGGAGCGGCGGCGGCCGCAGCAGCAACAGGGTCGCCCCAGTCCGCGGCGAGGAAGAGGGAGCTC*TGGTGCCCTCTGGT GGTCTTCTAGAGGAATTGCA* |
| LAP2.11 (252 bp) SEQ ID NO: 23 | *TCAGCCAATCAGCGAG*AAAAATATATCTTTTTTTATTTTGTCTGGGCCTGGAGACCCGCAGCAGGAGCGGAGGTGGGTGCGGGGCC GGGAGCCGGAGCAGGACCGGGAACAGGAACAGGAACAGGAACAGGAACAGGAACAGGAGTGGGGCCGGGAGCAGGAGCAGGA GCGGGAGCCGAAGTGGGGGCAGGAGCGGCGGCGGCCGCAGCAGCAACAGGGTCGCCCCAGTCCGCGGCGAGGAAGAGGGAGCT C |
| LAP2.12 (250 bp) SEQ ID NO: 24 | *CCGCGAGGAGGGAGAA*AAAATATATCTTTTTTTATTTTGTCTGGGCCTGGAGACCCGCAGCAGGAGCGGAGGTGGGTGCGGGGCCG GGAGCCGGAGCAGGACCGGGAACAGGAACAGGAACAGGAACAGGAACAGGAGTGGGGCCGGGAGCAGGAGCAGGAG CGGGAGCCGAAGTGGGGGCAGGAGCGGCGGCGGCCGCAGCAGCAACAGGGTCGCCCCAGTCCGCGGCGAGGAAGAGGGAGCTC |
| LAP2.13 (270 bp) SEQ ID NO: 25 | *TGGTGCCCTCTGGTGGTCTTCTAGAGGAATTGCA*AAAAAATATATCTTTTTTTATTTTGTCTGGGCCTGGAGACCCGCAGCAGGAGC GGAGGTGGGTGCGGGGCCGGGAGCCGGAGCAGGACCGGGAACAGGAACAGGAACAGGAACAGGAACAGGAACAGGAGTGGGGC CGGGAGCAGGAGCAGGAGCGGGAGCCGAAGTGGGGGCAGGAGCGGCGGCGGCCGCAGCAGCAACAGGGTCGCCCCAGTCCGCG GCGAGGAAGAGGGAGCTC |
| LAP2.14 (252 bp) SEQ ID NO: 26 | AAAAATATATCTTTTTTTATTTTGTCTGGGCCTGGAGACCCGCAGCAGGAGCGGAGGTGGGTGCGGGGCCGGGAGCCGGAGCAG GACCGGGAACAGGAACAGGAACAGGAACAGGAACAGGAACAGGAGTGGGGCCGGGAGCAGGAGCAGGAGCGGGAGCCGAAGT GGGGGCAGGAGCGGCGGCGGCCGCAGCAGCAACAGGGTCGCCCCAGTCCGCGGCGAGGAAGAGGGAGCTC*TCAGCCAATCAGCG AG* |
| LAP2.15 (329 bp) SEQ ID NO: 27 | CAGCCAACCAGCCGAGCCGCCCAGCCGACCCGAGAGCCCCGAGAGCCAGACTCCCTCAGCCATAGAAGACACCGGGCGGGAGA GACGGACTGAAAAAATATATCTTTTTTTATTTTGTCTGGGCCTGGAGACCCGCAGCAGGAGCGGAGGTGGGTGCGGGGCCGGGA GCCGGAGCAGGACCGGGAACAGGAACAGGAACAGGAACAGGAACAGGAACAGGAGTGGGGCCGGGAGCAGGAGCAGGAGCGG GAGCCGAAGTGGGGGCAGGAGCGGCGGCGGCCGCAGCAGCAACAGGGTCGCCCCAGTCCGCGGCGAGGAAGAGGGAGCTC |
| LAP2.16 (383 bp) SEQ ID NO: 28 | CACCCATCACAGCAGCCGCGGACGCTGCGCGCCGGAGCGGTCCATCTCGCCAGCCAGCCAACCAGCCGAGCCGCCCAGCCGACC CGAGAGCCCCGAGAGCCAGACTCCCTCAGCCATAGAAGACACCGGGCGGGAGAGACGGACTGAAAAAATATATCTTTTTTTATT TTGTCTGGGCCTGGAGACCCGCAGCAGGAGCGGAGGTGGGTGCGGGGCCGGGAGCCGGAGCAGGACCGGGAACAGGAACAGGA ACAGGAACAGGAACAGGAACAGGAGTGGGGCCGGGAGCAGGAGCAGGAGCGGGAGCCGAAGTGGGGGCAGGAGCGGCGGCGG CCGCAGCAGCAACAGGGTCGCCCCAGTCCGCGGCGAGGAAGAGGGAGCTC |
| LAP2.17 (397 bp) SEQ ID NO: 29 | CACCCATCACAGCAGCCGCGGACGCTGCGCGCCGGAGCGGTCCATCTCGCCAGCCAGCCAACCAGCCGAGCCGCCCAGCCGACC CGAGAGCCCCGAGAGCCAGACTCCCTCAGCCATAGAAGACACCGGGCGGGAGAGACGGACTGAAAAAATATATCTTTTTTTATT TTGTCTGGGCCTGGAGACCCGCAGCAGGAGCGGAGGTGGGTGCGGGGCCGGGAGCCGGAGCAGGACCGGGAACAGGAACAGGA ACAGGAACAGGAACAGGAACAGGAGTGGGGCCGGGAGCAGGAGCAGGAGCGGGAGCCGAAGTGGGGGCAGGAGCGGCGGCGG CCGCAGCAGCAACAGGGTCGCCCCAGTCCGCGGCGAGGAAGAGGGAGCTC*CCGCGAGGAGGCAG* |
| LAP2.18 (417 bp) SEQ ID NO: 30 | CACCCATCACAGCAGCCGCGGACGCTGCGCGCCGGAGCGGTCCATCTCGCCAGCCAGCCAACCAGCCGAGCCGCCCAGCCGACC CGAGAGCCCCGAGAGCCAGACTCCCTCAGCCATAGAAGACACCGGGCGGGAGAGACGGACTGAAAAAATATATCTTTTTTTATT TTGTCTGGGCCTGGAGACCCGCAGCAGGAGCGGAGGTGGGTGCGGGGCCGGGAGCCGGAGCAGGACCGGGAACAGGAACAGGA ACAGGAACAGGAACAGGAACAGGAGTGGGGCCGGGAGCAGGAGCAGGAGCGGGAGCCGAAGTGGGGGCAGGAGCGGCGGCGG CCGCAGCAGCAACAGGGTCGCCCCAGTCCGCGGCGAGGAAGAGGGAGCTC*TGGTGCCCTCTGGTGGTCTTCTAGAGGAATTGCA* |
| LAP2.19 (399 bp) SEQ ID NO: 31 | *TCAGCCAATCAGCGAG*CACCCATCACAGCAGCCGCGGACGCTGCGCGCCGGAGCGGTCCATCTCGCCAGCCAGCCAACCAGCCGA GCCGCCCAGCCGACCCGAGAGCCCCGAGAGCCAGACTCCCTCAGCCATAGAAGACACCGGGCGGGAGAGACGGACTGAAAAAATATATCTTTTTTTATTTTGTCTGGGCCTGGAGACCCGCAGCAGGAGCGGAGGTGGGTGCGGGGCCGGGAGCCGGAGCAGGACCG GGAACAGGAACAGGAACAGGAACAGGAACAGGAGTGGGGCCGGGAGCAGGAGCAGGAGCGGGAGCCGAAGTGGGGG CAGGAGCGGCGGCGGCCGCAGCAGCAACAGGGTCGCCCCAGTCCGCGGCGAGGAAGAGGGAGCTC |
| LAP2.20 (397 bp) SEQ ID NO: 32 | *CCGCGAGGAGGCAG*CACCCATCACAGCAGCCGCGGACGCTGCGCGCCGGAGCGGTCCATCTCGCCAGCCAGCCAACCAGCCGAG CCGCCCAGCCGACCCGAGAGCCCCGAGAGCCAGACTCCCTCAGCCATAGAAGACACCGGGCGGGAGAGACGGACTGAAAAAAT ATATCTTTTTTTATTTTGTCTGGGCCTGGAGACCCGCAGCAGGAGCGGAGGTGGGTGCGGGGCCGGGAGCCGGAGCAGGACCG GAACAGGAACAGGAACAGGAACAGGAACAGGAGTGGGGCCGGGAGCAGGAGCAGGAGCGGGAGCCGAAGTGGGGGC AGGAGCGGCGGCGGCCGCAGCAGCAACAGGGTCGCCCCAGTCCGCGGCGAGGAAGAGGGAGCTC |

TABLE 1-continued

Latency-Associated Promoter (LAP) Nucleic Acid Sequences

| SEQ ID NO: | Nucleic Acid Sequence |
|---|---|
| LAP2.21 (417 bp) SEQ ID NO: 33 | *TGGTGCCCTCTGGTGGTCTTCTAGAGGAATTGCA*CACCCATCACAGCAGCCGCGGACGCTGCGCGCCGGAGCGGTCCATCTCGCCA GCCAGCCAACCAGCCGAGCCGCCCAGCCGACCCGAGAGCCCCGAGAGCCAGACTCCCTCAGCCATAGAAGACACCGGGCGGGAG AGACGGACTGAAAAAATATATCTTTTTTTATTTTGTCTGGGCCTGGAGACCCGCAGCAGGAGCGGAGGTGGGTGCGGGGCCGGG AGCCGGAGCAGGACCGGGAACAGGAACAGGAACAGGAACAGGAACAGGAGTGGGGCCGGGAGCAGGACCGGGAACAGGGAGCTC GGAGCCGAAGTGGGGGCAGGAGCGGCGGCGGCCGCAGCAGCAACAGGGTCGCCCCAGTCCGCGGCGAGGAAGAGGGAGCTC |
| LAP2.22 (399 bp) SEQ ID NO: 34 | CACCCATCACAGCAGCCGCGGACGCTGCGCGCCGGAGCGGTCCATCTCGCCAGCCAGCCAACCAGCCGAGCCGCCCAGCCGACC CGAGAGCCCCGAGAGCCAGACTCCCTCAGCCATAGAAGACACCGGGCGGGAGAGACGGACTGAAAAAATATATCTTTTTTTATT TTGTCTGGGCCTGGAGACCCGCAGCAGGAGCGGAGGTGGGTGCGGGGCCGGGAGCCGGAGCAGGACCGGGAACAGGAACAGGA ACAGGAACAGGAACAGGAACAGGAGTGGGGCCGGGAGCAGGAGCAGGAGCGGGAGCCGAAGTGGGGGCAGGAGCGGCGGCGG CCGCAGCAGCAACAGGGTCGCCCCAGTCCGCGGCGAGGAAGAGGGAGCTC*TCAGCCAATCAGCGAG* |
| LAP2.23 (386 bp) SEQ ID NO: 35 | GCCCACCCATCACAGCAGCCGCGGACGCTGCGCGCCGGAGCGGTCCATCTCGCCAGCCAGCCAACCAGCCGAGCCGCCCAGCCG ACCCGAGAGCCCCGAGAGCCAGACTCCCTCAGCCATAGAAGACACCGGGCGGGAGAGACGGACTGAAAAAATATATCTTTTTTT ATTTTGTCTGGGCCTGGAGACCCGCAGCAGGAGCGGAGGTGGGTGCGGGGCCGGGAGCCGGAGCAGGACCGGGAACAGGAACA GGAACAGGAACAGGAACAGGAGTGGGGCCGGGAGCAGGAGCAGGAGCGGGAGCCGAAGTGGGGGCAGGAGCGGCG CGGCCGCAGCAGCAACAGGGTCGCCCCAGTCCGCGGCGAGGAAGAGGGAGCTC |
| LAP2.24 (387 bp) SEQ ID NO: 36 | CGCCCACCCATCACAGCAGCCGCGGACGCTGCGCGCCGGAGCGGTCCATCTCGCCAGCCAGCCAACCAGCCGAGCCGCCCAGCC GACCCGAGAGCCCCGAGAGCCAGACTCCCTCAGCCATAGAAGACACCGGGCGGGAGAGACGGACTGAAAAAATATATCTTTTTT TATTTTGTCTGGGCCTGGAGACCCGCAGCAGGAGCGGAGGTGGGTGCGGGGCCGGGAGCCGGAGCAGGACCGGGAACAGGAAC AGGAACAGGAACAGGAACAGGAACAGGAGTGGGGCCGGGAGCAGGAGCAGGAGCGGGAGCCGAAGTGGGGGCAGGAGCGGCG GCGGCCGCAGCAGCAACAGGGTCGCCCCAGTCCGCGGCGAGGAAGAGGGAGCTC |
| LAP2.25 (388 bp) SEQ ID NO: 37 | CCGCCCACCCATCACAGCAGCCGCGGACGCTGCGCGCCGGAGCGGTCCATCTCGCCAGCCAGCCAACCAGCCGAGCCGCCCAGC CGACCCGAGAGCCCCGAGAGCCAGACTCCCTCAGCCATAGAAGACACCGGGCGGGAGAGACGGACTGAAAAAATATATCTTTTT TTATTTTGTCTGGGCCTGGAGACCCGCAGCAGGAGCGGAGGTGGGTGCGGGGCCGGGAGCCGGAGCAGGACCGGGAACAGGAA CAGGAACAGGAACAGGAACAGGAACAGGAGTGGGGCCGGGAGCAGGAGCAGGAGCGGGAGCCGAAGTGGGGGCAGGAGCGGC GGCGGCCGCAGCAGCAACAGGGTCGCCCCAGTCCGCGGCGAGGAAGAGGGAGCTC |
| LAP2.26 (391 bp) SEQ ID NO: 38 | GCTCCGCCCACCCATCACAGCAGCCGCGGACGCTGCGCGCCGGAGCGGTCCATCTCGCCAGCCAGCCAACCAGCCGAGCCGCCC AGCCGACCCGAGAGCCCCGAGAGCCAGACTCCCTCAGCCATAGAAGACACCGGGCGGGAGAGACGGACTGAAAAAATATATCT TTTTTTATTTTGTCTGGGCCTGGAGACCCGCAGCAGGAGCGGAGGTGGGTGCGGGGCCGGGAGCCGGAGCAGGACCGGGAACAG GAACAGGAACAGGAACAGGAACAGGAGTGGGGCCGGGAGCAGGAGCAGGAGCGGGAGCCGAAGTGGGGGCAGGAGC GGCGGCGGCCGCAGCAGCAACAGGGTCGCCCCAGTCCGCGGCGAGGAAGAGGGAGCTC |
| LAP2.27 (358 bp) SEQ ID NO: 39 | TGCGCGCCGGAGCGGTCCATCTCGCCAGCCAGCCAACCAGCCGAGCCGCCCAGCCGACCCGAGAGCCCCGAGAGCCAGACTCCC TCAGCCATAGAAGACACCGGGCGGGAGAGACGGACTGAAAAAATATATCTTTTTTTATTTTGTCTGGGCCTGGAGACCCGCAGCA GGAGCGGAGGTGGGTGCGGGGCCGGGAGCCGGAGCAGGACCGGGAACAGGAACAGGAACAGGAACAGGAACAGGAAGAGGAG TGGGGCCGGGAGCAGGAGCAGGAGCGGGAGCCGAAGTGGGGGCAGGAGCGGCGGCGGCCGCAGCAGCAACAGGGTCGCCCCA GTCCGCGGCGAGGAAGAGGGAGCTC |
| LAP2.28 (372 bp) SEQ ID NO: 40 | TGCGCGCCGGAGCGGTCCATCTCGCCAGCCAGCCAACCAGCCGAGCCGCCCAGCCGACCCGAGAGCCCCGAGAGCCAGACTCCC TCAGCCATAGAAGACACCGGGCGGGAGAGACGGACTGAAAAAATATATCTTTTTTTATTTTGTCTGGGCCTGGAGACCCGCAGCA GGAGCGGAGGTGGGTGCGGGGCCGGGAGCCGGAGCAGGACCGGGAACAGGAACAGGAACAGGAACAGGAACAGGAAGAGGAG TGGGGCCGGGAGCAGGAGCAGGAGCGGGAGCCGAAGTGGGGGCAGGAGCGGCGGCGGCCGCAGCAGCAACAGGGTCGCCCCA GTCCGCGGCGAGGAAGAGGGAGCTC*CCGCGAGGAGGCAG* |
| LAP2.29 (392 bp) SEQ ID NO: 41 | TGCGCGCCGGAGCGGTCCATCTCGCCAGCCAGCCAACCAGCCGAGCCGCCCAGCCGACCCGAGAGCCCCGAGAGCCAGACTCCC TCAGCCATAGAAGACACCGGGCGGGAGAGACGGACTGAAAAAATATATCTTTTTTTATTTGTCTGGGCCTGGAGACCCGCAGCA GGAGCGGAGGTGGGTGCGGGGCCGGGAGCCGGAGCAGGACCGGGAACAGGAACAGGAACAGGAACAGGAACAGGAAGAGGAG TGGGGCCGGGAGCAGGAGCAGGAGCGGGAGCCGAAGTGGGGGCAGGAGCGGCGGCGGCCGCAGCAGCAACAGGGTCGCCCCA GTCCGCGGCGAGGAAGAGGGAGCTC*TGGTGCCCTCTGGTGGTCTTCTAGAGGAATTGCA* |
| LAP2.30 (374 bp) SEQ ID NO: 42 | *TCAGCCAATCAGCGAG*TGCGCGCCGGAGCGGTCCATCTCGCCAGCCAGCCAACCAGCCGAGCCGCCCAGCCGACCCGAGAGCCCC GAGAGCCAGACTCCCTCAGCCATAGAAGACACCGGGCGGGAGAGACGGACTGAAAAAATATATCTTTTTTTATTTTGTCTGGGCC TGGAGACCCGCAGCAGGAGCGGAGGTGGGTGCGGGGCCGGGAGCCGGAGCAGGACCGGGAACAGGAACAGGAACAGGAACAG GAACAGGAACAGGAGTGGGGCCGGGAGCAGGAGCAGGAGCGGGAGCCGAAGTGGGGGCAGGAGCGGCGGCGGCCGCAGCAGC AACAGGGTCGCCCCAGTCCGCGGCGAGGAAGAGGGAGCTC |
| LAP2.31 (372 bp) SEQ ID NO: 43 | *CCGCGAGGAGGCAG*TGCGCGCCGGAGCGGTCCATCTCGCCAGCCAGCCAACCAGCCGAGCCGCCCAGCCGACCCGAGAGCCCCG AGAGCCAGACTCCCTCAGCCATAGAAGACACCGGGCGGGAGAGACGGACTGAAAAAATATATCTTTTTTTATTTTGTCTGGGCCT GGAGACCCGCAGCAGGAGCGGAGGTGGGTGCGGGGCCGGGAGCCGGAGCAGGACCGGGAACAGGAACAGGAACAGGAACAGG AACAGGAACAGGAGTGGGGCCGGGAGCAGGAGCAGGAGCGGGAGCCGAAGTGGGGGCAGGAGCGGCGGCGGCCGCAGCAGCA ACAGGGTCGCCCCAGTCCGCGGCGAGGAAGAGGGAGCTC |
| LAP2.32 (392 bp) SEQ ID NO: 44 | *TGGTGCCCTCTGGTGGTCTTCTAGAGGAATTGCA*TGCGCGCCGGAGCGGTCCATCTCGCCAGCCAGCCAACCAGCCGAGCCGCCCA GCCGACCCGAGAGCCCCGAGAGCCAGACTCCCTCAGCCATAGAAGACACCGGGCGGGAGAGACGGACTGAAAAAATATATCTTT TTTATTTTGTCTGGGCCTGGAGACCCGCAGCAGGAGCGGAGGTGGGTGCGGGGCCGGGAGCCGGAGCAGGACCGGGAACAGGA ACAGGAACAGGAACAGGAACAGGAGTGGGGCCGGGAGCAGGAGCAGGAGCGGGAGCCGAAGTGGGGGCAGGAGCGG CGGCGGCCGCAGCAGCAACAGGGTCGCCCCAGTCCGCGGCGAGGAAGAGGGAGCTC |

TABLE 1-continued

Latency-Associated Promoter (LAP) Nucleic Acid Sequences

| SEQ ID NO: | Nucleic Acid Sequence |
|---|---|
| LAP2.33 (374 bp) SEQ ID NO: 45 | TGCGCGCCGGAGCGGTCCATCTCGCCAGCCAGCCAACCAGCCGAGCCGCCCAGCCGACCCGAGAGCCCCGAGAGCCAGACTCCC TCAGCCATAGAAGACACCGGGCGGGAGAGACGGACTGAAAAAATATATCTTTTTTTATTTTGTCTGGGCCTGGAGACCCGCAGCA GGAGCGGAGGTGGGTGCGGGGCCGGGAGCCGGAGCAGGACCGGGAACAGGAACAGGAACAGGAACAGGAACAGGAACAGGAG TGGGGCCGGGAGCAGGAGCAGGAGCGGGAGCCGAAGTGGGGGCAGGAGCGGCGGCGGCCGCAGCAGCAACAGGGTCGCCCCA GTCCGCGGCGAGGAAGAGGGAGCTCT*CAGCCAATCAGCGAG* |
| LAP2.34 (255 bp) SEQ ID NO: 46 | GGCGGGAGAGACGGACTGAAAAAATATATCTTTTTTTATTTTGTCTGGGCCTGGAGACCCGCAGCAGGAGCGGAGGTGGGTGCG GGGCCGGGAGCCGGAGCAGGACCGGGAACAGGAACAGGAACAGGAACAGGAACAGGAACAGGAGTGGGGCCGGGAGCAGGAG CAGGAGCGGGAGCCGAAGTGGGGGCAGGAGCGGCGGCGGCCGCAGCAGCAACAGGGTCGCCCCAGTCCGCGGCGAGGAAGAG GGAGCTC |
| LAP2.35 (257 bp) SEQ ID NO: 47 | CGGGCGGGAGAGACGGACTGAAAAAATATATCTTTTTTTATTTTGTCTGGGCCTGGAGACCCGCAGCAGGAGCGGAGGTGGGTG CGGGGCCGGGAGCCGGAGCAGGACCGGGAACAGGAACAGGAACAGGAACAGGAACAGGAGTGGGGCCGGGAGCAGG AGCAGGAGCGGGAGCCGAAGTGGGGGCAGGAGCGGCGGCGGCCGCAGCAGCAACAGGGTCGCCCCAGTCCGCGGCGAGGAAG AGGGAGCTC |
| LAP2.36 (268 bp) SEQ ID NO: 48 | ATAGAAGACACCGGGCGGGAGAGACGGACTGAAAAAATATATCTTTTTTTATTTTGTCTGGGCCTGGAGACCCGCAGCAGGAGC GGAGGTGGGTGCGGGGCCGGGAGCCGGAGCAGGACCGGGAACAGGAACAGGAACAGGAACAGGAACAGGAACAGGAGTGGGG CCGGGAGCAGGAGCAGGAGCGGGAGCCGAAGTGGGGGCAGGAGCGGCGGCGGCCGCAGCAGCAACAGGGTCGCCCCAGTCCGC GGCGAGGAAGAGGGAGCTC |
| LAP2.37 (313 bp) SEQ ID NO: 49 | CCGCCCAGCCGACCCGAGAGCCCCGAGAGCCAGACTCCCTCAGCCATAGAAGACACCGGGCGGGAGAGACGGACTGAAAAAAT ATATCTTTTTTTATTTTGTCTGGGCCTGGAGACCCGCAGCAGGAGCGGAGGTGGGTGCGGGGCCGGGAGCCGGAGCAGGACCGG GAACAGGAACAGGAACAGGAACAGGAACAGGAGTGGGGCCGGGAGCAGGAGCAGGAGCGGGAGCCGAAGTGGGGGC AGGAGCGGCGGCGGCCGCAGCAGCAACAGGGTCGCCCCAGTCCGCGGCGAGGAAGAGGGAGCTC |
| LAP2.38 (339 bp) SEQ ID NO: 50 | TCTCGCCAGCCAGCCAACCAGCCGAGCCGCCCAGCCGACCCGAGAGCCCCGAGAGCCAGACTCCCTCAGCCATAGAAGACACCG GGCGGGAGAGACGGACTGAAAAAATATATCTTTTTTTATTTTGTCTGGGCCTGGAGACCCGCAGCAGGAGCGGAGGTGGGTGCG GGGCCGGGAGCCGGAGCAGGACCGGGAACAGGAACAGGAACAGGAACAGGAACAGGAACAGGAGTGGGGCCGGGAGCAGGAG CAGGAGCGGGAGCCGAAGTGGGGGCAGGAGCGGCGGCGGCCGCAGCAGCAACAGGGTCGCCCCAGTCCGCGGCGAGGAAGAG GGAGCTC |
| LAP2.39 (359 bp) SEQ ID NO: 51 | CTGCGCGCCGGAGCGGTCCATCTCGCCAGCCAGCCAACCAGCCGAGCCGCCCAGCCGACCCGAGAGCCCCGAGAGCCAGACTCC CTCAGCCATAGAAGACACCGGGCGGGAGAGACGGACTGAAAAAATATATCTTTTTTTATTTTGTCTGGGCCTGGAGACCCGCAGC AGGAGCGGAGGTGGGTGCGGGGCCGGGAGCCGGAGCAGGACCGGGAACAGGAACAGGAACAGGAACAGGAACAGGAACAGGA GTGGGGCCGGGAGCAGGAGCAGGAGCGGGAGCCGAAGTGGGGGCAGGAGCGGCGGCGGCCGCAGCAGCAACAGGGTCGCCCC AGTCCGCGGCGAGGAAGAGGGAGCTC |
| LAP2.40 (364 bp) SEQ ID NO: 52 | GGACGCTGCGCGCCGGAGCGGTCCATCTCGCCAGCCAGCCAACCAGCCGAGCCGCCCAGCCGACCCGAGAGCCCCGAGAGCCAG ACTCCCTCAGCCATAGAAGACACCGGGCGGGAGAGACGGACTGAAAAAATATATCTTTTTTTATTTTGTCTGGGCCTGGAGACCC GCAGCAGGAGCGGAGGTGGGTGCGGGGCCGGGAGCCGGAGCAGGACCGGGAACAGGAACAGGAACAGGAACAGGAACAGGAA CAGGAGTGGGGCCGGGAGCAGGAGCAGGAGCGGGAGCCGAAGTGGGGGCAGGAGCGGCGGCGGCCGCAGCAGCAACAGGGTC GCCCCAGTCCGCGGCGAGGAAGAGGGAGCTC |
| LAP2.41 (368 bp) SEQ ID NO: 53 | CCGCGGACGCTGCGCGCCGGAGCGGTCCATCTCGCCAGCCAGCCAACCAGCCGAGCCGCCCAGCCGACCCGAGAGCCCCGAGAG CCAGACTCCCTCAGCCATAGAAGACACCGGGCGGGAGAGACGGACTGAAAAAATATATCTTTTTTTATTTTGTCTGGGCCTGGAG ACCCGCAGCAGGAGCGGAGGTGGGTGCGGGGCCGGGAGCCGGAGCAGGACCGGGAACAGGAACAGGAACAGGAACAGGAACA GGAACAGGAGTGGGGCCGGGAGCAGGAGCAGGAGCGGGAGCCGAAGTGGGGGCAGGAGCGGCGGCGGCCGCAGCAGCAACAG GGTCGCCCCAGTCCGCGGCGAGGAAGAGGGAGCTC |
| LAP2.42 (376 bp) SEQ ID NO: 54 | CACAGCAGCCGCGGACGCTGCGCGCCGGAGCGGTCCATCTCGCCAGCCAGCCAACCAGCCGAGCCGCCCAGCCGACCCGAGAGC CCCGAGAGCCAGACTCCCTCAGCCATAGAAGACACCGGGCGGGAGAGACGGACTGAAAAAATATATCTTTTTTTATTTTGTCTGG GCCTGGAGACCCGCAGCAGGAGCGGAGGTGGGTGCGGGGCCGGGAGCCGGAGCAGGACCGGGAACAGGAACAGGAACAGGAA CAGGAACAGGAACAGGAGTGGGGCCGGGAGCAGGAGCAGGAGCGGGAGCCGAAGTGGGGGCAGGAGCGGCGGCGGCCGCAGC AGCAACAGGGTCGCCCCAGTCCGCGGCGAGGAAGAGGGAGCTC |
| LAP2.43 (384 bp) SEQ ID NO: 55 | CCACCCATCACAGCAGCCGCGGACGCTGCGCGCCGGAGCGGTCCATCTCGCCAGCCAGCCAACCAGCCGAGCCGCCCAGCCGAC CCGAGAGCCCCGAGAGCCAGACTCCCTCAGCCATAGAAGACACCGGGCGGGAGAGACGGACTGAAAAAATATATCTTTTTTTAT TTTGTCTGGGCCTGGAGACCCGCAGCAGGAGCGGAGGTGGGTGCGGGGCCGGGAGCCGGAGCAGGACCGGGAACAGGAACAGG AACAGGAACAGGAACAGGAGTGGGGCCGGGAGCAGGAGCAGGAGCGGGAGCCGAAGTGGGGCAGGAGCGGCGGCG GCCGCAGCAGCAACAGGGTCGCCCCAGTCCGCGGCGAGGAAGAGGGAGCTC |
| LAP2.44 (385 bp) SEQ ID NO: 56 | CCCACCCATCACAGCAGCCGCGGACGCTGCGCGCCGGAGCGGTCCATCTCGCCAGCCAGCCAACCAGCCGAGCCGCCCAGCCGA CCCGAGAGCCCCGAGAGCCAGACTCCCTCAGCCATAGAAGACACCGGGCGGGAGAGACGGACTGAAAAAATATATCTTTTTTTA TTTTGTCTGGGCCTGGAGACCCGCAGCAGGAGCGGAGGTGGGTGCGGGGCCGGGAGCCGGAGCAGGACCGGGAACAGGAACAG GAACAGGAACAGGAACAGGAGTGGGGCCGGGAGCAGGAGCAGGAGCGGGAGCCGAAGTGGGGGCAGGAGCGGCGGC GGCCGCAGCAGCAACAGGGTCGCCCCAGTCCGCGGCGAGGAAGAGGGAGCTC |
| LAP2.45 (390 bp) SEQ ID NO: 57 | CTCCGCCCACCCATCACAGCAGCCGCGGACGCTGCGCGCCGGAGCGGTCCATCTCGCCAGCCAGCCAACCAGCCGAGCCGCCCA GCCGACCCGAGAGCCCCGAGAGCCAGACTCCCTCAGCCATAGAAGACACCGGGCGGGAGAGACGGACTGAAAAAATATATCTTT TTTATTTTGTCTGGGCCTGGAGACCCGCAGCAGGAGCGGAGGTGGGTGCGGGGCCGGGAGCCGGAGCAGGACCGGGAACAGGA ACAGGAACAGGAACAGGAACAGGAGTGGGGCCGGGAGCAGGAGCAGGAGCGGGAGCCGAAGTGGGGGCAGGAGCGG CGGCGGCCGCAGCAGCAACAGGGTCGCCCCAGTCCGCGGCGAGGAAGAGGGAGCTC |

TABLE 1-continued

Latency-Associated Promoter (LAP) Nucleic Acid Sequences

| SEQ ID NO: | Nucleic Acid Sequence |
| --- | --- |
| LAP2.46 (396 bp) SEQ ID NO: 58 | TCCGCGCTCCGCCCACCCATCACAGCAGCCGCGGACGCTGCGCGCCGGAGCGGTCCATCTCGCCAGCCAGCCAACCAGCCGAGC CGCCCAGCCGACCCGAGAGCCCCGAGAGCCAGACTCCCTCAGCCATAGAAGACACCGGGCGGGAGAGACGGACTGAAAAAATA TATCTTTTTTTATTTTGTCTGGGCCTGGAGACCCGCAGCAGGAGCGGAGGTGGGTGCGGGGCCGGGAGCCGGAGCAGGAC<u>CGGG AACAGGAACAGGAACAGGAACAGGAACAGGAACAGGAGTGGGGCCGGGAGCAGGAGCAGGAGCGGGAGCCGAAGTGGGGGCA GGAGCGGCGGCGGCCGCAGCAGCAACAGGGTCGCCCCAGTCCGCGGCGAGGAAGAGGGAGCTC</u> |

The 232-bp "core" sequence (SEQ ID NO: 9) is underlined.
The TATA box DNA sequence (ATATA) is underlined and in bold text.
The "CTCF" motif (SEQ ID NO: 10), the "alternative CTCF with upstream stabilizer" motif (SEQ ID NO: 11), and the "NF-Y" motif are italicized.

In some embodiments, the promoter comprises a nucleic acid sequence having at least 70%, at least 75%, at least 80%, at least 85%, at least 90%, at least 95%, at least 96%, at least 97%, at least 98% or at least 99% sequence identity a nucleic acid sequences selected from SEQ ID NOs: 13-58 (Table 1). In some embodiments, the promoter comprises a nucleic acid sequence selected from SEQ ID NOs: 13-58.

The vectors comprising the LAP sequences disclosed herein can be used for gene delivery (e.g., in mammals, such as a human) and basic and translational research. The host cell may be a cultured cell (i.e., in vitro) or reside in a subject (e.g., in an animal model (i.e., in vivo)).

In some embodiments, the vector is a lentivirus gene delivery vector, a retrovirus gene delivery vector, or an adenovirus gene delivery vector. One advantage of the LAP sequences described herein is that they have a considerably smaller size than other commonly used promoters in viral vectors, yet can sustain prolonged transcription in different cell types.

A relatively small LAP region may be advantageous, given that the DNA payload capacity is highly limited in vectors. For example, the packaging capacity or payload of the AAV vectors is limited to a maximum size of an approximate 5,000 bp. In some embodiments, the LAP region utilized in the vectors of the present invention is between about 200 bp and about 410 bp in length, e.g., about 220-410 bp, about 220-400 bp, about 240-400 bp, about 240-380 bp, about 260-380 bp, about 260-360 bp, about 280-360 bp, about 280-340 bp, about 300-340 bp, or about 320-340 bp in length.

In particular embodiments, the promoter sequences of the present invention can be used when strong, long-term expression of transgenes is required in cells in culture, in animals or in humans. The promoters are useful in situations where there are genome space constraints but long-lasting promoter transcriptional activity is needed. AAVs are particularly useful for human gene therapy; as such, the LAP sequences of the present invention provide gene therapy applications when utilized with AAVs.

In some embodiments, a gene of interest is expressed under control of the LAP sequences provided herein for at least about 30 days, about 60 days, about 90 days, about 120 days, about 150, about 180 days, or about 190 days in vitro. In some embodiments, a gene of interest is expressed under control of the LAP sequences provided herein for at least about 30 days, about 60 days, about 90 days, about 120 days, about 150, about 180 days, or about 190 days in vivo (e.g., in a tissue such as a brain). In some embodiments, a gene of interest is expressed under control of the LAP sequences provided herein for at least about 30 days, about 60 days, about 90 days, about 120 days, about 150, about 180 days, or about 190 days ex vivo (e.g., in cultured cells such as neurons).

In one aspect, the present invention provides a recombinant vector for expression of a target gene in a host cell, comprising a promoter comprising a nucleic acid sequence having at least 70% sequence identity to a sequence selected from SEQ ID NO: 1, SEQ ID NO: 2, SEQ ID NO: 3 and SEQ ID NO: 4; a cloning site for insertion of a nucleic acid encoding the target gene; and at least one non-promoter regulatory element required for the expression of the target gene in the host cell.

In some embodiments, the promoter comprises a nucleic acid sequence having at least 50%, at least 55%, at least 60%, at least 65%, at least 70%, at least 75%, at least 80%, at least 85%, at least 90%, at least 95%, at least 96%, at least 97%, at least 98%, or at least 99% sequence identity to a nucleic acid sequence selected from SEQ ID NO: 1, SEQ ID NO: 2, SEQ ID NO: 3 and SEQ ID NO: 4. In some embodiments, the promoter comprises a nucleic acid sequence selected from SEQ ID NO: 1, SEQ ID NO: 2, SEQ ID NO: 3 and SEQ ID NO: 4.

The LAP sequences described herein can be used in a variety of gene expression vectors, such as a plasmid, a bacterial artificial chromosome (BAC), a cosmid or other non-viral or viral systems to express transgene(s).

In some embodiments, the vector is a viral vector. In some embodiments, the viral vector is an adeno-associated virus (AAV) vector. Non-limiting examples of viral vectors that can be utilized by the present invention include DNA or RNA viral vectors including but not limited to retroviral vectors, herpes virus vectors, adenovirus vectors, lentivirus vectors, rabies virus vectors, lentiviral vectors, VSV vectors, vaccinia virus vectors, reovirus vectors, semliki forest virus, yellow fever virus, and sindbis virus vectors.

In some embodiments, the vector is a non-viral vector. Non-viral vectors can be plasmid DNA, liposome-DNA complexes (lipoplexes), and polymer-DNA complexes (polyplexes). Non-viral vectors can be plasmid RNA, liposome-RNA complexes (lipoplexes), and polymer-RNA complexes (polyplexes). Oligonucleotides and their analogues, either alone or in complexes, are also possible non-viral vector-mediated gene transfer constructs.

The vectors (e.g., viral vectors) provided herein can be used to express therapeutic transgenes in organs or tissues of animal models and humans, for example, in gene therapies to treat acquired or inherited diseases (e.g., of the nervous system).

The LAP sequences disclosed herein were derived from the genome of pseudorabies virus (PRV). PRV is an alpha-herpesvirus capable of infecting various animals. Although the natural host is the adult pig, PRV can infect a broad range of vertebrates including cattle, sheep, dog, bird, cat, goat, raccoon, chicken, skunk, possum, guinea pig, horse, rabbit, rat, mouse and nonhuman primates (Pomeranz et al., 2005). Cultured human cells are also susceptible to PRV infection and zoonotic PRV infections in humans was reported (Wong et al., 2019).

Besides PRV being able to infect several different animal species, it is also a pantropic virus. This means that most tissues and organs of an infected host can be susceptible and permissive to PRV infection (Blanchard et al., 2006; Boldogkoi et al., 2000; Fan et al., 2019; Gasparini et al., 2019; Pomeranz et al., 2005). Therefore, the LAP sequences can be potentially used for gene therapies in diverse cell and tissue types.

In another aspect, the present invention provides a host cell comprising a recombinant vector as described herein. In some embodiments, the host cell is a mammalian cell (e.g., a neuronal cell). In other embodiments, the host cell is selected from a bird cell, a fish cell, an amphibian cell, and a reptile cell. In some embodiments, the host cell comprises an in vitro neuronal cell, an ex vivo neuronal cell, or both. In some embodiments, the host cell a neuronal cell of a subject. In some embodiments, the neuronal cell resides in a primary motor area, a secondary motor area, a primary somatosensory area, a supplemental somatosensory area, a visual area, a hippocampal formation, striatum, pallidum, thalamus, hypothalamus, a midbrain area, hind brain, an olfactory area or a combination thereof, of the subject. In some embodiments, the midbrain area comprises a motor-related area, a sensory-related area, or both. In some embodiments, the neuronal cell resides in cortex, dentate gyms, striatum, cerebellum, olfactory bulb or a combination thereof, of the subject. In some embodiments, the neuronal cell comprises a neuron, a microglia cell, an astrocyte, or a combination thereof. In some embodiments, the neuronal cell comprises a neuron.

In some embodiments, the host cell is selected from the group consisting of a bladder cell, a blood cell, a bone cell, an endothelial cell, an epithelial cell, a fat cell, a heart cell, an intestinal cell, a stomach cell, a kidney cell, a liver cell, a lung cell, a muscle cell, a pancreatic cell, a retina cell, a sex cell, a skin cell, a spleen cell, a stem cell, and a combination thereof. In some embodiments, the host cell is a cancer cell.

In another aspect, the present invention provides recombinant polynucleotide molecules comprising a nucleic acid encoding a target gene, wherein the nucleic acid is operably linked to a promoter comprising a nucleic acid sequence having at least 70% sequence identity to a sequence selected from SEQ ID NO: 1, SEQ ID NO: 2, SEQ ID NO: 3, and SEQ ID NO: 4. In some embodiments, the promoter comprises a nucleic acid sequence having at least 75%, at least 80%, at least 85%, at least 90%, at least 95%, at least 96%, at least 97%, at least 98% or at least 99% sequence identity to a nucleic acid sequence selected from SEQ ID NO: 1, SEQ ID NO: 2, SEQ ID NO: 3 and SEQ ID NO: 4. In some embodiments, the promoter comprises a nucleic acid sequence selected from SEQ ID NO: 1, SEQ ID NO: 2, SEQ ID NO: 3 and SEQ ID NO: 4. In some embodiments, the nucleic acid encoding the target gene comprises more than about 4 kb.

In a further aspect, the present invention provides a recombinant polynucleotide molecule comprising a cloning site for insertion of a nucleic acid encoding a target gene, wherein the cloning site is operably linked to a promoter comprising a nucleic acid having at least 70% sequence identity to a sequence selected from SEQ ID NO: 1, SEQ ID NO: 2, SEQ ID NO: 3, and SEQ ID NO: 4. In some embodiments, the promoter comprises a nucleic acid sequence having at least 75%, at least 80%, at least 85%, at least 90%, at least 95%, at least 96%, at least 97%, at least 98% or at least 99% sequence identity to a nucleic acid sequence selected from SEQ ID NO: 1, SEQ ID NO: 2, SEQ ID NO: 3 and SEQ ID NO: 4. In some embodiments, the promoter comprises a nucleic acid sequence selected from SEQ ID NO: 1, SEQ ID NO: 2, SEQ ID NO: 3 and SEQ ID NO: 4.

In another aspect, the present invention provides a recombinant vector for expression of a target gene in a host cell, comprising a promoter comprising a nucleic acid sequence having at least 70% sequence identity to a nucleic acid sequence selected from SEQ ID NO: 5, SEQ ID NO: 6, SEQ ID NO: 7 and SEQ ID NO: 8; a cloning site for insertion of a nucleic acid encoding the target gene; and at least one non-promoter regulatory element required for the expression of the target gene in the host cell. SEQ ID NO: 5 comprises a LAP sequence of an equine herpes virus; SEQ ID NO: 6 comprises a LAP sequence of a bovine herpes virus; SEQ ID NO: 7 comprises a LAP sequence of a varicella zoster virus; and SEQ ID NO: 8 comprises a LAP sequence of a Macacine herpesvirus 1 (Table 1). In some embodiments, the promoter comprises a nucleic acid sequence having at least 75%, at least 80%, at least 85%, at least 90%, at least 95%, at least 96%, at least 97%, at least 98% or at least 99% sequence identity to a nucleic acid sequence selected from SEQ ID NO: 5, SEQ ID NO: 6, SEQ ID NO: 7 and SEQ ID NO: 8. In some embodiments, the promoter comprises a nucleic acid sequence selected from SEQ ID NO: 5, SEQ ID NO: 6, SEQ ID NO: 7 and SEQ ID NO: 8.

In another aspect, the present invention provides recombinant polynucleotide molecules comprising a nucleic acid encoding a target gene, wherein the nucleic acid is operably linked to a promoter comprising a nucleic acid sequence having at least 70% sequence identity to a sequence selected from SEQ ID NO: 5, SEQ ID NO: 6, SEQ ID NO: 7, and SEQ ID NO: 8. In some embodiments, the promoter comprises a nucleic acid sequence having at least 75%, at least 80%, at least 85%, at least 90%, at least 95%, at least 96%, at least 97%, at least 98% or at least 99% sequence identity to a nucleic acid sequence selected from SEQ ID NO: 5, SEQ ID NO: 6, SEQ ID NO: 7 and SEQ ID NO: 8. In some embodiments, the promoter comprises a nucleic acid sequence selected from SEQ ID NO: 5, SEQ ID NO: 6, SEQ ID NO: 7 and SEQ ID NO: 8. In some embodiments, the nucleic acid encoding the target gene comprises more than about 4 kb.

In a further aspect, the present invention provides a recombinant polynucleotide molecule comprising a cloning site for insertion of a nucleic acid encoding a target gene, wherein the cloning site is operably linked to a promoter comprising a nucleic acid having at least 70% sequence identity to a sequence selected from SEQ ID NO:5, SEQ ID NO: 6, SEQ ID NO: 7, and SEQ ID NO: 8. In some embodiments, the promoter comprises a nucleic acid sequence having at least 75%, at least 80%, at least 85%, at least 90%, at least 95%, at least 96%, at least 97%, at least 98% or at least 99% sequence identity to a nucleic acid sequence selected from SEQ ID NO: 5, SEQ ID NO: 6, SEQ ID NO: 7 and SEQ ID NO: 8. In some embodiments, the promoter comprises a nucleic acid sequence selected from SEQ ID NO: 5, SEQ ID NO: 6, SEQ ID NO: 7 and SEQ ID NO: 8.

In another aspect, the present invention provides a recombinant vector for expression of a target gene in a host cell, comprising a promoter comprising a nucleic acid sequence having at least 70% sequence identity to SEQ ID NO: 9; a cloning site for insertion of a nucleic acid encoding the target gene; and at least one non-promoter regulatory element required for the expression of the target gene in the host cell. In some embodiments, the promoter comprises a nucleic acid sequence having at least 75%, at least 80%, at least 85%, at least 90%, at least 95%, at least 96%, at least 97%, at least 98% or at least 99% sequence identity to SEQ ID NO: 9. In some embodiments, the promoter comprises SEQ ID NO: 9. In some embodiments, the promoter further comprises the nucleic acid sequence of SEQ ID NO: 10, SEQ ID NO: 11, SEQ ID NO: 12, or a combination thereof. In some embodiments, the promoter comprises a nucleic acid sequence having at least 70%, at least 75%, at least 80%, at least 85%, at least 90%, at least 95%, at least 96%, at least 97%, at least 98% or at least 99% sequence identity to a nucleic acid sequence selected from SEQ ID NOs: 13-58. In some embodiments, the promoter comprises a nucleic acid sequence selected from SEQ ID NOs: 13-58.

In some embodiments, the at least one non-promoter regulatory element comprises an enhancer element. In some embodiments, the at least one non-promoter regulatory element comprises an inducer element. In some embodiments, the recombinant vector further comprises a selectable marker element.

In another aspect, the present invention provides recombinant polynucleotide molecules comprising a nucleic acid encoding a target gene, wherein the nucleic acid is operably linked to a promoter comprising a nucleic acid sequence having at least 70% sequence identity to SEQ ID NO: 9. In some embodiments, the promoter comprises a nucleic acid sequence having at least 75%, at least 80%, at least 85%, at least 90%, at least 95%, at least 96%, at least 97%, at least 98% or at least 99% sequence identity to SEQ ID NO: 9. In some embodiments, the promoter comprises SEQ ID NO: 9. In some embodiments, the promoter further comprises the nucleic acid sequence of SEQ ID NO: 10, SEQ ID NO: 11, SEQ ID NO: 12, or a combination thereof. In some embodiments, the promoter comprises a nucleic acid sequence having at least 70%, at least 75%, at least 80%, at least 85%, at least 90%, at least 95%, at least 96%, at least 97%, at least 98% or at least 99% sequence identity to a nucleic acid sequence selected from SEQ ID NOs: 13-58. In some embodiments, the promoter comprises a nucleic acid sequence selected from SEQ ID NOs: 13-58. In some embodiments, the nucleic acid encoding the target gene comprises more than about 4 kb.

In a further aspect, the present invention provides a recombinant polynucleotide molecule comprising a cloning site for insertion of a nucleic acid encoding a target gene, wherein the cloning site is operably linked to a promoter comprising a nucleic acid sequence having at least 70% sequence identity to SEQ ID NO: 9. In some embodiments, the promoter comprises a nucleic acid sequence having at least 75%, at least 80%, at least 85%, at least 90%, at least 95%, at least 96%, at least 97%, at least 98% or at least 99% sequence identity to SEQ ID NO: 9. In some embodiments, the promoter comprises SEQ ID NO: 9. In some embodiments, the promoter further comprises the nucleic acid sequence of SEQ ID NO: 10, SEQ ID NO: 11, SEQ ID NO: 12, or a combination thereof. In some embodiments, the promoter comprises a nucleic acid sequence having at least 70%, at least 75%, at least 80%, at least 85%, at least 90%, at least 95%, at least 96%, at least 97%, at least 98% or at least 99% sequence identity to a nucleic acid sequence selected from SEQ ID NOs: 13-58. In some embodiments, the promoter comprises a nucleic acid sequence selected from SEQ ID NOs: 13-58.

In another aspect, the present invention provides methods of expressing a target gene in a host cell, comprising: contacting the host cell with a recombinant polynucleotide molecule such that the recombinant polynucleotide molecule is introduced into the host cell, wherein the recombinant polynucleotide molecule comprises a nucleic acid encoding the target gene and wherein the nucleic acid is operably linked to a promoter comprising a nucleic acid sequence having at least 70% sequence identity to a sequence selected from SEQ ID NO: 1, SEQ ID NO: 2, SEQ ID NO: 3 and SEQ ID NO: 4, whereby expression of the target gene occurs in the host cell. In some embodiments, the promoter comprises a nucleic acid sequence having at least 75%, at least 80%, at least 85%, at least 90%, at least 95%, at least 96%, at least 97%, at least 98% or at least 99% sequence identity to a nucleic acid sequence selected from SEQ ID NO: 1, SEQ ID NO: 2, SEQ ID NO: 3 and SEQ ID NO: 4. In some embodiments, the promoter comprises a nucleic acid sequence selected from SEQ ID NO: 1, SEQ ID NO: 2, SEQ ID NO: 3 and SEQ ID NO: 4.

In another aspect, the present invention provides methods of expressing a target gene in a host cell, comprising: contacting the host cell with a recombinant polynucleotide molecule such that the recombinant polynucleotide molecule is introduced into the host cell, wherein the recombinant polynucleotide molecule comprises a nucleic acid encoding the target gene and wherein the nucleic acid is operably linked to a promoter comprising a nucleic acid sequence having at least 70% sequence identity to a sequence selected from SEQ ID NO: 5, SEQ ID NO: 6, SEQ ID NO: 7 and SEQ ID NO: 8, whereby expression of the target gene occurs in the host cell. In some embodiments, the promoter comprises a nucleic acid sequence having at least 75%, at least 80%, at least 85%, at least 90%, at least 95%, at least 96%, at least 97%, at least 98% or at least 99% sequence identity to a nucleic acid sequence selected from SEQ ID NO: 5, SEQ ID NO: 6, SEQ ID NO: 7 and SEQ ID NO: 8. In some embodiments, the promoter comprises a nucleic acid sequence selected from SEQ ID NO: 5, SEQ ID NO: 6, SEQ ID NO: 7 and SEQ ID NO: 8.

In another aspect, the present invention provides methods of expressing a target gene in a host cell, comprising: contacting the host cell with a recombinant polynucleotide molecule such that the recombinant polynucleotide molecule is introduced into the host cell, wherein the recombinant polynucleotide molecule comprises a nucleic acid encoding the target gene and wherein the nucleic acid is operably linked to a promoter comprising a nucleic acid sequence having at least 70% sequence identity to SEQ ID NO: 9, whereby expression of the target gene occurs in the host cell. In some embodiments, the promoter comprises a nucleic acid sequence having at least 75%, at least 80%, at least 85%, at least 90%, at least 95%, at least 96%, at least 97%, at least 98% or at least 99% sequence identity to SEQ ID NO: 9. In some embodiments, the promoter comprises SEQ ID NO: 9. In some embodiments, the promoter further comprises the nucleic acid sequence of SEQ ID NO: 10, SEQ ID NO: 11, SEQ ID NO: 12, or a combination thereof. In some embodiments, the promoter comprises a nucleic acid sequence having at least 70%, at least 75%, at least 80%, at least 85%, at least 90%, at least 95%, at least 96%, at least 97%, at least 98% or at least 99% sequence identity to a nucleic acid sequence selected from SEQ ID NOs:

13-58. In some embodiments, the promoter comprises a nucleic acid sequence selected from SEQ ID NOs: 13-58.

In some embodiments, the neuronal cell resides in the spinal cord of the subject. In some embodiments, the neuronal cell resides in the dorsal horn of the spinal cord. In some embodiments, the neuronal cell resides in the lumbar spinal cord, thoracic spinal cord, cervical spinal cord or a combination thereof.

In some embodiments, the recombinant polynucleotide molecule is introduced into the host cell by transduction (e.g., infection by a viral vector) upon contacting the host cell with the recombinant polynucleotide. In another embodiment, the recombinant polynucleotide molecule is introduced into the host cell by transfection upon contacting the host cell with the recombinant polynucleotide. In another embodiment, the recombinant polynucleotide molecule is introduced into the host cell by electroporation upon contacting the host cell with the recombinant polynucleotide.

Recombinant adeno-associated viral vectors (AAV) are essential neuroscience tools to define connectivity and function of the central nervous system (CNS). Additionally, AAVs are used as gene therapy vectors to treat inherited and acquired CNS diseases. Despite their safety and broad tropism, important issues need to be corrected such as the limited payload capacity and the lack of small gene promoters providing long-term, pan-neuronal transgene expression in the CNS. Commonly used gene promoters are relatively large and can be repressed a few months after viral CNS transduction, risking the long-term performance of single-dose gene therapy applications.

Recent improvements to recombinant AAVs, including capsid engineering and novel gene promoters to optimize transgene expression have substantially improved gene therapy applications (Mak, Rajapaksha et al. 2017; Hudry and Vandenberghe 2019; Ogden, Kelsic et al. 2019). AAV vectors are widely used in neuroscience and clinical applications given their safety, serotype-dependent broad tropism and transduction efficiency (Aschauer, Kreuz et al. 2013; Samulski and Muzyczka 2014; Mak, Rajapaksha et al. 2017). AAV-9 variant PHP.eB (Chan, Jang et al. 2017), with an enhanced ability to permeate the mouse blood-brain barrier (BBB) and broadly transduce neurons both in the brain and spinal cord after peripheral vascular administration, is one example of recent capsid improvements (Dayton, Grames et al. 2018). A major limitation of recombinant AAVs is their small capsid with limited payload capacity of only ~4.9 kb (Russell and Hirata 1998). Accordingly, the discovery of short promoter sequences that sustain strong and long-lived transcription is paramount to expand the transgene payload and achieve chronic therapeutic effect with one viral dose.

Several strong promoters such as neuron-specific enolase (NSE, 1800 bp) (Peel, Zolotukhin et al. 1997; Delzor, Dufour et al. 2012), calcium/calmodulin-dependent protein kinase II alpha (CaMKIIa, 1300 bp) (Sohal, Zhang et al. 2009) and human elongation factor 1 alpha (EF1α, 1264 bp) (Sohal, Zhang et al. 2009; Qin, Zhang et al. 2010) have been used in systemic AAV delivery (Bedbrook, Deverman et al. 2018). However, the considerable size of these promoter sequences (Bedbrook, Deverman et al. 2018) limit the use of large therapeutic transgenes or multiple small transgenes. Moreover, short promoters such as the human cytomegalovirus immediate-early enhancer and promoter (CMV, 600 bp) (Gray, Foti et al. 2011) or truncated versions of the human synapsin promoter (hSyn, 468 bp) (Jackson, Dayton et al. 2016), have considerably weaker to drive gene transcription and expression, and in some cases, are completely repressed or inactivated only weeks after delivery (Brooks, Harkins et al. 2004; Nathanson, Jappelli et al. 2009; Qin, Zhang et al. 2010; Back, Dossat et al. 2019). Similarly, small ubiquitous promoters like beta glucuronidase (GUSB, 378 bp) (Husain, Passini et al. 2009) or ubiquitin C (UBC, 403 bp) (Qin, Zhang et al. 2010; Powell, Rivera-Soto et al. 2015) have shown weak transcription levels.

Three alphaherpesvirus latency-associated promoters (LAP), called LAP1 (498 bp), LAP2 (404 bp) and LAP1_2 (880 bp) obtained from the genome of the herpesvirus pseudorabies virus (PRV) are described and validated herein. The *Alphaherpesvirinae* subfamily of the family *Herpesviridae*, includes bovine herpes virus-1 (BHV-1), varicella-zoster virus (VZV), herpes simplex virus (HSV) and PRV. These viruses share genome organization and establish latent infections in sensory ganglia of different mammalian hosts (Koyuncu, Hogue et al. 2013).

The LAP region of PRV encompasses two independent promoters, LAP1 and LAP2 (Cheung 1989; Cheung and Smith 1999; Jin and Scherba 1999; Jin, Schnitzlein et al. 2000) (FIG. 1A). PRV LAP1 contain two GC boxes and three CAAT boxes upstream of the first TATA box. PRV LAP2 containing two GC boxes before the second TATA box (Cheung 1989; Jin and Scherba 1999; Taharaguchi, Kobayashi et al. 2002). It has been proposed that the binding of different transcription factor (TFs) to consensus promoter elements present in LAP, may facilitate escape from nucleosome silencing during the latent infection during the latent infection (Deshmane and Fraser 1989; Leib, Bogard et al. 1989; Devi-Rao, Goodart et al. 1991; Jin, Schnitzlein et al. 2000; Ono, Tomioka et al. 2007). In transgenic mouse lines, PRV LAP promoted transcription is neuron-specific in the absence of PRV infection (Taharaguchi, Yoshino et al. 2003). However, in transient expression assays, PRV LAP1 and LAP2 promote transcription both in cultured neuronal as well as non-neuronal cells (Cheung and Smith 1999; Taharaguchi, Kobayashi et al. 2002). Furthermore, the activity of tandem LAP1 and LAP2 sequences is significantly increased compared to LAP1 or LAP2 alone (Cheung and Smith 1999).

Here, a whole-CNS screening approach based on retroorbital systemic delivery of AAV-PHP.eB, iDisco+ tissue-clearing and light-sheet microscopy, was used to identify three small latency-associated promoters (LAP) from the herpesvirus pseudorabies virus (PRV). These promoters are LAP1 (404 bp), LAP2 (498 bp) and LAP1_2 (880 bp). They drive chronic transcription of the virus encoded latency-associated transcript (LAT) during productive and latent phases of PRV infectious cycle. Stable, pan-neuronal transgene transcription and translation were observed from AAV-LAP in brain and spinal cord for six months post AAV transduction. The data suggest that the LAPs are suitable candidates for viral vector-based CNS gene therapies requiring chronic transgene expression after one-time viral-vector administration, PRV LAP1, LAP2 and tandem LAP1_2 promoters are likely suitable for systemic, less invasive, pan-neuronal gene delivery applications that may require stable, chronic transgene expression after a single administration.

Example 1. Materials and Methods

Construction of PRV LAP Sequences

The PRV latency-associated transcript promoter (LAP) was PCR amplified from coordinates 95106-96007 of PRV Becker strain genome (GenBank: JF797219.1). The LAP1 region (498 bp), was amplified using primer pairs LAP1F (5'-GCA CGC GTA TCT CCG GAA AGA GGA AAT TGA-3') (SEQ ID NO: 59) and LAP1R (5'-GCG GAT CCT ATA TAC ACG ATG TGC ATC CAT AAT-3') (SEQ ID NO: 60). The LAP2 region (404 bp), was amplified using primer pairs LAP2F (5'-GCA CGC GTA TCC CCG GTC CGC GCT CCG CCC ACC CA-3') (SEQ ID NO: 61) and LAP2R (5'-GCG GAT CCG AGC TCC CTC TTC CTC GCC GCG GAC TGG-3') (SEQ ID NO: 62). LAP1_2 (902 bp) spanning the entire LAP region was amplified using LAP1F and LAP2R (Cheung and Smith 1999). The 5' and 3' regions of these PCR sequences contained the MluI and BamHI restriction sites respectively, used for directional cloning into vector pAAV-Ef1α-mCherry. pAAV-Ef1α-mCherry was a gift from Karl Deisseroth (Addgene plasmid #114470). The three AAV-LAP plasmids were constructed by double digestion of vector pAAV-Ef1α-mCherry with MluI and BamHI followed by subcloning of the appropriate LAP fragment upstream of the mCherry reporter gene, flanked by AAV2 inverted terminal repeats (ITRs) and terminated with the SV40 polyA signal.

Construction of AAV Vectors

All expression cassettes were packaged into AAV-PhP.eB capsids (gift from Daniela Gradinaru, Addgene plasmid #103005) at the Princeton Neuroscience Institute Viral Core Facility and purified by iodixanol step gradient and column ultrafiltration as previously described (Zolotukhin, Byrne et al. 1999; Chan, Jang et al. 2017). Capsid-protected viral genomes were measured by TaqMan qPCR and reported as genome copies per milliliter (GC/ml).

Animals

Animal studies were performed following guidelines and protocols approved by the Institutional Animal Care and Use Committee of Princeton University (protocol #1943-16 and 1047). Timed-pregnant Sprague-Dawley rats were obtained from Hilltop Labs Inc. (Scottsdale, PA). E17 rat embryos were harvested for isolation of sympathetic SCG neurons. Adult (4 to 6-week-old) wild type C57BL/6J male mice were obtained from Jackson Laboratory (The Jackson Laboratory, Bar Harbor, ME). Mice had at least 48 hr of acclimation to the holding facility in the Princeton Neuroscience Institute vivarium before experimental procedures were performed.

Primary Superior Cervical Ganglia Cell Culture

SCG neurons from rat embryos (E17) were cultured in trichambers as previously described (Curanovic, Ch'ng et al. 2009). Briefly, SCG were dissociated with trypsin (2.5 mg/ml, Sigma-Aldrich, The Woodlands, TX) and plated on poly-O-Ornithine and laminin-coated dishes with media containing neurobasal media supplemented with 2% B-27, 100 ng/ml nerve growth factor (NGF), and 1% penicillin-streptomycin-glutamine (Thermo Fisher Scientific, Rockford, IL). Approximately two-thirds of a single ganglia were placed for S (soma) compartment of the trichamber. Three days post seeding, culture medium was treated with 0.1 mM cytosine-D-arabinofuranoside, Ara C (Sigma-Aldrich, The Woodlands, TX) for at least 2 days to eliminate dividing, nonneuronal cells. Culture media was replaced every 5 days, and neurons were incubated at 37° C. with 5% $CO_2$.

Retro-Orbital Sinus Injection

Intravenous administration of AAV vectors was performed in mice by unilateral injection into the retro-orbital venous sinus (Yardeni, Eckhaus et al. 2011). Animals were anesthetized using ketamine (80 mg/kg)/xylazine (10 mg/kg) cocktail prior to the procedure. Once unresponsive, animals were placed in lateral recumbence for injection into the medial canthus. Injection volume was 100 μl containing a total of $4\times10^{11}$ viral genomes administered with a 29G1/2 insulin syringe. Animals were placed on regulated heating pads and monitored until ambulant.

Tissue Processing and Histological Procedures

Mice were anesthetized with an overdose of ketamine (400 mg/kg)/xylazine (i.p.) and perfused with 4% paraformaldehyde (PFA) at 30 and 190 days post infection (dpi). Brain and spinal cord were post-fixed overnight in 4% PFA at 4° C. After rinsing with phosphate buffered saline (PBS), brains were stored at 4° C. in PBS with 0.1% sodium azide. Brains were divided into two parts with the left hemispheres sagittally sectioned at 50 μm using a Leica VT1200 vibratome and at 20 μm using a Leica CM3050 S cryostat. Right hemispheres were used for iDISCO+ tissue clearing protocol (below). Fixed brains and spinal cords were serially incubated in 10% sucrose, 20% sucrose and 30% sucrose at 4° C. for cryoprotection. Tissues were embedded in OCT (tissue-Tek, Torrance, CA), frozen in dry ice and stored at −80° C. until sectioning. For cryosectioning, spinal cords were placed in an embedding mold (Sigma-Aldrich, The Woodlands, TX) and filled with ultrapure low melting point agarose (Thermo Fisher Scientific, Rockford, IL) at 37° C. The semi-solid agarose cube was removed and glued (Loctite, Rocky Hill, CT) in the horizontal orientation for transversal slicing at 20 μm using a cryostat.

Immunostaining

For immunohistochemistry, free-floating brain sections were washed with PBS and blocked for 1 h with 3% bovine serum albumin (BSA), 2% donkey serum and 0.5% Triton X-100 (Sigma-Aldrich, St. Louis, MO). Samples were incubated with primary overnight at 4° C. and secondary antibodies for 1 h at RT (room temperature) diluted in PBS containing 1% BSA, 1% donkey serum and 0.5% Triton X-100. Cell nuclei were counterstained with 0.5 μg/ml DAPI for 5 minutes (Thermo Fisher Scientific, Rockford, IL). The following primary antibodies were used: rabbit anti-RFP Rockland (1:1000; Limerick, PA), chicken anti-mCherry Abcam (1:500; Cambridge, MA), mouse anti-NeuN (1:500; Millipore Bioscience Research Reagents, Temecula, CA), rabbit anti-Olig2 (1:500, EMD Millipore, Temecula, CA), rabbit anti-Iba1 (1:1000, Wako Chemical, Richmond, VA) and rabbit anti-S100 (1:5000, Dako, Glostrup, Denmark). The following secondary antibodies were used: Alexa Fluor 488 donkey anti-rabbit IgG, Alexa Fluor 488 donkey anti-mouse IgG, Alexa Fluor 647 donkey anti-rabbit IgG, Alexa Fluor 647 donkey anti-chicken IgG (1:1000, Thermo Fisher Scientific, Rockford, IL). Spinal cord free-floating sections were stained with 1:300 dilution of NeuroTrace 500/525 green fluorescent Nissl stain (Molecular Probes, Eugene, OR) for 1 hr. The sections were permeabilized with 0.1% Triton X-100 in PBS at 10 minutes and washed first with PBS followed by PBS with 0.1% Triton X-100 for 10 minutes. Samples were incubated with 0.5 μg/ml DAPI for 5 min and then washed with PBS for 2 hours at room temperature. Fluoromount-G mount medium (Southern Biotech, Birmingham, AL) was applied to brain and spinal cord sections before mounting.

Microscopy

Neuronal SCG cultures were imaged with a Nikon Ti-E inverted epifluorescence microscope (Nikon Instruments Inc, Tokyo, Japan), containing a Cool Snap ES2 camera (Photometrics, Tucson, AZ) and 4× objective. Tiled images of the entire S compartment were assembled with the Nikon NIS Elements software. To quantify AAV transduction efficacy in various brain regions, brain slices were imaged with a NanoZoomer S60 fluorescent microscope scanner (Hamamatsu, Hamamatsu, Japan). Brain slices were imaged with a Leica STP8000 confocal laser-scanning microscope (Leica Microsystems, Wetzlar, Germany) using 20× and 63× objectives, hybrid (HyD) detectors for sensitive detection, and over a 1024×1024 pixels area. The ImageJ software was used to calculate corrected total cell fluorescence as previously reported (Maturana, Aguirre et al. 2017). Cells were selected drawing a region of interest (ROI) and normalized to background intensity from non-fluorescent cells. The calculation of corrected total cell fluorescence was measured as relative fluorescence intensity (RFI) considering area integrated, density and mean gray value of each cell.

iDISCO+ Tissue Clearing

Permeabilization

Right brain hemispheres were used for iDISCO+ tissue clearing. Brain samples were fixed overnight in 4% PFA prior to tissue clearing as previously described (Renier, Wu et al. 2014). Fixed samples were washed/dehydrated in 20, 40, 60, 80, 100% methanol/water solutions for 1 hr each, followed by a 5% hydrogen peroxide/methanol overnight wash (Sigma-Aldrich, St. Louis, MO) and rehydration with a reverse gradient of methanol/water 100, 80, 60, 40, 20% for 1 hour each. Finally, brains were washed with 0.2% Triton X-100/PBS, followed by 20% DMSO (Thermo Fisher Scientific, Rockford, IL)/0.3M glycine (Sigma-Aldrich, St. Louis, MO)/0.2% Triton X-100/PBS at 37° C. for 2 days.

Immunolabeling

Samples were incubated in a blocking solution of 10% DMSO/6% donkey serum (EMD Millipore, Temecula, CA)/ 0.2% Triton X-100/PBS at 37° C. for 2-3 days, followed by two 1 hr/washes, in PBS/0.2% Tween-20 (Sigma-Aldrich, St. Louis, MO) with 10 µg/ml heparin (solution hereinafter referred to as PTwH, Sigma-Aldrich, St. Louis, MO). Brains were incubated with primary rabbit anti-RFP antibody (1:1000; Rockland, Limerick, PA) in 5% DMSO/3% donkey serum/PTwH at 37° C. for 7 days. Next, brains were washed with PTwH 5 times (wash intervals: 10 minutes, 15 minutes, 30 minutes, 1 hour, 2 hours) and incubated at 37° C. for 7 days with secondary Alexa Fluor 647 donkey anti-rabbit IgG (1:450, Thermo Fisher Scientific, Rockford, IL) in 3% donkey serum/PTwH and then washed in PTwH for 5 times.

Tissue Clearing

Brains were sequentially dehydrated in 20, 40, 60, 80, 100% methanol/water for 1 hour each step, followed by 2:1 dichloromethane (DCM; Sigma-Aldrich, St. Louis, MO)/ methanol, and 100% DCM washes. Finally, samples were cleared with DBE (Sigma-Aldrich, St. Louis, MO) and stored in the dark at room temperature until imaged.

Light-Sheet Microscopy and Analysis of Cleared Tissue

After immunolabeling and clearing, brain volumes were acquired using a light-sheet Ultramicroscope II (LaVision Biotec, Bielefeld, Germany). Brain halves were glued in the horizontal orientation on a custom-designed 3D-printed holder (Renier, Wu et al. 2014; Renier, Adams et al. 2016) and submerged in DBE. Brains were imaged in the autofluorescent channel for registration purposes with a 488-nm laser diode excitation and a 525-nm maximum emission filter (FF01-525/39-25, Semrock, Rochester, NY), and at 640-nm excitation with a 680-nm maximum emission filter (FF01-680/42-25, Semrock) for cellular imaging of AAV infected cells (anti-RFP). Separate left- and right-sided illumination autofluorescent images were acquired every 10 micrometers (z-steps size) using a 0.017 excitation-sheet NA and 1.3× magnification. Left and right sided images were sigmoidally blended at the midline. Autofluorescent volumes were registered to the volumetric Allen brain atlas (2015) using affine and b-spline transformations, as described by Renier and colleagues (Renier, Wu et al. 2014; Renier, Adams et al. 2016). To account for movement during acquisition and different imaging parameters between channels, cell signal volumes were registered to autofluorescent volumes with an affine transform. Brain volumes were analyzed with our modified ClearMap software: "ClearMap_cluster" (github.com/PrincetonUniversity/clearmap_cluster), compatible with high performance computing clusters. For all analyzed samples, detected objects on brain edges and ventricles were eroded by 75 µm from the edge of the structure to minimize false positives.

RNAscope In Situ Hybridization

Brain cryosections were mounted on superfrost plus adhesion slides (Thermo Fisher, Waltham, MA) and stored at −80° C. RNA staining was performed using the RNAscope multiplex fluorescent reagent kit (Advanced Cell Diagnostics (ACD), Newark, CA) following the manufacturer's protocol. The mCherry probe ACD #431201-C2 was used. Slices were pretreated with protease IV for 30 minutes at 40° C., followed by probe incubation for 2 hours at 40° C. Then, different amplifier solutions were performed for 30 minutes, 30 minutes, and 15 minutes at 40° C. Signal was detected with TSA plus fluorescein system (Perkin Elmer, Waltham, MA). Incubation steps were done in the ACD HybEZ hybridization system. Slides were counterstained with DAPI for 30 seconds at room temperature and then washed twice with PBS. Finally, slides were mounted with VECTASHIELD Vibrance antifade mounting medium (Vector Laboratories, Burlingame, CA).

Statistics

Statistical data analysis was performed using GraphPad Prism 7 software (GraphPad Software, Inc., La Jolla, CA). Two-tailed Student's test was used to compare between two groups, and non-parametric one-way ANOVA test followed by a Bonferroni multiple comparison post-test to compare among multiple groups. A p value<0.05 was statistically significant. Data are represented as the mean with SEM.

Figure 1C:
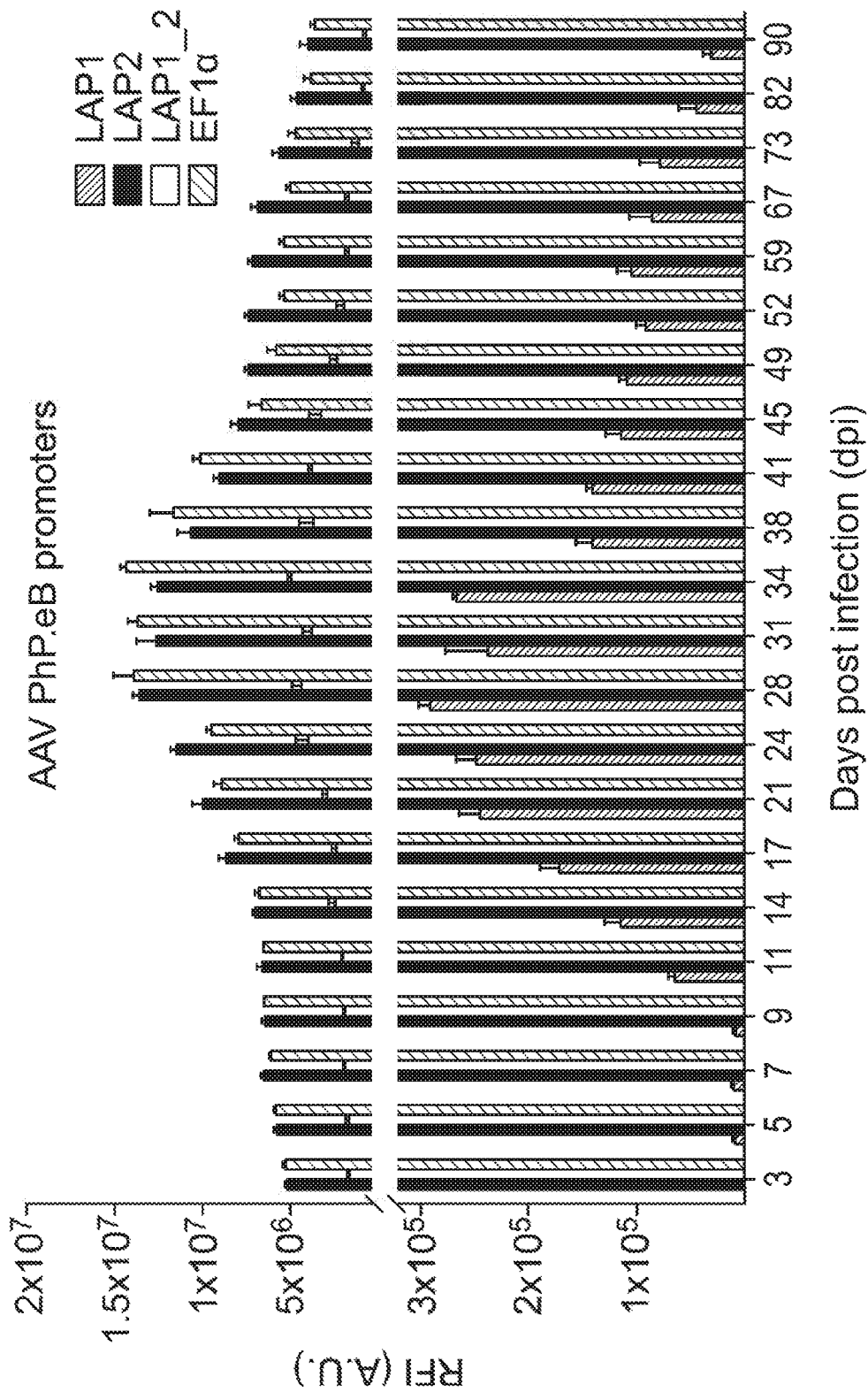
Figure 1D:
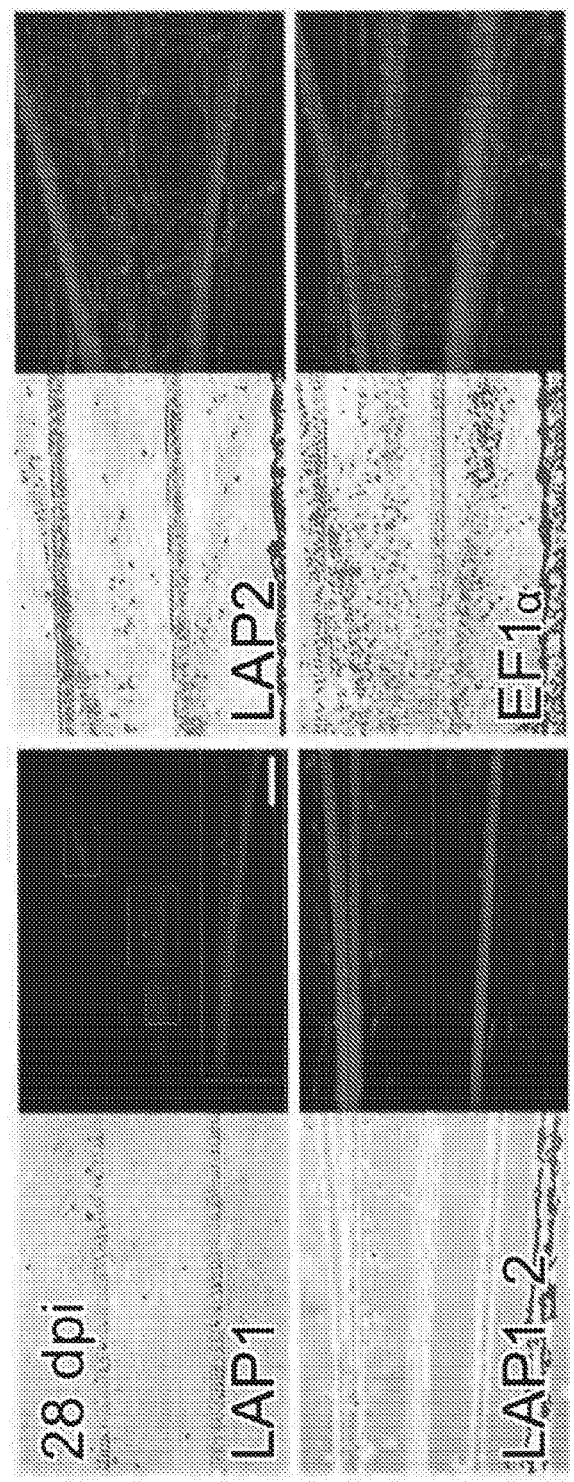

Example 2. Small Prv Lap Sequences can Drive Transgene Expression in Neurons Independently of Herpesvirus Infection The PRV LAP region includes at least two promoter regions defined here as LAP1 and LAP2 (FIG. 1A). In the PRV genome, LAP1 and LAP2 are present in tandem as PRV LAP1_2. These sequences, alone or combined, are capable of efficient expression of reporter transgenes in primary sympathetic neurons when used in AAV vectors without PRV infection (FIGS. 1C and 1D). The LAP sequences were analyzed to identify putative regulatory elements using the Jasper (Sandelin, Alkema et al. 2004; Wasserman and Sandelin 2004), the RSAT (Nguyen, Contreras-Moreira et al. 2018) and the CTCFBSDB 2.0 (Ziebarth, Bhattacharya et al. 2013) software. Three cyclic AMP response element-binding protein (CREB) binding motifs were detected upstream of the LAP1 TATA box, and one was detected upstream of the LAP2 TATA box. Moreover, two CCCTC-binding factor (CTCF) binding motifs were detected upstream of the LAP1 TATA box and one was detected downstream of the LAP2 TATA box. Downstream promoter elements (DPE) were identified in LAP2, including three CG boxes and four signal transducer and activator of transcription 1 (STAT1) binding motifs. Additionally, there were lineage-determining TFs (Wang, Pol et al. 2014), such as SRY-Box 10 (SOX10) and oligodendrocyte transcription factor 2 (Olig2), upstream of the LAP1 TATA box and the LAP2 TATA box, respectively (FIG. 1A).

Four AAV recombinants were packaged into serotype PHP.eB capsids by standard methods. Three promoter constructs, LAP1 (498 bp, corresponding to SEQ ID NO: 1), LAP2 (404 bp, corresponding to SEQ ID NO: 2) and LAP1_2 (880 bp, corresponding to SEQ ID NO: 3), were prepared. The ubiquitous EF-1α promoter (1264 bp) was used as a positive control for transgene expression. All four AAV recombinants expressed the fluorescent reporter mCherry (FIG. 1B). To verify the in vitro performance of each promoter, rat primary superior cervical ganglia (SCG) neuronal cultures were transduced with $3\times10^{11}$ genomes of each AAV, and the relative mCherry fluorescence intensity (RFI) was quantified over a 90-day period.

For neurons transduced with AAV-LAP1, mCherry expression increased abruptly at 11 dpi (64220 RFI) but to a lower level when compared with AAV-LAP2, AAV-LAP1_2 and AAV-EF1α. AAV-EF1α expression increased ~120-fold more at 17 dpi ($8.70\times10^6$; $2.39\times10^6$; $8.01\times10^6$ RFI respectively) (FIG. 1C). The highest level of expression by all four recombinants was at 28 dpi: LAP1 (291,242 RFI); LAP2 ($1.36\times10^7$ RFI); LAP1_2 ($4.36\times10^6$ RFI) and EF1α ($1.40\times10^7$ RFI) (FIGS. 1C and 1D). LAP2 and EF1α had the highest mCherry RFI (LAP2=EF1α>LAP1_2>LAP1). Between 38 dpi and 90 dpi, all four AAV recombinants showed a subtle but sustained RFI decrease (FIG. 1C), most likely due to the senescence of primary SCG neurons after more than 100 days in culture. Importantly, all three AAV-LAP recombinants showed mCherry transcription in primary neurons for 90 days in the context of AAV transduction and in the absence of PRV infection.

Figure 2A:
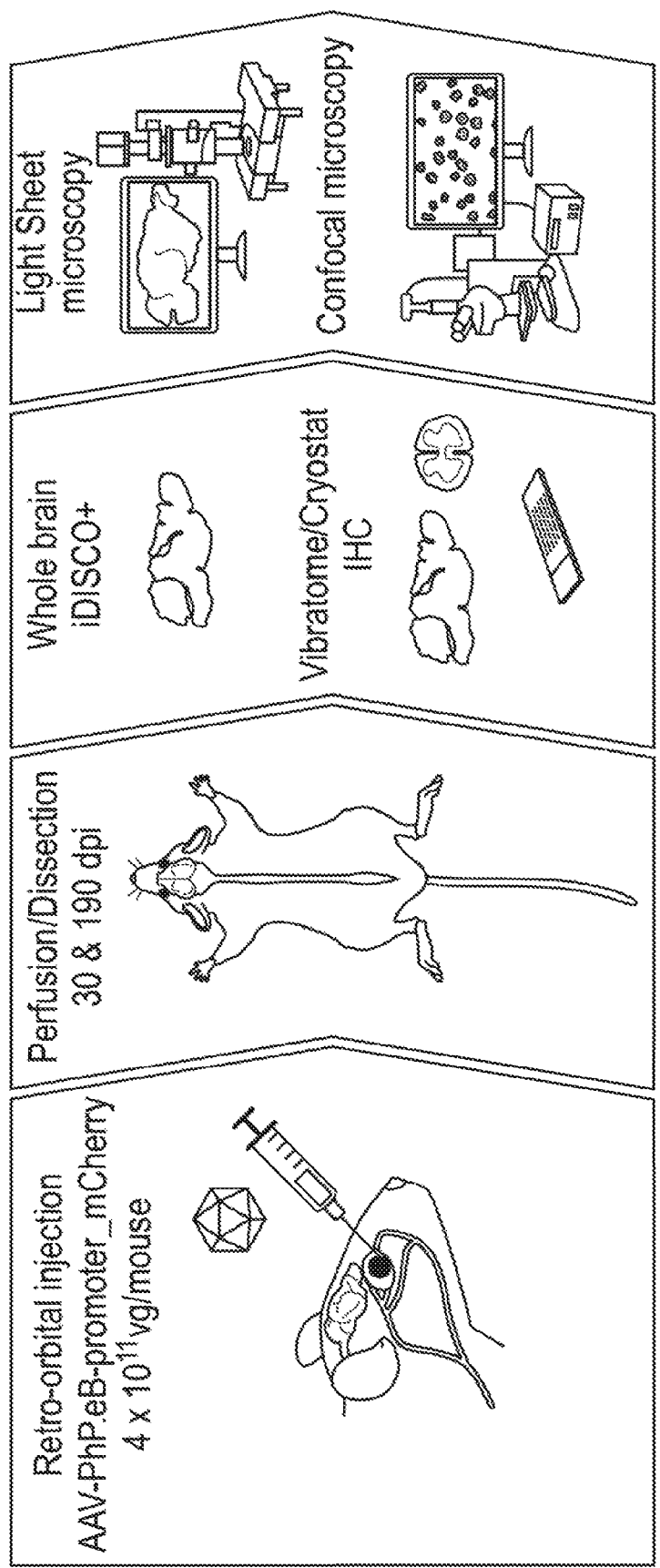
FIGS. 2A-2P show stable and long-term LAP-mediated transgene expression.
Figure 2D:
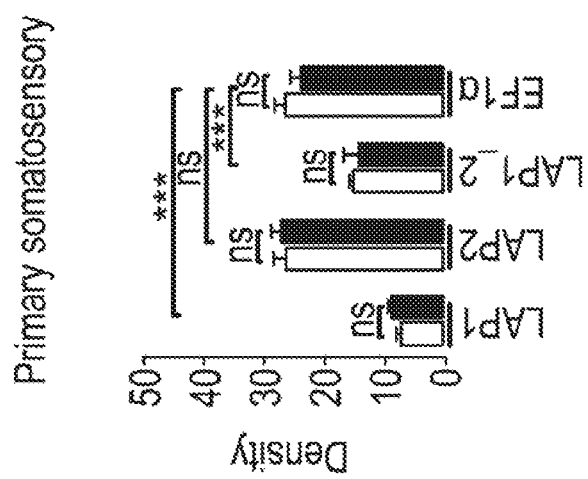
Figure 2C:
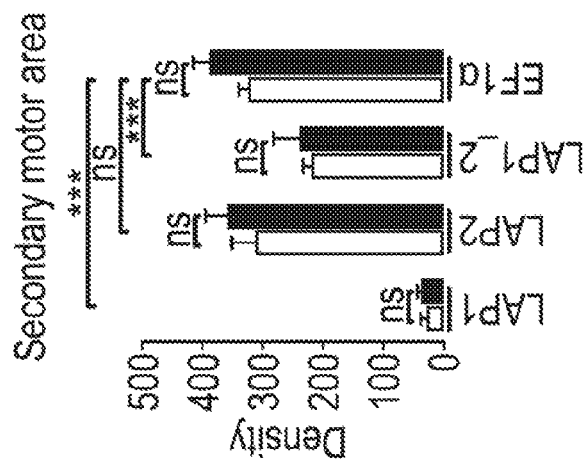

Example 3. Whole-CNS Screening Reveals Pan-Neuronal AAV-Lap Transgene Expression after Six Months AAV serotype PHP.eB was used for a promoter screening assay given the enhanced capacity to cross the BBB and transduce C57/BL6 mice CNS after systemic, intravascular delivery (Chan, Jang et al. 2017). AAV-LAP1-mCherry, AAV-LAP2-mCherry, AAV-LAP1_2-mCherry and AAV-EF1α-mCherry were delivered by unilateral retro-orbital venous sinus injection of $4\times10^{11}$ viral genomes/mouse (vg/mouse). As illustrated in FIG. 2A, the brains and spinal cords were harvested 30 days and 190 days post-AAV transduction to quantify mCherry transcription and translation. LAP-mCherry expression in the whole intact brain was determined after the tissues were cleared, immunostained with iDISCO+ (immunolabeling-enabled three-dimensional imaging of solvent-cleared organs), and analyzed by light-sheet microscopy and volumetric registration (Renier, Wu et al. 2014; Renier, Adams et al. 2016).

Figure 2B:
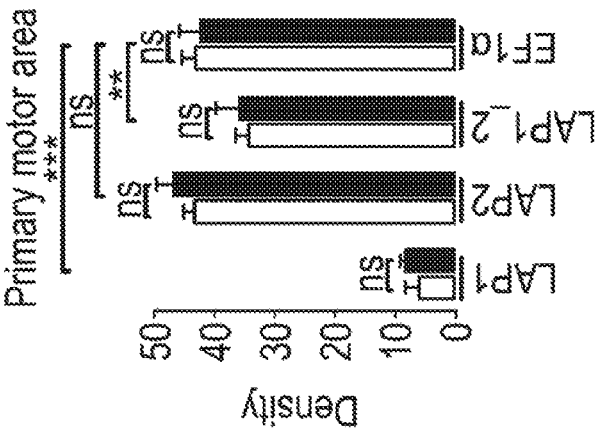
Figure 2J:
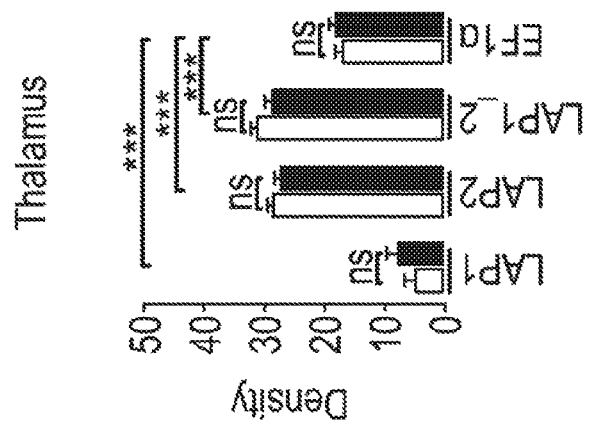
Figure 2I:
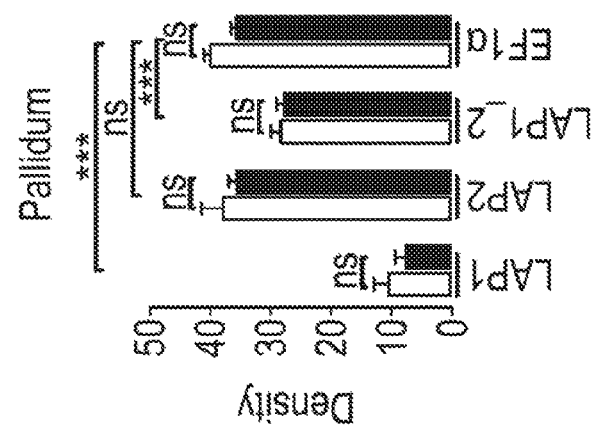
Figure 2H:
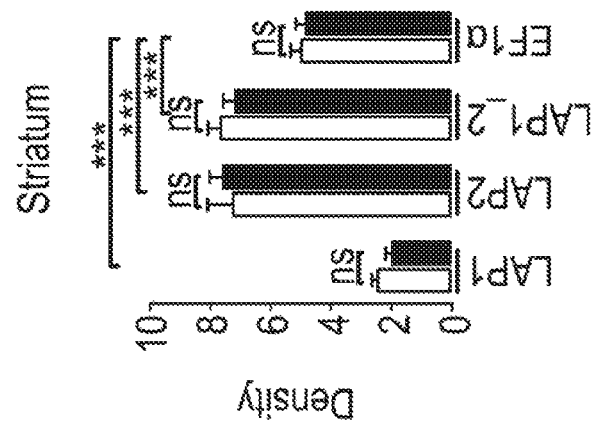
Figure 2P:
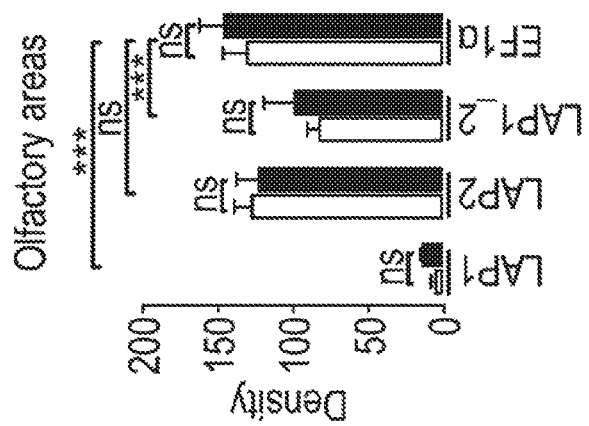
Figure 2O:
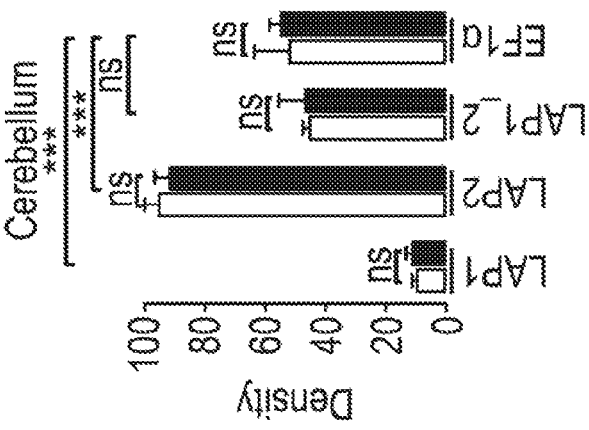
Figure 2N:
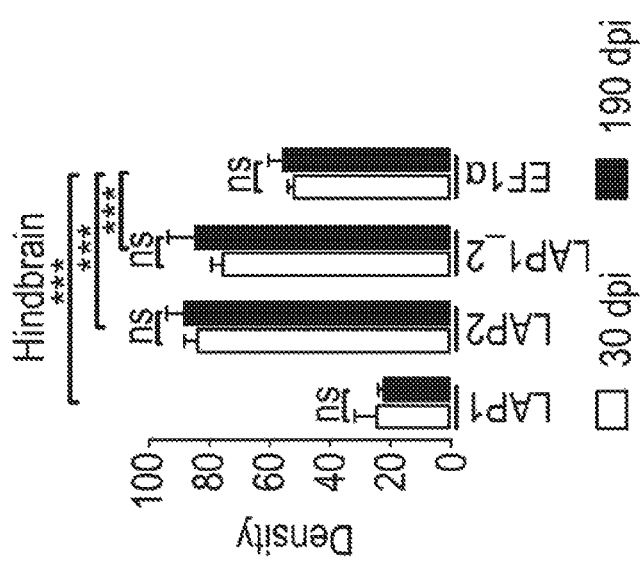
Figures 5A, 5B, 5C:
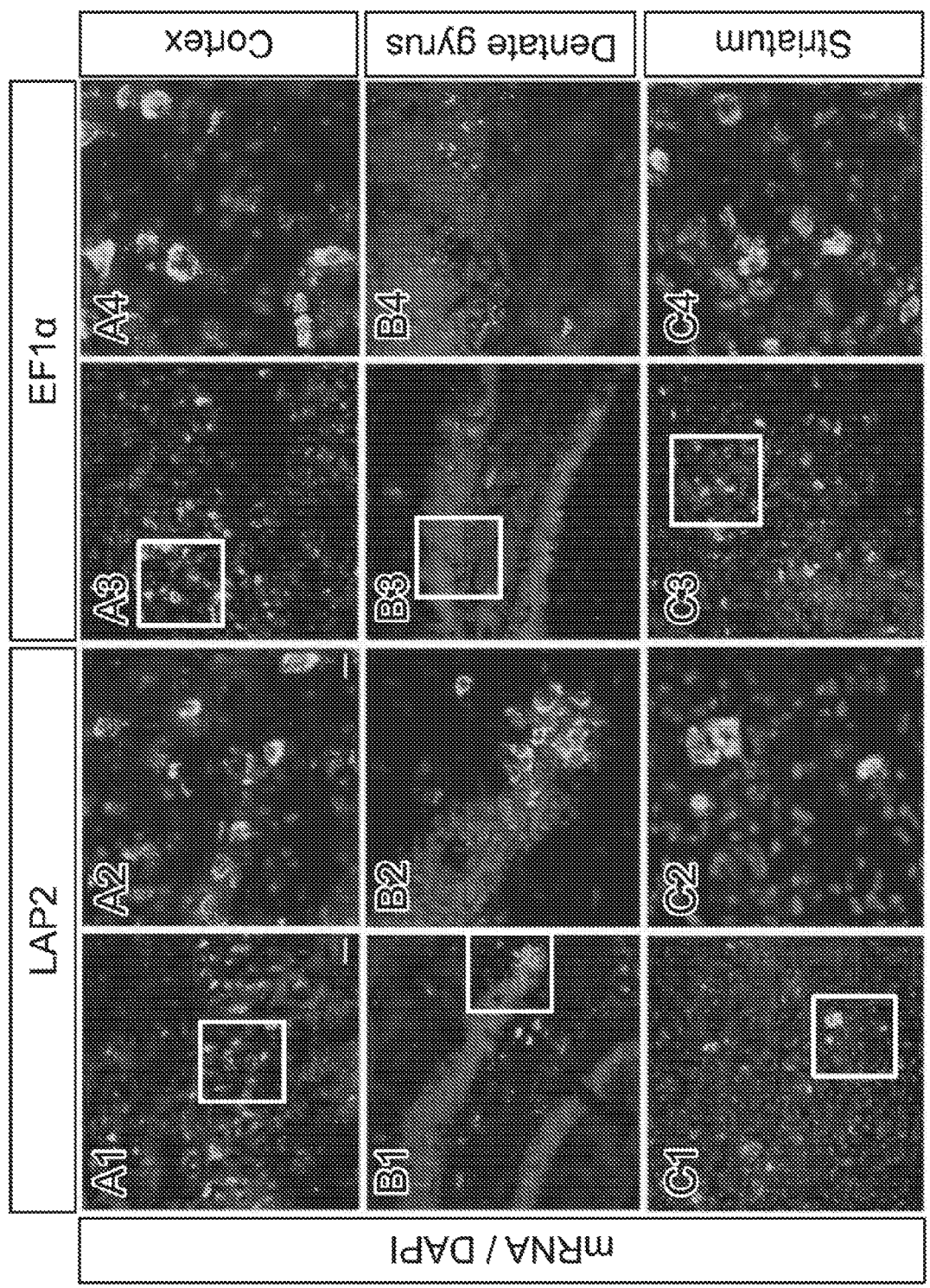
FIGS. 5A-5E show that AAV-LAP2 drives long-term transgene transcription in the CNS. The presence of mCherry mRNA was verified by FISH in brain tissues at 190 dpi using a riboprobe specific to mCherry (green). Nuclei were counterstained with DAPI (blue).
Figures 5D, 5E:
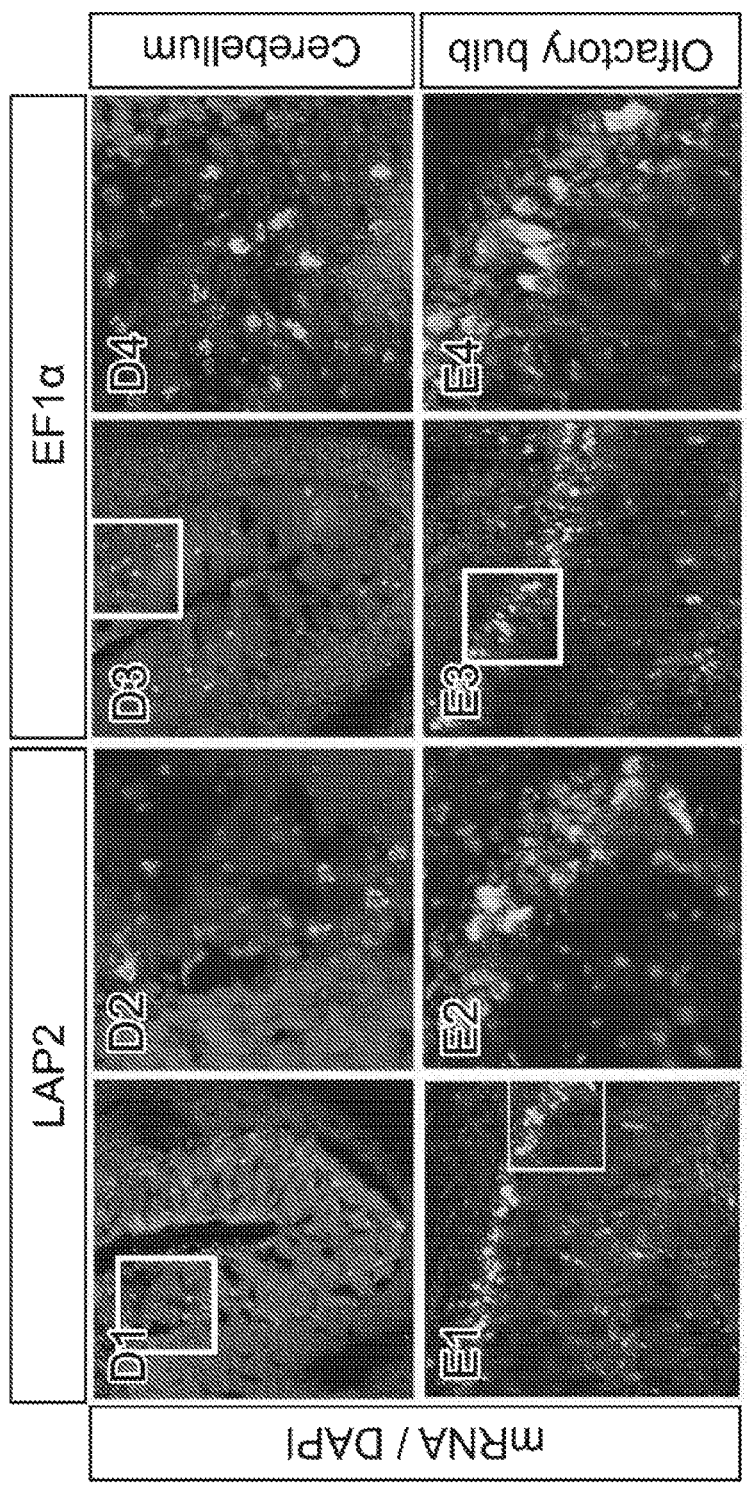

As demonstrated in FIGS. 2B-2P, all four promoters showed stable mCherry expression at both 30 dpi and 190 dpi. The density (number of mCherry positive cells per mm$^3$ of brain tissue) of LAP2 was higher than those of LAP1 and LAP1_2, and was not significantly different from that of EF1α in different areas of the brain: cortex: primary motor, secondary motor, primary somatosensory and supplemental somatosensory, FIGS. 2B-2E); hippocampal formation (FIG. 2G), pallidum (FIG. 2I), hypothalamus (FIG. 2K) and olfactory areas (FIG. 2P). In cerebellum, LAP2 showed higher mCherry density than LAP1, LAP1_2 and EF1α (FIG. 2O). Furthermore, in striatum (FIG. 2H); thalamus (FIG. 2J); midbrain, motor and sensory areas (FIGS. 2L and 2M), and hindbrain (FIG. 2N), LAP2 and LAP1_2 showed significantly higher density than EF1α ($p<0.05$). Note that the LAP2 nucleotide sequence is 68% shorter than that of EF1α, yet outperforms EF1α in several brain areas.

Figures 4A, 4B:
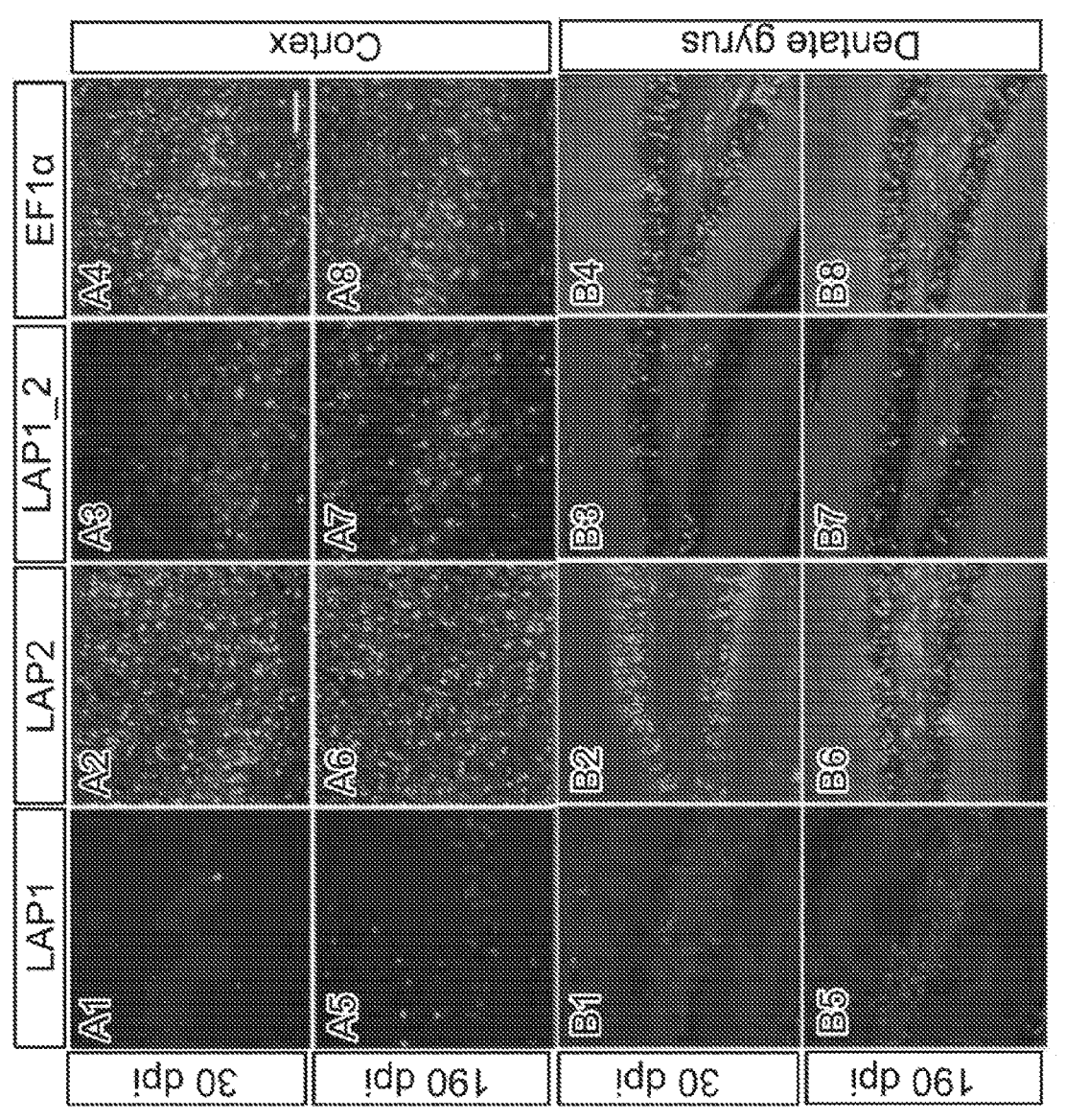
Figures 4C, 4D:
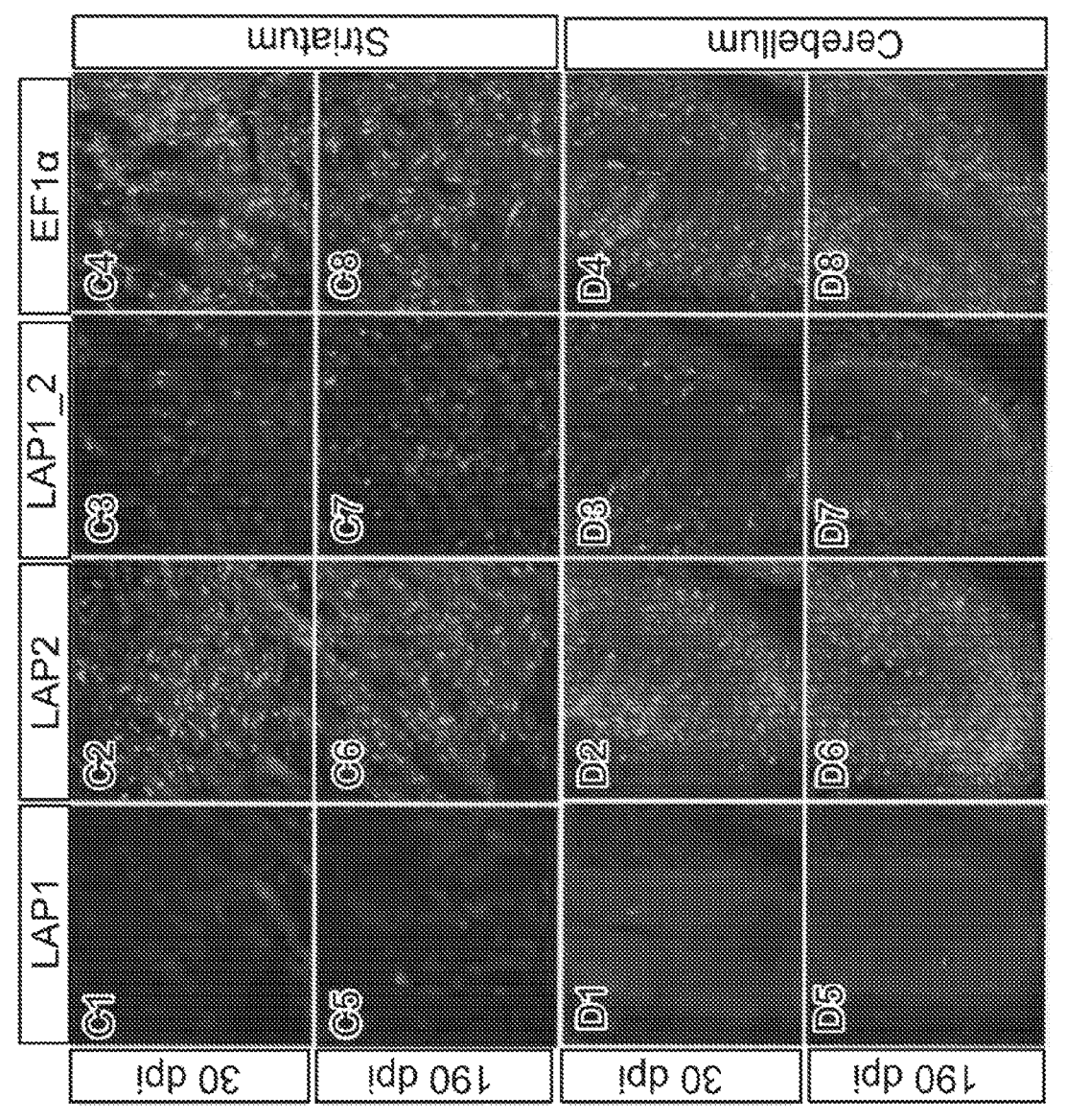

To further validate LAP transgene expression in the CNS, mCherry protein expression was assessed by immunohistochemistry (IHC) in sagittal brain sections at 30 dpi and 190 dpi (FIGS. 3A-3H). Confocal microscopy analysis showed abundant mCherry staining throughout the cortical somatosensory area (FIG. 3E), the dentate gyrs in the hippocampal formation (FIG. 3F), the caudoputamen in the striatum (FIG. 3G), and the cerebellar cortex (FIG. 3H) at 30 dpi. Importantly, mCherry expression was stable for all three LAP sequences at 190 dpi and was similar to that of the larger AAV-EF1α-mCherry promoter (FIGS. 3E-3H, Panels 5-8). Next, mCherry expression was quantified at 30 dpi and 190 dpi. The mCherry RFI was similar for all AAV promoters with no significant differences (FIGS. 3I1-3I4). The number of mCherry positive cells per pixel$^2$ after 190 days was subsequently quantified. In the cortex, the number of LAP2 mCherry expressing cells was higher than those observed for LAP1-mCherry and LAP1_2-mCherry [LAP2: 297±19.82 vs. LAP1: 149±5.61 vs LAP1_2: 168±9.22 (n=6, p<0.001) (FIG. 3J1). In the dentate gyrs, the striatum and the cerebellum, the number of mCherry positive cells was similar for all LAP variants and EF1α (FIGS. 3J2-3J4). Thus, all AAV-LAP variants promote mCherry expression in the brain, further demonstrating that a single administration of AAV-LAP recombinants can be sufficient for driving long term, pan-neuronal transgene expression in the mouse CNS.

Example 4. The Small LAP2 Promoter Variant Drives Strong and Stable Pan-Neuronal Transgene Expression after Systemic AAV Administration The efficacies of mCherry expression under the control of different PRV LAP sequences were compared. Abundant signal in the cortex (FIGS. 4A and 4E1), dentate gyrs (FIGS. 4B and 4E2), striatum (FIGS. 4C and 4E3) and cerebellum (FIGS. 4D and 4E4) at 30 dpi and 190 dpi were observed. Moreover, the AAV-LAP2 RFI was stable and similar to AAV-EF1α both at 30 dpi and 190 dpi ($p<0.05$) (FIGS. 4E1-4E4; Table 2). Although AAV-LAP1 and AAV-LAP1_2 mCherry RFI levels were stable and not significantly different between them at 30 dpi and 190 dpi in cortex, dentate gyrs, striatum and cerebellum (FIGS. 4E1-4E4; Table 2), both promoters showed significantly less transgene expression compared to LAP2 and EF1α.

TABLE 2

| | | mCherry Expression in Mouse Brain with Different AAV-PHP.eB-Promoter | | | |
|---|---|---|---|---|---|
| | | Direct mCherry expression | | Indirect IHC mCherry expression | |
| | | 30 dpi$^a$ | 190 dpi | 30 dpi | 190 dpi |
| | | Mean (RFI)$^b$ | Mean (RFI) | Mean (RFI) | Mean (RFI) |
| Promoter | Brain region | ± SEM | ± SEM | ± SEM | ± SEM |
| LAP1 | Cortex | 1.05 ± 0.12 | 1.35 ± 0.14 | 8.51 ± 0.47 | 8.46 ± 0.49 |
| | Dentate gyrus | 1.36 ± 0.11 | 0.99 ± 0.04 | 9.87 ± 0.72 | 9.00 ± 0.44 |
| | Striatum | 1.18 ± 0.13 | 1.41 ± 0.18 | 9.14 ± 0.97 | 9.17 ± 1.41 |
| | Cerebellum | 1.31 ± 0.17 | 1.48 ± 0.15 | 9.38 ± 0.92 | 9.75 ± 1.16 |

TABLE 2-continued mCherry Expression in Mouse Brain with Different AAV-PHP.eB-Promoter

| | | Direct mCherry expression | | Indirect IHC mCherry expression | |
|---|---|---|---|---|---|
| Promoter | Brain region | 30 dpi[a] Mean (RFI)[b] ± SEM | 190 dpi Mean (RFI) ± SEM | 30 dpi Mean (RFI) ± SEM | 190 dpi Mean (RFI) ± SEM |
| LAP2 | Cortex | 9.66 ± 0.41 | 9.39 ± 0.69 | 9.30 ± 0.70 | 10.18 ± 0.51 |
| | Dentate gyms | 8.61 ± 0.63 | 9.32 ± 0.63 | 10.26 ± 0.52 | 10.01 ± 0.59 |
| | Striatum | 9.91 ± 0.51 | 10.61 ± 0.65 | 9.92 ± 0.57 | 11.06 ± 0.66 |
| | Cerebellum | 10.66 ± 0.67 | 10.34 ± 0.84 | 9.59 ± 0.50 | 10.26 ± 0.65 |
| LAP1_2 | Cortex | 5.18 ± 0.43 | 5.36 ± 0.39 | 8.01 ± 0.61 | 8.70 ± 0.36 |
| | Dentate gyms | 3.92 ± 0.70 | 4.17 ± 0.62 | 9.20 ± 0.64 | 10.02 ± 0.72 |
| | Striatum | 4.36 ± 0.84 | 4.67 ± 0.75 | 10.45 ± 0.48 | 10.17 ± 0.75 |
| | Cerebellum | 4.76 ± 0.54 | 5.42 ± 0.27 | 9.48 ± 0.56 | 9.86 ± 0.54 |
| EF1α | Cortex | 8.99 ± 0.62 | 9.05 ± 0.73 | 9.87 ± 0.77 | 10.16 ± 0.62 |
| | Dentate gyms | 9.16 ± 0.57 | 9.16 ± 0.81 | 9.40 ± 0.72 | 9.45 ± 0.64 |
| | Striatum | 9.96 ± 0.59 | 10.93 ± 0.67 | 11.26 ± 0.61 | 10.29 ± 0.85 |
| | Cerebellum | 10.72 ± 0.49 | 11.06 ± 0.84 | 10.92 ± 0.66 | 10.65 ± 0.89 |

[a]dpi: days post AAV injection
[b]RFI: relative fluorescence intensity

Since mRNA half-life is typically shorter than that of the translated protein (Chan, Mugler et al. 2018), mCherry transcripts in AAV-LAP transduced mouse brain slices were measured. AAV-LAP2-mCherry mRNA at 30 dpi (data not shown) and 190 dpi were measured using a mCherry-specific riboprobe. Fluorescent in situ hybridization (FISH) showed abundant AAV-LAP2 mCherry RNA in cortex, dentate gyms, striatum, cerebellum and olfactory bulb (FIGS. 5A-5E), further confirming that PRV LAP2 can drive chronic and robust transgene transcription in the CNS.

Figures 6A, 6B:
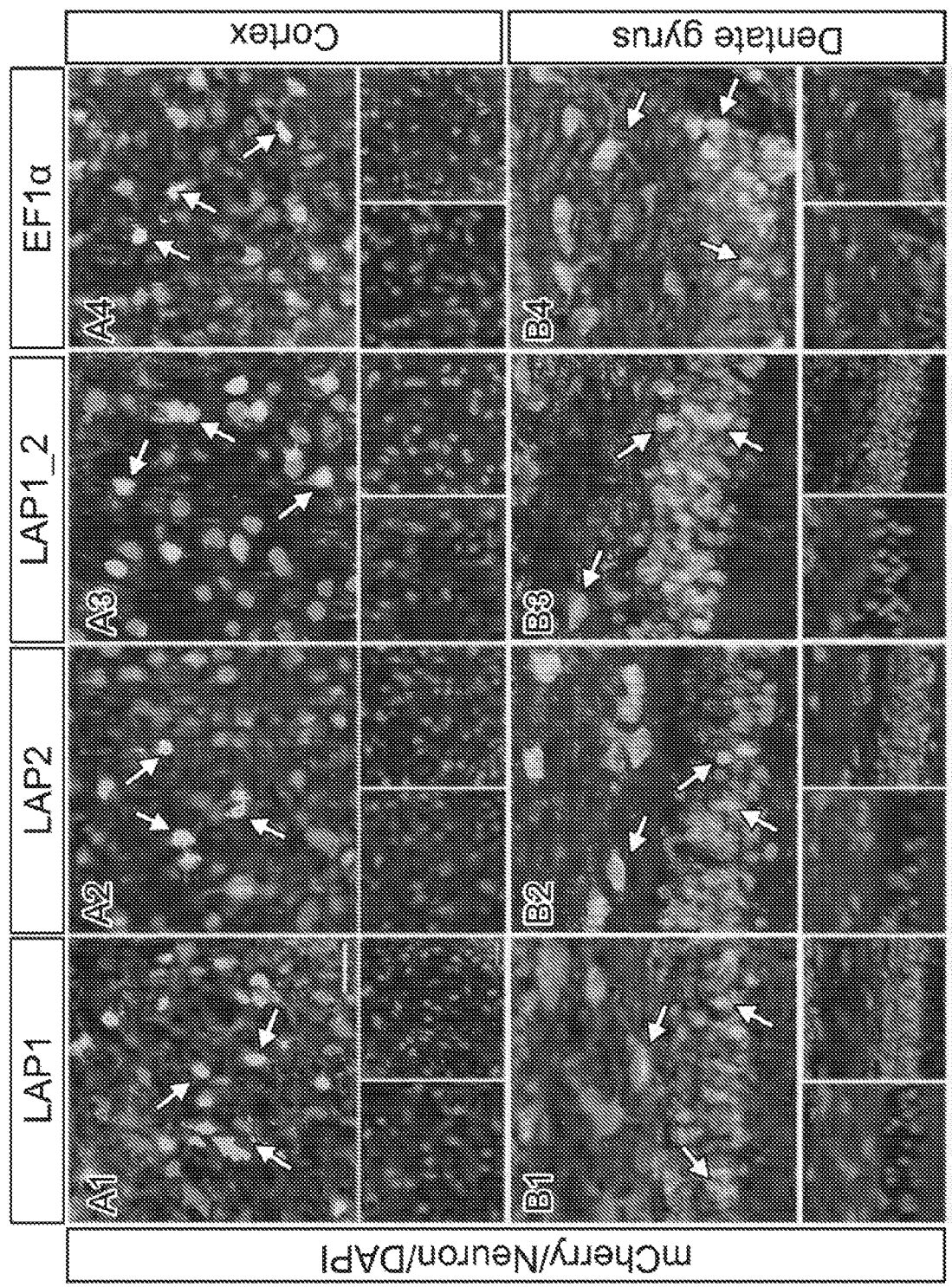
FIGS. 6A-6F show that AAV-LAP transgene expression is predominantly in neurons and not oligodendrocytes. Representative confocal images of AAV-mediated mCherry expression (red) in neurons (FIGS. 6A and 6B: green label for the pan-neuronal marker NeuN) or oligodendrocytes (FIGS. 6C and 6D: green label for the oligodendrocyte marker Olig2) in the cortex or the dentate gyms at 30 dpi. Cells were counterstained with DAPI (blue). NeuN signal can localize with the neuronal cell nucleus as well as the cytoplasm, while the staining for Olig2 signal is mostly nuclear. Arrows depict co-labelling between the cell marker and mCherry. Scale bar=100 μm.
Figures 6C, 6D:
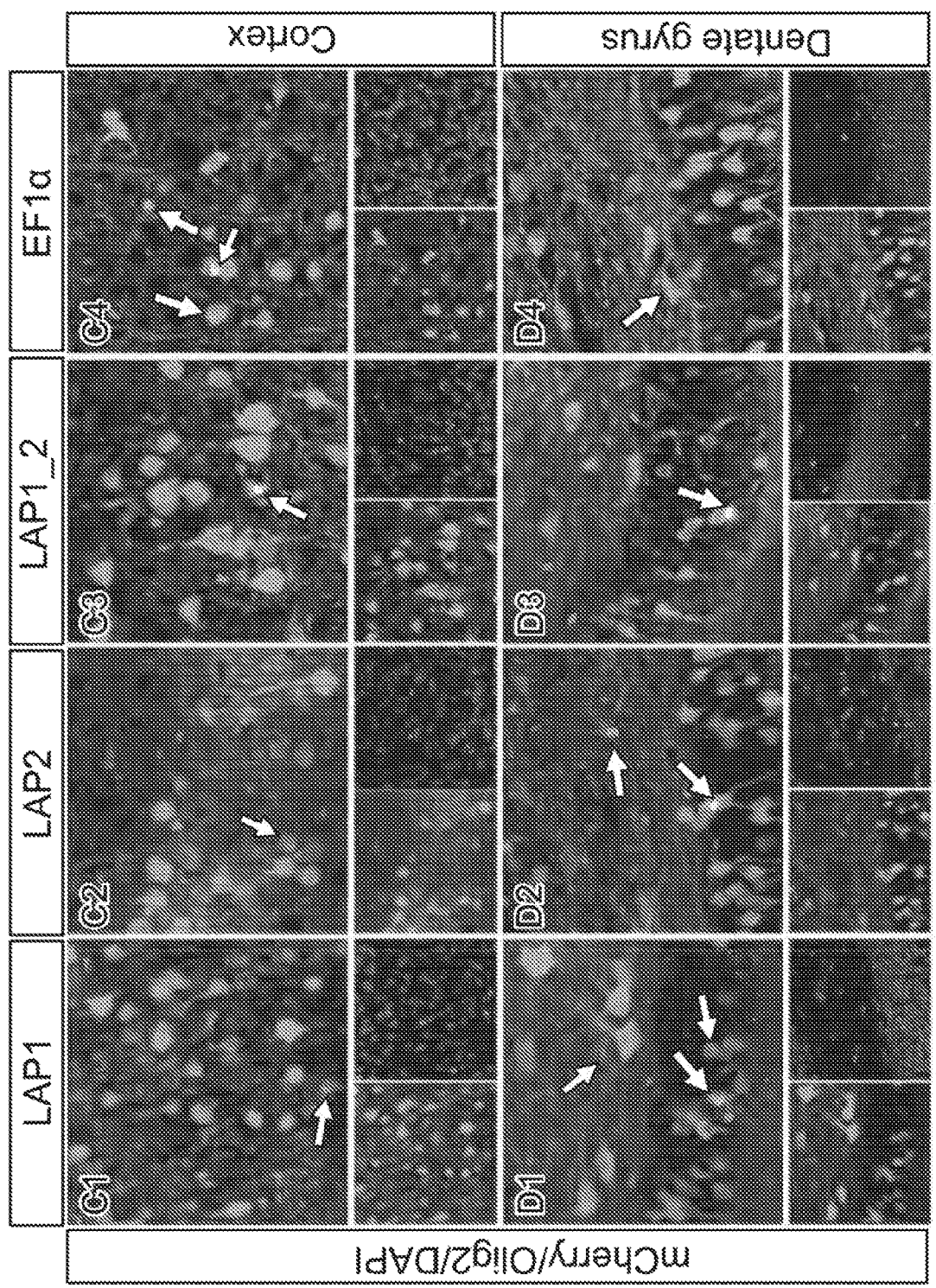
Figure 6F:
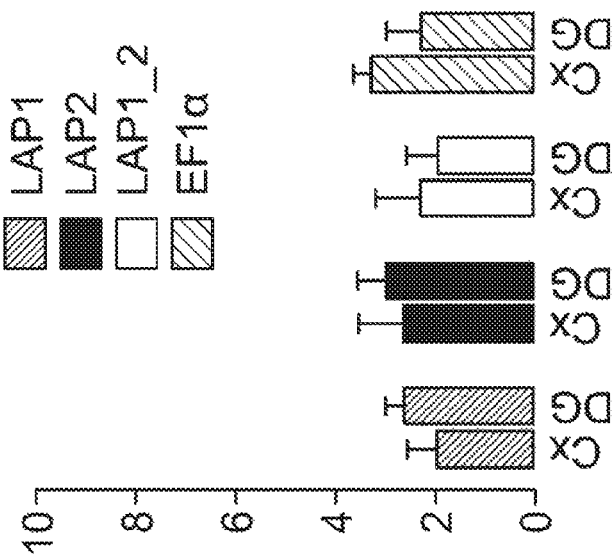
Figure 6E:
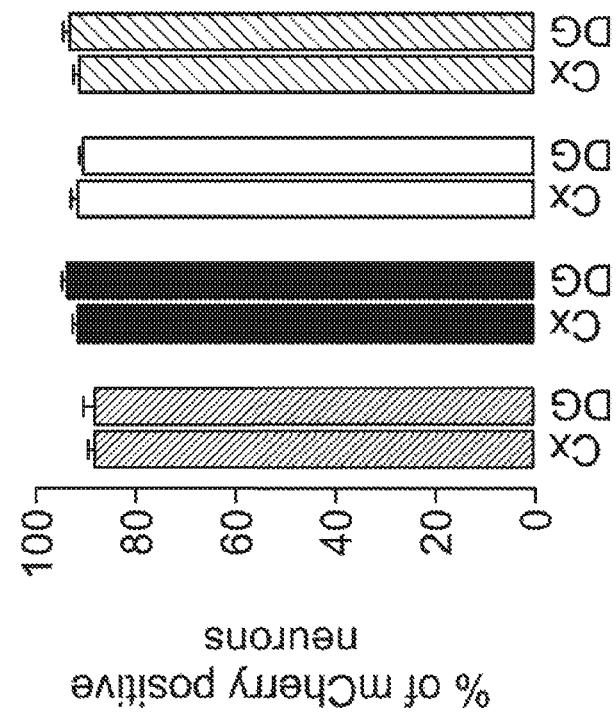
Figures 7C, 7D:
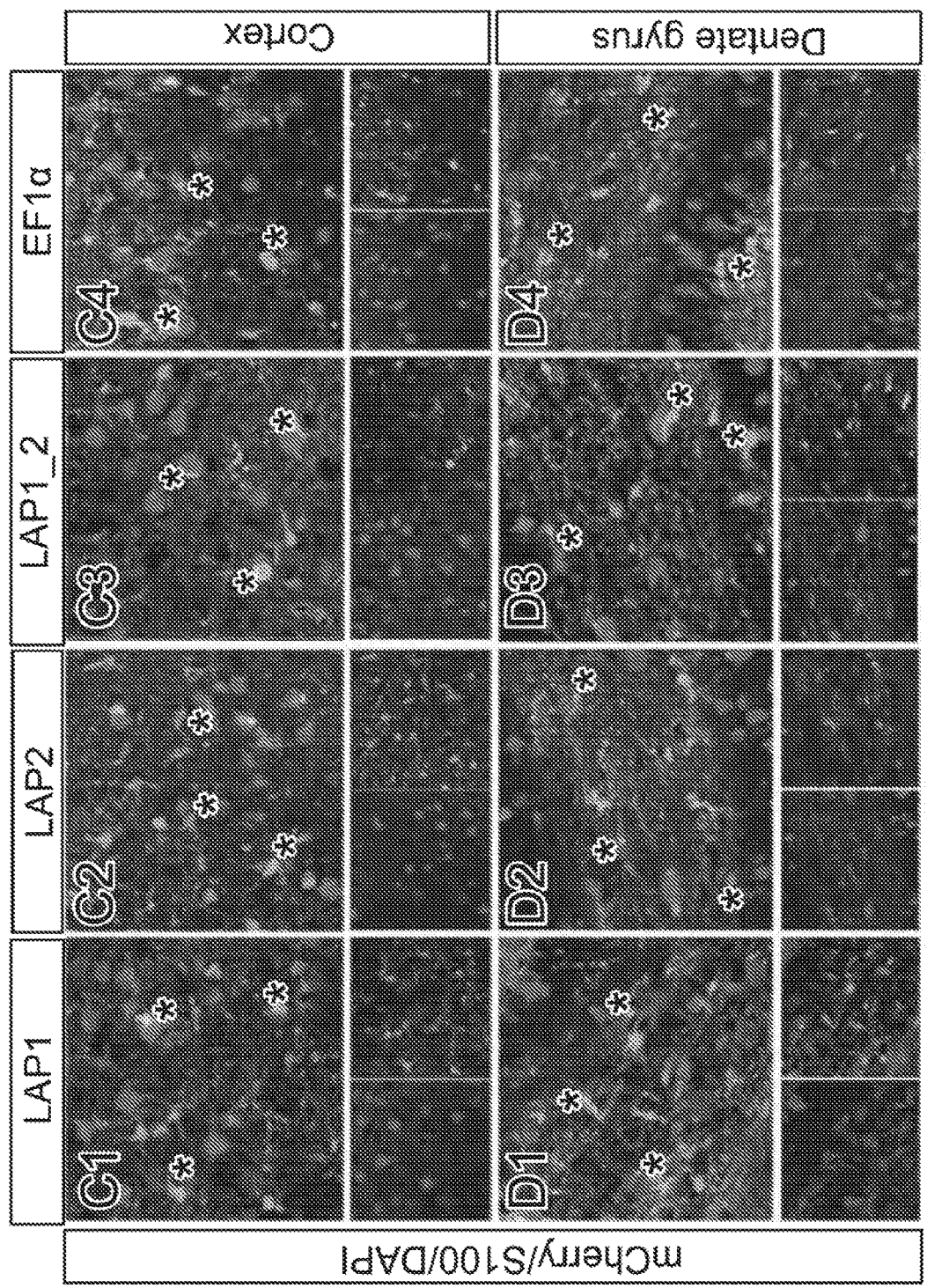

Example 5. AAV-LAP Transgene Expression in the Brain is Predominant in Neurons but not in Glial Cells The tropism and specificity of AAV transduction and subsequent transgene expression depend on the AAV serotype (Aschauer, Kreuz et al. 2013, Bedbrook; Deverman et al. 2018) and the promoter (von Jonquieres, Frohlich et al. 2016; Hammond, Leek et al. 2017; Dayton, Grames et al. 2018). To characterize which cell-types showed AAV-LAP-mCherry expression after systemic AAV-PHP.eB delivery, co-immunostainings of mCherry protein with markers for neurons (NeuN), oligodencrocytes (Olig2), microglia (Iba1) and astrocytes (S100) were performed in the cortex and dentate gyms. Co-staining with NeuN and mCherry revealed that over 90% of the neurons imaged expressed mCherry driven by the different AAV-LAP variants in both the cortex and dentate gyms (FIGS. 6A, 6B and 6E). Conversely, less than 4% of mCherry-positive oligodendrocytes were detected for all LAP variants (FIGS. 6C, 6D and 6F). Moreover, no co-labelling of mCherry with microglia and astrocyte markers for any of the LAP recombinants was observed (FIGS. 7A-7D). Overall, these results demonstrate that in the context of systemic brain transduction with AAV-PHP.eB, LAP-mCherry expression is abundant in neurons but not in glial cells.

Example 6. AAV-LAP Constructs Exhibit Broad, Stable and Long-Term Transgene Expression Throughout the Spinal Cord In addition to the brain, AAV-LAP performance in spinal cord, where the serotype PHP.eB has shown widespread transduction of gray matter (Chan, Jang et al. 2017; Dayton, Grames et al. 2018), was evaluated.

Figure 8F:
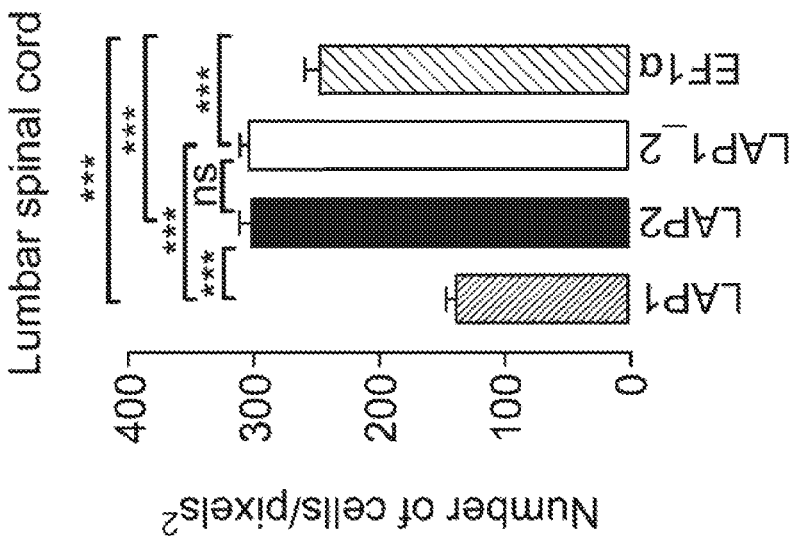
Figure 8E:
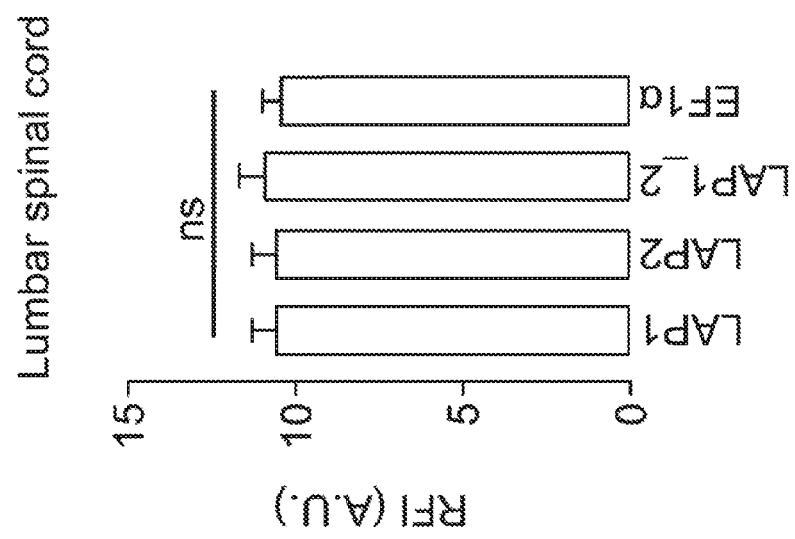

Abundant native mCherry expression in both dorsal and ventral horns of the spinal cord at cervical, thoracic (data no shown) and lumbar levels at 190 dpi were observed (FIGS. 8A-8D). Quantification of native mCherry fluorescence (RFI) for all promoters was similar, with no statistically significant differences (FIG. 8E). However, the LAP2 and LAP1_2 recombinants showed the highest density of mCherry-positive cells per pixel$^2$, followed by EF1α and LAP1; LAP2=LAP1_2>EF1α>LAP1 (FIG. 8F). Therefore, all three PRV LAP sequences effectively mediate pan-neuronal, long-term transgene expression in the spinal cord.

Gene therapy has been used to restore gene function in specific target cells in neurologic and neurodegenerative disorders (Deverman, Ravina et al. 2018). Gene transfer by systemic vector delivery via peripheral vascular transduction can be difficult for efficient expression in a neuron-specific or pan-neuronal fashion in the CNS (Ingusci, Verlengia et al. 2019). Recombinant AAV vectors are among the most efficient vehicles to achieve gene expression in the CNS (Hudry and Vandenberghe 2019, Wang, Tai et al. 2019). Moreover, engineered AAV capsids have shown improved CNS transduction and enhanced capacity to cross the BBB with higher efficiency than naturally-occurring serotypes (Chan, Jang et al. 2017; Bedbrook, Deverman et al. 2018; Hordeaux, Yuan et al. 2019; Qin Huang and Alejandro B. Balazs 2019). Despite these advances, AAV gene therapy is hindered by the small payload size limit of 4.9 Kb for the AAV capsid (Chamberlain, Riyad et al. 2016). For example, CNS therapies for Pompe disease (Colella, Sellier et al. 2019) and Parkinson's disease (Wang, Muramatsu et al. 2002) are based on delivery of relatively large genes such as GAA (2.9 Kb) and GDNF (2.5 Kb). For these and other similar cases, the use of larger promoters or even smaller CMV and hSyn promoters has been shown to be quickly repressed after delivery (Gray, Foti et al. 2011, Jackson, Dayton et al. 2016).

As described herein, three small pan-neuronal promoters isolated from the genome of the alphaherpesvirus PRV were identified, showing efficient and long-term transgene expression in the mice CNS after systemic AAV PHP.eB delivery. The results presented herein demonstrate that these small PRV LAP sequences can drive long-term expression of a reporter transgene (>6 months) in brain and spinal cord.

PRV LAP uniformly transduced neurons in the cortex, striatum, dentate gyms and cerebellum. The distribution of mCherry-positive cells was not significantly different between LAP sequences in the dentate gyms, striatum and cerebellum. However, LAP2 transgene expression was significantly higher in cortex compared to LAP1 and LAP1_2. The whole-brain screening assay demonstrated that the LAP2 variant of only 402 bp can drive stronger mCherry expression than the larger LAP1 and LAP1_2 sequences. Moreover, abundant mCherry mRNA transcribed from LAP2 was detected in every screened brain region at 190 dpi. These results demonstrate both efficient transcription and translation driven from the small PRV LAP2 in CNS after systemic AAV-LAP2 delivery in the absence of PRV infection.

Although the LAP1-mCherry cell density was significantly lower than that for LAP2, mCherry expression remained stable and long-lasting. Therefore, LAP1 might be useful in cases where low amounts of the therapeutic protein are needed (e.g. enzyme deficiencies) or for cross-correction to non-transduced cells. For example, for lysosomal enzyme deficiency (Husain, Passini et al. 2009) and mucopolysaccharidosis VII diseases (Cearley and Wolfe 2007), where the enzyme restored by AAV therapy can be secreted from the transduced cell and improve neighboring diseased cells.

AAV tropism is determined primarily by interactions between the capsid and specific receptors in susceptible and permissive cells (Aschauer, Kreuz et al. 2013; Bedbrook, Deverman et al. 2018). Different AAV serotypes have different tissue tropism. However, the promoter sequence and other sequences included in the vector such as the inverted terminal repeat sequence (ITR), can have a substantial impact on tropism (Haberman and McCown 2002). In addition, the promoter region transcribing the transgene is critically important to optimize AAV vector performance. Efficient transgene expression either in a broad or cell-type specific fashion, requires binding and action of cell-derived TFs to the promoter region (Dayton, Grames et al. 2018; Andersson and Sandelin 2019). Changes in the neuronal environment such as aging or differentiation, also can alter the recruitment of cell-specific regulatory proteins and therefore gene expression in the CNS (Herdegen and Leah 1998). The analysis of the PRV LAP sequence presented herein identified DPE in LAP2, which could control transgene expression onset, duration and cell-type specificity. Additionally, four STAT1 motifs, that in HSV-1 LAP seem to regulate viral reactivation from latency (Kriesel, Jones et al. 2004), were identified. Strikingly, one of these STAT1 motifs in PRV LAP2 was found to co-localize with the TATA box and an Olig2 motif, a known multifaceted TFs promoting neuronal and oligodendrocyte fates (Emery and Lu 2015). The proximity effects associated with these motifs and the transcriptional start site could explain the different levels of CNS transgene expression between LAP2, LAP1 and LAP1_2. Additionally, one CTCF motif was found downstream of the LAP2 TATA box, which could have a role in the resistance to epigenetic silencing during latency, as shown for HSV-1 (Lang, Li et al. 2017; Lee, Raja et al. 2018). Indeed, Zimmerman and colleagues (Zimmerman, Patel et al. 2018) found that insertion of a CTCF motif downstream of the EF1α promoter increased transgene expression significantly compared to native EF1α and CMV promoters. Interestingly, the insertion of a secondary CTCF motif downstream of the CMV TATA box, had no effect on luciferase reporter expression, presumably due to the redundant presence of a native CTCF motif (Zimmerman, Patel et al. 2018). Accordingly, gene expression is susceptible to changes depending of the genetic context and sequence-specific DNA binding proteins. The recruitment of specific TFs from different host cells can modulate transgene transcription by the same mechanisms regulating resistance to inactivation during latency. Insulator elements like the CTCF-binding factor are independently regulated (Washington, Musarrat et al. 2018) and can protect promoter regions from repression by heterochromatin, maintaining long-lasting transcription (Lang, Li et al. 2017).

Histological assessment of cell-specific transduction by colocalization of LAP-mCherry, glial and neuronal markers, revealed that LAP sequences express more efficiently in neurons than glia, in cortex and dentate gyms. LAP-mCherry positive cells colocalized predominantly with neuron-specific markers, and to a lesser extent with oligodendrocytes but not microglia or astrocytes. These findings suggest that PRV LAP sequences have a pan-neuronal promoter profile in the CNS after PHP.eB systemic delivery. This activity has also been found for the HSV LAP sequences due to the presence of a CRE motif upstream of the TATA box (Leib, Nadeau et al. 1991; Kenny, Krebs et al. 1994; Bloom, Stevens et al. 1997). PRV LAP1 and LAP2 are neuron-specific promoters in the absence of other viral proteins and that transgene expression levels vary across different neuronal types (Taharaguchi, Yoshino et al. 2003). Importantly, AAV-PHP.eB transduces neurons predominantly (Chan, Jang et al. 2017), and the combination of this capsid variant with PRV LAP sequences exhibits a strong, long-lasting, pan-neuronal expression profile in the CNS. Thus, PRV LAP sequences may be used not only in the context of recombinant viral vectors (AAV, adenovirus, lentivirus, herpesvirus), but also with non-viral gene delivery platforms. The natural host of PRV is the adult swine, but the virus has an extremely broad tropism and can infect some birds, fish and many types of mammals including some primates (Baskerville and Lloyd 1977). Moreover, human cells in culture are susceptible to PRV infection and there have been some reports of zoonotic infections (Wong, Lu et al. 2019). Therefore, the PRV LAP sequence may be optimized for gene therapy-applications requiring efficient and long-term transgene expression in several different mammals including humans.

In summary, the data presented herein demonstrated that PRV LAP promoter activity is independent of PRV infection and that small AAV-PHP.eB-LAP sequences express transgenes in a stable and pan-neuronal fashion in brain and spinal cord (CNS). Long-term transgene transcription and translation is paramount for effective and long-lasting single-dose gene therapy applications. Thus, PRV LAP sequences may be useful for the treatment of genetic CNS diseases.

Example 7. Lap Sequences Efficiently Drive Transgene Expression in Non-Neuronal Cells and Tissues In the following examples, LAP sequences were demonstrated to efficiently drive transgene expression of a fluorescent reporter protein (mCherry) in several cell and tissue types, including kidney, liver and retina. Furthermore, LAP was found to be compatible with viral vectors (such as AAV) as well as non-viral vectors (such as direct transfection of plasmid DNA).

Figures 9A, 9B, 9C:
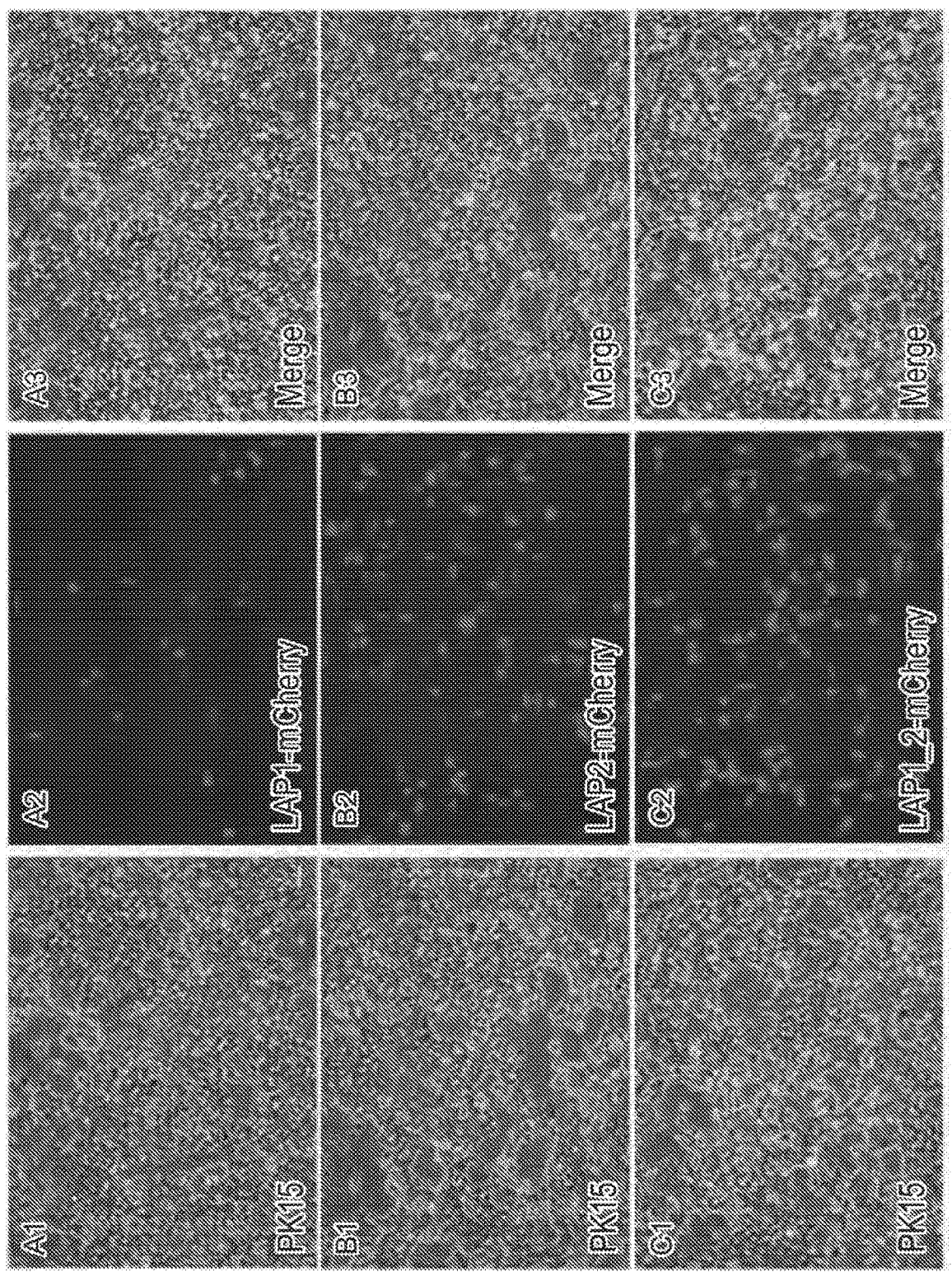
FIGS. 9A-9C show that LAP sequences drive efficient transgene expression in porcine kidney cells. Representative images of PK15 cells at 48 hours post transfection of a reporter plasmid comprising mCherry driven by LAP1 (FIG. 9A), LAP2 (FIG. 9B) or LAP1_2 (FIG. 9C). Panel 1: bright field; Panel 2: fluorescence; Panel 3: merge. Scale bar=50 μm.

As shown in FIGS. 9A-9C, the LAP sequences drive efficient transgene expression in porcine kidney cells. Representative images of PK15 cells (porcine kidney epithelial cells, ATCC CCL-33) were obtained at 48 hours post transfection of a reporter plasmid comprising mCherry driven by LAP1 (FIG. 9A), LAP2 (FIG. 9B), or LAP1_2 (FIG. 9C).

As shown in FIGS. 10A and 10B, LAP2 drives efficient transgene expression in human kidney cells. Representative images of HEK-293 cells (human embryonic kidney epithelial cells, ATCC CRL-1573) were obtained at 48 hours post transfection of a reporter plasmids comprising mCherry driven by LAP2 (FIG. 10A) or the EF1α promoter (FIG. 10B).

As shown in FIGS. 11A and 11B, LAP2 drives efficient transgene expression in human liver cells. Representative images of HepG2 cells (human liver epithelial cells, ATCC HB-8065) were obtained at 48 hours post transfection of a reporter plasmid comprising mCherry driven by LAP2 (FIG. 11A) or the EF1α promoter (FIG. 11B).

As shown in FIGS. 12A1-12B4, LAP2 drives long-term transgene expression throughout the liver. Intravenous administrations of the AAV-LAP2 (FIGS. 12A1-12A4) or the AAV-EF1α-vector (FIGS. 12B1-12B4) were performed by unilateral injections into the mouse retro-orbital sinuses ($4 \times 10^{11}$ vg/mouse). The liver was collected at 190 dpi and longitudinally sectioned at 20 μm for subsequent IHC and confocal microscopy analysis. Representative confocal images show native mCherry fluorescence (FIGS. 12A1 and 12B1: red), anti-mCherry immunostaining (FIGS. 12A2 and 12B2: green), DAPI nuclear counterstain (FIGS. 12A3 and 12B3: blue) and merged immunofluorescence and DAPI images (FIGS. 12A4 and 12B4).

As shown in FIGS. 13A1-13B4, LAP2 drives long-term transgene expression in the mouse kidney. Intravenous administrations of the AAV-LAP2 (FIGS. 13A1-13A4) or the AAV-EF1α-vector (FIGS. 13B1-13B4) were performed by unilateral injections into the mouse retro-orbital sinuses ($4 \times 10^{11}$ vg/mouse). The kidneys were collected at 190 dpi and longitudinally sectioned at 20 μm for subsequent IHC and confocal-microscopy analysis. Representative confocal images show native mCherry fluorescence (FIGS. 13A1 and 13B1: red), anti-mCherry immunostaining (FIGS. 13A2 and 13B2: green), DAPI nuclear counterstain (FIGS. 13A3 and 13B3: blue) and merged immunofluorescence and DAPI images (FIGS. 13A4 and 13B4).

As shown in FIGS. 14A1-14B4, LAP2 drives long-term transgene expression in the mouse retina. Intravenous administrations of the AAV-LAP2 (FIGS. 14A1-14A4) or the AAV-EF1α-vector (FIGS. 14B1-14B4) were performed by unilateral injections into the mouse retro-orbital sinuses ($4 \times 10^{11}$ vg/mouse). The retinae were collected at 190 dpi and transversely cryosectioned at 20 μm for subsequent IHC and confocal-microscopy analysis. Representative confocal images show native mCherry fluorescence (FIGS. 14A1 and 14B1: red), anti-mCherry immunostaining (FIGS. 14A2 and 14B2: green), DAPI nuclear counterstain (FIGS. 14A3 and 14B3: blue) and merged immunofluorescence and DAPI images (FIGS. 14A4 and 14B4).

REFERENCES

Andersson, R. and A. Sandelin (2019). Determinants of enhancer and promoter activities of regulatory elements. *Nat Rev Genet.*

Aschauer, D. F., S. Kreuz and S. Rumpel (2013). Analysis of transduction efficiency, tropism and axonal transport of AAV serotypes 1, 2, 5, 6, 8 and 9 in the mouse brain. *PLoS One* 8(9): e76310.

Back, S., A. Dossat, I. Parkkinen, P. Koivula, M. Airavaara, C. T. Richie, Y. H. Chen, Y. Wang and B. K. Harvey (2019). Neuronal Activation Stimulates Cytomegalovirus Promoter-Driven Transgene Expression. *Mol Ther Methods Clin Dev* 14: 180-188.

Baskerville, A. and G. Lloyd (1977). Experimental infection of monkeys with Herpesvirus suis (Aujeszky's-disease virus). *J Med Microbiol* 10(1): 139-144.

Bedbrook, C. N., B. E. Deverman and V. Gradinaru (2018). Viral Strategies for Targeting the Central and Peripheral Nervous Systems. *Annu Rev Neurosci* 41: 323-348.

Berges, B. K., J. H. Wolfe and N. W. Fraser (2007). Transduction of brain by herpes simplex virus vectors. *Mol Ther* 15(1): 20-29.

Berthomme, H., J. Lokensgard, L. Yang, T. Margolis and L. T. Feldman (2000). Evidence for a bidirectional element located downstream from the herpes simplex virus type 1 latency-associated promoter that increases its activity during latency. *J Virol* 74(8): 3613-3622.

Blanchard, Le Meur, Le Cunff, Blanchard, Leger, and Jestin (2006). Cellular gene expression survey of PseudoRabies Virus (PRV) infected Human Embryonic Kidney cells (HEK-293). *Vet Res,* 705-723.

Bloom, D. C., J. G. Stevens, J. M. Hill and R. K. Tran (1997). Mutagenesis of a cAMP response element within the latency-associated transcript promoter of HSV-1 reduces adrenergic reactivation. *Virology* 236(1): 202-207.

Boldogkoi, Erdelyi, and Fodor (2000). A putative latency promoter/enhancer (P(LAT2)) region of pseudorabies virus contains a virulence determinant. *J Gen Virol,* 415-420.

Brooks, A. R., R. N. Harkins, P. Wang, H. S. Qian, P. Liu and G. M. Rubanyi (2004). Transcriptional silencing is associated with extensive methylation of the CMV promoter following adenoviral gene delivery to muscle. *J Gene Med* 6(4): 395-404.

Cearley, C. N. and J. H. Wolfe (2007). A single injection of an adeno-associated virus vector into nuclei with divergent connections results in widespread vector distribution in the brain and global correction of a neurogenetic disease. *J Neurosci* 27(37): 9928-9940.

Chamberlain, K., J. M. Riyad and T. Weber (2016). Expressing Transgenes That Exceed the Packaging Capacity of Adeno-Associated Virus Capsids. *Hum Gene Ther Methods* 27(1): 1-12.

Chan, K. Y., M. J. Jang, B. B. Yoo, A. Greenbaum, N. Ravi, W. L. Wu, L. Sanchez-Guardado, C. Lois, S. K. Mazmanian, B. E. Deverman and V. Gradinaru (2017). Engineered AAVs for efficient noninvasive gene delivery to the central and peripheral nervous systems. *Nat Neurosci* 20(8): 1172-1179.

Chan, L. Y., C. F. Mugler, S. Heinrich, P. Vallotton and K. Weis (2018). Noninvasive measurement of mRNA decay reveals translation initiation as the major determinant of mRNA stability. *Elife* 7.

Cheung, A. K. (1989). Detection of pseudorabies virus transcripts in trigeminal ganglia of latently infected swine. *J Virol* 63(7): 2908-2913.

Cheung, A. K. (1991). Cloning of the latency gene and the early protein 0 gene of pseudorabies virus. *J Virol* 65(10): 5260-5271.

Cheung, A. K. and T. A. Smith (1999). Analysis of the latency-associated transcript/UL1-3.5 gene cluster promoter complex of pseudorabies virus. *Arch Virol* 144(2): 381-391.

Chikhirzhina, Al'-Shekhadat, and Chikhirzhina (2008). Transcription factors of the nuclear factor 1 (NF1) family. Role in chromatin remodelation. Mol Biol (Mosk), 388-404.

Colella, P., P. Sellier, H. Costa Verdera, F. Puzzo, L. van Wittenberghe, N. Guerchet, N. Daniele, B. Gjata, S. Marmier, S. Charles, M. Simon Sola, I. Ragone, C. Leborgne, F. Collaud and F. Mingozzi (2019). AAV Gene Transfer with Tandem Promoter Design Prevents Anti-transgene Immunity and Provides Persistent Efficacy in Neonate Pompe Mice. Mol Ther Methods Clin Dev 12: 85-101.

Curanovic, D., T. H. Ch'ng, M. Szpara and L. Enquist (2009). Compartmented neuron cultures for directional infection by alpha herpesviruses. Curr Protoc Cell Biol Chapter 26: Unit 26 24.

Dayton, R. D., M. S. Grames and R. L. Klein (2018). More expansive gene transfer to the rat CNS: AAV PHP.EB vector dose-response and comparison to AAV PHP.B. Gene Ther 25(5): 392-400.

Delzor, A., N. Dufour, F. Petit, M. Guillermier, D. Houitte, G. Auregan, E. Brouillet, P. Hantraye and N. Deglon (2012). Restricted transgene expression in the brain with cell-type specific neuronal promoters. Hum Gene Ther 23(4): 242-254.

Deshmane, S. L. and N. W. Fraser (1989). During latency, herpes simplex virus type 1 DNA is associated with nucleosomes in a chromatin structure. J Virol 63(2): 943-947.

Deverman, B. E., B. M. Ravina, K. S. Bankiewicz, S. M. Paul and D. W. Y. Sah (2018). Gene therapy for neurological disorders: progress and prospects. Nat Rev Drug Discov 17(10): 767.

Devi-Rao, G. B., S. A. Goodart, L. M. Hecht, R. Rochford, M. K. Rice and E. K. Wagner (1991). Relationship between polyadenylated and nonpolyadenylated herpes simplex virus type 1 latency-associated transcripts. J Virol 65(5): 2179-2190.

Emery, B. and Q. R. Lu (2015). Transcriptional and Epigenetic Regulation of Oligodendrocyte Development and Myelination in the Central Nervous System. Cold Spring Harb Perspect Biol 7(9): a020461.

Fan, Zhu, Sun, et al. (2019). Exploring the tissue tropism of pseudorabies virus based on miRNA level analysis. BMC Microbiol, 125.

Fleming, Pavesi, Benatti, Imbriano, Mantovani, and Struhl (2013). NF-Y coassociates with FOS at promoters, enhancers, repetitive elements, and inactive chromatin regions, and is stereo-positioned with growth-controlling transcription factors. Genome Res, 1195-1209.

Gasparini, Llonch, Borsch, and Ader (2019). Transplantation of photoreceptors into the degenerative retina: Current state and future perspectives. Prog Retin Eye Res, 1-37.

Gray, S. J., S. B. Foti, J. W. Schwartz, L. Bachaboina, B. Taylor-Blake, J. Coleman, M. D. Ehlers, M. J. Zylka, T. J. McCown and R. J. Samulski (2011). Optimizing promoters for recombinant adeno-associated virus-mediated gene expression in the peripheral and central nervous system using self-complementary vectors. Hum Gene Ther 22(9): 1143-1153.

Haberman, R. P. and T. J. McCown (2002). Regulation of gene expression in adeno-associated virus vectors in the brain. Methods 28(2): 219-226.

Hammond, S. L., A. N. Leek, E. H. Richman and R. B. Tjalkens (2017). Cellular selectivity of AAV serotypes for gene delivery in neurons and astrocytes by neonatal intracerebroventricular injection. PLoS One 12(12): e0188830.

Herdegen, T. and J. D. Leah (1998). Inducible and constitutive transcription factors in the mammalian nervous system: control of gene expression by Jun, Fos and Krox, and CREB/ATF proteins. Brain Res Brain Res Rev 28(3): 370-490.

Hordeaux, J., Y. Yuan, P. M. Clark, Q. Wang, R. A. Martino, J. J. Sims, P. Bell, A. Raymond, W. L. Stanford and J. M. Wilson (2019). The GPI-Linked Protein LY6A Drives AAV-PHP.B Transport across the Blood-Brain Barrier. Mol Ther 27(5): 912-921.

Hudry, E. and L. H. Vandenberghe (2019). Therapeutic AAV Gene Transfer to the Nervous System: A Clinical Reality. Neuron 102(1): 263.

Husain, T., M. A. Passini, M. K. Parente, N. W. Fraser and J. H. Wolfe (2009). Long-term AAV vector gene and protein expression in mouse brain from a small pan-cellular promoter is similar to neural cell promoters. Gene Ther 16(7): 927-932.

Ingusci, S., G. Verlengia, M. Soukupova, S. Zucchini and M. Simonato (2019). Gene Therapy Tools for Brain Diseases. Front Pharmacol 10: 724.

Jackson, K. L., R. D. Dayton, B. E. Deverman and R. L. Klein (2016). Better Targeting, Better Efficiency for Wide-Scale Neuronal Transduction with the Synapsin Promoter and AAV-PHP.B. Front Mol Neurosci 9: 116.

Jin, L. and G. Scherba (1999). Expression of the pseudorabies virus latency-associated transcript gene during productive infection of cultured cells. J Virol 73(12): 9781-9788.

Jin, L., W. M. Schnitzlein and G. Scherba (2000). Identification of the pseudorabies virus promoter required for latency-associated transcript gene expression in the natural host. J Virol 74(14): 6333-6338.

Kenny, J. J., F. C. Krebs, H. T. Hartle, A. E. Gartner, B. Chatton, J. M. Leiden, J. P. Hoeffler, P. C. Weber and B. Wigdahl (1994). Identification of a second ATF/CREB-like element in the herpes simplex virus type 1 (HSV-1) latency-associated transcript (LAT) promoter. Virology 200(1): 220-235.

Koyuncu, O. O., I. B. Hogue and L. W. Enquist (2013). Virus infections in the nervous system. Cell Host Microbe 13(4): 379-393.

Kriesel, J. D., B. B. Jones, K. M. Dahms and S. L. Spruance (2004). STAT1 binds to the herpes simplex virus type 1 latency-associated transcript promoter. J Neurovirol 10(1): 12-20.

Lang, F., X. Li, O. Vladimirova, B. Hu, G. Chen, Y. Xiao, V. Singh, D. Lu, L. Li, H. Han, J. M. Wickramasinghe, S. T. Smith, C. Zheng, Q. Li, P. M. Lieberman, N. W. Fraser and J. Zhou (2017). CTCF interacts with the lytic HSV-1 genome to promote viral transcription. Sci Rep 7: 39861.

Lee, J. S., P. Raja, D. Pan, J. M. Pesola, D. M. Coen and D. M. Knipe (2018). CCCTC-Binding Factor Acts as a Heterochromatin Barrier on Herpes Simplex Viral Latent Chromatin and Contributes to Poised Latent Infection. MBio 9(1).

Leib, D. A., C. L. Bogard, M. Kosz-Vnenchak, K. A. Hicks, D. M. Coen, D. M. Knipe and P. A. Schaffer (1989). A deletion mutant of the latency-associated transcript of herpes simplex virus type 1 reactivates from the latent state with reduced frequency. J Virol 63(7): 2893-2900.

Leib, D. A., K. C. Nadeau, S. A. Rundle and P. A. Schaffer (1991). The promoter of the latency-associated transcripts of herpes simplex virus type 1 contains a functional cAMP-response element: role of the latency-associated transcripts and cAMP in reactivation of viral latency. *Proc Natl Acad Sci USA* 88(1): 48-52.

Lokensgard, J. R., H. Berthomme and L. T. Feldman (1997). The latency-associated promoter of herpes simplex virus type 1 requires a region downstream of the transcription start site for long-term expression during latency. *J Virol* 71(9): 6714-6719.

Mahjoub, N., S. Dhorne-Pollet, W. Fuchs, M. L. Endale Ahanda, E. Lange, B. Klupp, A. Arya, J. E. Loveland, F. Lefevre, T. C. Mettenleiter and E. Giuffra (2015). A 2.5-kilobase deletion containing a cluster of nine microRNAs in the latency-associated-transcript locus of the pseudorabies virus affects the host response of porcine trigeminal ganglia during established latency. *J Virol* 89(1): 428-442.

Mak, K. Y., I. G. Rajapaksha, P. W. Angus and C. B. Herath (2017). The Adeno-associated Virus—A Safe and Promising Vehicle for Liverspecific Gene Therapy of Inherited and Non-inherited Disorders. *Curr Gene Ther* 17(1): 4-16.

Maturana, C. J., A. Aguirre and J. C. Saez (2017). High glucocorticoid levels during gestation activate the inflammasome in hippocampal oligodendrocytes of the offspring. *Dev Neurobiol* 77(5): 625-642.

Nathanson, J. L., R. Jappelli, E. D. Scheeff, G. Manning, K. Obata, S. Brenner and E. M. Callaway (2009). Short Promoters in Viral Vectors Drive Selective Expression in Mammalian Inhibitory Neurons, but do not Restrict Activity to Specific Inhibitory Cell-Types. *Front Neural Circuits* 3: 19.

Nguyen, N. T. T., B. Contreras-Moreira, J. A. Castro-Mondragon, W. Santana-Garcia, R. Ossio, C. D. Robles-Espinoza, M. Bahin, S. Collombet, P. Vincens, D. Thieffry, J. van Helden, A. Medina-Rivera and M. Thomas-Chollier (2018). RSAT 2018: regulatory sequence analysis tools 20th anniversary. *Nucleic Acids Res* 46(W1): W209-W214.

Ogden, P. J., E. D. Kelsic, S. Sinai and G. M. Church (2019). Comprehensive AAV capsid fitness landscape reveals a viral gene and enables machine-guided design. *Science* 366(6469): 1139-1143.

Ono, E., Y. Tomioka and S. Taharaguchi (2007). Possible roles of transcription factors of pseudorabies virus in neuropathogenicity. *Fukuoka Igaku Zasshi* 98(10): 364-372.

Peel, A. L., S. Zolotukhin, G. W. Schrimsher, N. Muzyczka and P. J. Reier (1997). Efficient transduction of green fluorescent protein in spinal cord neurons using adeno-associated virus vectors containing cell type-specific promoters. *Gene Ther* 4(1): 16-24.

Pomeranz, Reynolds, and Hengartner (2005). Molecular biology of pseudorabies virus: impact on neurovirology and veterinary medicine. *Microbiol Mol Biol Rev*, 462-500.

Powell, S. K., R. Rivera-Soto and S. J. Gray (2015). Viral expression cassette elements to enhance transgene target specificity and expression in gene therapy. *Discov Med* 19(102): 49-57.

Priola, S. A. and J. G. Stevens (1991). The 5' and 3' limits of transcription in the pseudorabies virus latency associated transcription unit. *Virology* 182(2): 852-856.

Qin Huang, K. Y. C., Isabelle G. Tobey, Yujia Alina Chan, Tim Poterba, Christine L. Boutros, and R. D. Alejandro B. Balazs, Jonathan M. Bloom, Cotton Seed, Benjamin E. Deverman (2019). Delivering genes across the blood-brain barrier: LY6A, a novel cellular receptor for AAV-PHP.B capsids. *Biorxiv*.

Qin, J. Y., L. Zhang, K. L. Clift, I. Hulur, A. P. Xiang, B. Z. Ren and B. T. Lahn (2010). Systematic comparison of constitutive promoters and the doxycycline-inducible promoter. *PLoS One* 5(5): e10611.

Renier, N., E. L. Adams, C. Kirst, Z. Wu, R. Azevedo, J. Kohl, A. E. Autry, L. Kadiri, K. Umadevi Venkataraju, Y. Zhou, V. X. Wang, C. Y. Tang, O. Olsen, C. Dulac, P. Osten and M. Tessier-Lavigne (2016). Mapping of Brain Activity by Automated Volume Analysis of Immediate Early Genes. *Cell* 165(7): 1789-1802.

Renier, N., Z. Wu, D. J. Simon, J. Yang, P. Ariel and M. Tessier-Lavigne (2014). iDISCO: a simple, rapid method to immunolabel large tissue samples for volume imaging. *Cell* 159(4): 896-910.

Russell, D. W. and R. K. Hirata (1998). Human gene targeting by viral vectors. *Nat Genet* 18(4): 325-330.

Samulski, R. J. and N. Muzyczka (2014). AAV-Mediated Gene Therapy for Research and Therapeutic Purposes. *Annu Rev Virol* 1(1): 427-451.

Sandelin, A., W. Alkema, P. Engstrom, W. W. Wasserman and B. Lenhard (2004). JASPAR: an open-access database for eukaryotic transcription factor binding profiles. *Nucleic Acids Res* 32(Database issue): D91-94.

Sohal, V. S., F. Zhang, O. Yizhar and K. Deisseroth (2009). Parvalbumin neurons and gamma rhythms enhance cortical circuit performance. *Nature* 459(7247): 698-702.

Taharaguchi, S., T. Kobayashi, S. Yoshino and E. Ono (2002). Analysis of regulatory functions for the region located upstream from the latency-associated transcript (LAT) promoter of pseudorabies virus in cultured cells. *Vet Microbiol* 85(3): 197-208.

Taharaguchi, S., S. Yoshino, K. Amagai and E. Ono (2003). The latency-associated transcript promoter of pseudorabies virus directs neuron-specific expression in trigeminal ganglia of transgenic mice. *J Gen Virol* 84 (Pt 8): 2015-2022.

von Jonquieres, G., D. Frohlich, C. B. Klugmann, X. Wen, A. E. Harasta, R. Ramkumar, Z. H. Spencer, G. D. Housley and M. Klugmann (2016). Recombinant Human Myelin-Associated Glycoprotein Promoter Drives Selective AAV-Mediated Transgene Expression in Oligodendrocytes. *Front Mol Neurosci* 9: 13.

Wang, D., P. W. L. Tai and G. Gao (2019). Adeno-associated virus vector as a platform for gene therapy delivery. *Nat Rev Drug Discov* 18(5): 358-378.

Wang, J., S. U. Pol, A. K. Haberman, C. Wang, M. A. O'Bara and F. J. Sim (2014). Transcription factor induction of human oligodendrocyte progenitor fate and differentiation. *Proc Natl Acad Sci USA* 111(28): E2885-2894.

Wang, L., S. Muramatsu, Y. Lu, K. Ikeguchi, K. Fujimoto, T. Okada, H. Mizukami, Y. Hanazono, A. Kume, F. Urano, H. Ichinose, T. Nagatsu, I. Nakano and K. Ozawa (2002). Delayed delivery of AAV-GDNF prevents nigral neurodegeneration and promotes functional recovery in a rat model of Parkinson's disease. *Gene Ther* 9(6): 381-389.

Washington, S. D., F. Musarrat, M. K. Ertel, G. L. Backes and D. M. Neumann (2018). CTCF Binding Sites in the Herpes Simplex Virus 1 Genome Display Site-Specific CTCF Occupation, Protein Recruitment, and Insulator Function. *J Virol* 92(8).

Wasserman, W. W. and A. Sandelin (2004). Applied bioinformatics for the identification of regulatory elements. *Nat Rev Genet* 5(4): 276-287.

Wong, G., J. Lu, W. Zhang and G. F. Gao (2019). Pseudorabies virus: a neglected zoonotic pathogen in humans? *Emerg Microbes Infect* 8(1): 150-154.

Yardeni, T., M. Eckhaus, H. D. Morris, M. Huizing and S. Hoogstraten-Miller (2011). Retro-orbital injections in mice. *Lab Anim (NY)* 40(5): 155-160.

Ziebarth, J. D., A. Bhattacharya and Y. Cui (2013). CTCFBSDB 2.0: a database for CTCF-binding sites and genome organization. *Nucleic Acids Res* 41(Database issue): D188-194.

Zimmerman, D., K. Patel, M. Hall and J. Elmer (2018). Enhancement of transgene expression by nuclear transcription factor Y and CCCTC-binding factor. *Biotechnol Prog* 34(6): 1581-1588.

Zolotukhin, S., B. J. Byrne, E. Mason, I. Zolotukhin, M. Potter, K. Chesnut, C. Summerford, R. J. Samulski and N. Muzyczka (1999). Recombinant adeno-associated virus purification using novel methods improves infectious titer and yield. *Gene Therapy* 6(6): 973-985.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A recombinant vector, comprising:
   a promoter between about 200 bp and about 410 bp in length, wherein the promoter comprises a nucleic acid sequence having 100% sequence identity to SEQ ID NO: 2;
   a cloning site for insertion of a nucleic acid encoding the target gene; and
   at least one non-promoter regulatory element required for the expression of the target gene in the host cell.

2. The recombinant vector of claim 1, wherein the vector is a viral vector.

3. The recombinant vector of claim 2, wherein the viral vector is an adeno-associated virus (AAV) vector.

4. The recombinant vector of claim 1, wherein the vector is a non-viral vector.

5. The recombinant vector of claim 1, wherein the at least one non-promoter regulatory element comprises an enhancer element.

6. The recombinant vector of claim 1, wherein the at least one non-promoter regulatory element comprises an inducer element.

7. The recombinant vector of claim 1, further comprising a selectable marker element.

8. A neuronal cell comprising the recombinant vector of claim 1.

9. The neuronal cell of claim 8, wherein the neuronal cell resides in striatum, thalamus, hypothalamus, midbrain, hind brain, cerebellum, a primary motor area, a secondary motor area, a primary somatosensory area, a supplementary somatosensory area, a visual area, a hippocampal formation, pallidum, an olfactory area, or the spinal cord, of the mammalian subject.

10. The neuronal cell of claim 8, wherein the neuronal cell resides in a primary motor area, a secondary motor area, a primary somatosensory area, a supplemental somatosensory area, a visual area, a hippocampal formation, striatum, pallidum, thalamus, hypothalamus, a midbrain area, hind brain, or an olfactory area, of the mammalian subject.

11. The neuronal cell of claim 10, wherein the midbrain area comprises a motor-related area, a sensory-related area, or both.

12. The neuronal cell of claim 8, wherein the neuronal cell resides in cortex, dentate gyrus, striatum, cerebellum, or olfactory bulb, of the mammalian subject.

13. The neuronal cell of claim 8, where the neuronal cell resides in the spinal cord of the mammalian subject.

14. The neuronal cell of claim 13, where the neuronal cell resides in the dorsal horn of the spinal cord.

15. The neuronal cell of claim 13, where the neuronal cell resides in the lumbar spinal cord, thoracic spinal cord, cervical spinal cord, or a combination thereof.

16. The neuronal cell of claim 8, wherein the neuronal cell comprises a neuron, a microglia cell, an astrocyte, or a combination thereof.

17. The neuronal cell of claim 16, wherein the neuronal cell comprises a neuron.

18. A method of expressing a target gene in a host cell, comprising: contacting the host cell with the recombinant vector of claim 1 such that the recombinant vector is introduced into the host cell, whereby expression of the target gene occurs in the host cell.

* * * * *